(12) United States Patent
Takeda

(10) Patent No.: US 10,275,989 B2
(45) Date of Patent: Apr. 30, 2019

(54) GAME SYSTEM, SERVER, AND DONATION CONTROL METHOD

(71) Applicant: Universal Entertainment Corporation, Koto-ku, Tokyo (JP)

(72) Inventor: Kengo Takeda, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 71 days.

(21) Appl. No.: 15/470,822

(22) Filed: Mar. 27, 2017

(65) Prior Publication Data
US 2017/0287279 A1 Oct. 5, 2017

(30) Foreign Application Priority Data
Mar. 30, 2016 (JP) .................................. 2016-069395

(51) Int. Cl.
*G07F 17/32* (2006.01)
*G06Q 20/34* (2012.01)

(52) U.S. Cl.
CPC ....... *G07F 17/3258* (2013.01); *G06Q 20/341* (2013.01); *G07F 17/3223* (2013.01); *G07F 17/3227* (2013.01)

(58) Field of Classification Search
CPC ......... G07F 17/32; G07F 17/3244; A63F 9/24
See application file for complete search history.

(56) References Cited

U.S. PATENT DOCUMENTS

| | | | | |
|---|---|---|---|---|
| 5,766,074 A * | 6/1998 | Cannon | ............... | G07F 17/3211 463/16 |
| 2003/0054888 A1* | 3/2003 | Walker | .................. | G06Q 30/02 463/42 |
| 2004/0087360 A1* | 5/2004 | Chamberlain | ......... | G06Q 20/10 463/25 |
| 2004/0204235 A1* | 10/2004 | Walker | .................... | G07F 17/32 463/29 |
| 2005/0096130 A1* | 5/2005 | Mullins | .................. | G07F 17/32 463/27 |
| 2005/0255922 A1* | 11/2005 | Nguyen | ................. | G07F 17/32 463/42 |
| 2006/0154723 A1* | 7/2006 | Saffari | .................... | G07F 17/32 463/29 |
| 2006/0183541 A1* | 8/2006 | Okada | ..................... | G07F 17/32 463/29 |
| 2007/0158905 A1* | 7/2007 | Fass | ........................ | A63F 3/00 273/243 |
| 2008/0108429 A1* | 5/2008 | Davis | ..................... | G07F 17/32 463/26 |
| 2008/0242428 A1* | 10/2008 | Okada | .................... | G07F 17/32 463/43 |

(Continued)

Primary Examiner — Jason Skaarup
(74) Attorney, Agent, or Firm — Potomac Law Group, PLLC; Kenneth Fagin

(57) ABSTRACT

Provided is a game system which performs control so as to allow a donation amount to be collected from a payout obtained in a game upon the occurrence of said payout, a percentage of the payout to be donated being previously set by the user.
A donation management server 40 stores settings related to donations made by the user in a donation setting information table 421 and upon the occurrence of the payout, performs control so as to automatically donate a fixed percentage of the payout based on the above-mentioned settings made by the user.

4 Claims, 60 Drawing Sheets

(56) References Cited

U.S. PATENT DOCUMENTS

| | | | | |
|---|---|---|---|---|
| 2009/0017904 A1* | 1/2009 | Matsui | G06K 13/08 463/25 |
| 2009/0209327 A1* | 8/2009 | Herrington | G07F 17/3239 463/25 |
| 2009/0307102 A1* | 12/2009 | Goldman | G06Q 10/10 705/26.1 |
| 2009/0327122 A1* | 12/2009 | Isac | G06Q 10/00 705/39 |
| 2010/0004055 A1* | 1/2010 | Gormley | G07F 17/32 463/25 |
| 2012/0190433 A1* | 7/2012 | Rowe | G06Q 20/10 463/25 |
| 2012/0252568 A1* | 10/2012 | Amour | G07F 17/32 463/28 |
| 2012/0289297 A1* | 11/2012 | Zilba | G07F 17/3244 463/11 |
| 2012/0310779 A1* | 12/2012 | Flynn | G06Q 50/34 705/26.43 |
| 2013/0053138 A1* | 2/2013 | Pereira | G07F 17/3244 463/29 |
| 2014/0087847 A1* | 3/2014 | Zilba | G07F 17/3255 463/25 |
| 2014/0087855 A1* | 3/2014 | Caputo | G07F 17/3258 463/26 |
| 2014/0213339 A1* | 7/2014 | Khal | G07F 17/3244 463/19 |
| 2015/0011305 A1* | 1/2015 | Deardorff | G07F 17/3258 463/26 |
| 2015/0045110 A1* | 2/2015 | Lempel | A63F 13/46 463/25 |
| 2015/0356639 A1* | 12/2015 | Sobhani | G06Q 30/0279 705/39 |
| 2016/0148466 A1* | 5/2016 | Pececnik | G07F 17/3244 463/25 |

* cited by examiner

FIG. 10

SYMBOL COMBINATION TABLE

| SYMBOL COMBINATION ||||| PAY-OUT NUMBER | WINNING COMBINATION |
|---|---|---|---|---|---|---|
| 1st REEL | 2nd REEL | 3rd REEL | 4th REEL | 5th REEL | | |
| RED | RED | RED | RED | RED | 15 | RED |
| APPLE | APPLE | APPLE | APPLE | APPLE | 12 | APPLE |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE3 |
| CHERRY | CHERRY | CHERRY | (ANY) | (ANY) | 2 | CHERRY2 |
| ORANGE | ORANGE | ORANGE | (ANY) | (ANY) | 2 | ORANGE2 |
| CHERRY | (ANY) | (ANY) | (ANY) | (ANY) | 1 | CHERRY1 |
| ORANGE | (ANY) | (ANY) | (ANY) | (ANY) | 1 | ORANGE1 |

FIG.29A

121 CARD MANAGEMENT TABLE

| IDENTIFI-CATION ID | GAME FACILITY CODE | CARD BALANCE | POINTS | POINTS (FOR TODAY) | COUPON MANAGE-MENT NUMBER | RANK |
|---|---|---|---|---|---|---|
| 1 | 100 | 34 | 304 | 10 | — | PLAYER |
| 2 | 100 | 0 | 3056 | 0 | — | PLAYER |
| 3 | 100 | 9800 | 0 | 0 | 24133 | GOLD |
| 4 | 100 | 12235 | 20 | 10 | 11305 | GOLD |
| 5 | 100 | 30000 | 0 | 0 | — | SILVER |
| 6 | 101 | 0 | 0 | 0 | — | PLATINUM |
| ... | ... | ... | ... | ... | ... | ... |

FIG.29B

122 GAME HISTORY MANAGEMENT TABLE

| IDENTIFICATION ID | MACHINE ID | START DATE AND TIME | TERMINATION DATE AND TIME | GAMING TIME (h) | TOTAL OF BETS | WIN LOSS | BET/GAME |
|---|---|---|---|---|---|---|---|
| 1 | 638 | 2016/2/1 11:10:36 | 2016/2/1 11:40:15 | 0.19 | 12000 | -24225 | 203.39 |
| 1 | 638 | 2016/2/12 12:19:30 | 2016/2/12 15:10:11 | 1.67 | 331320 | -31737 | 2808.01 |
| 1 | 638 | 2016/2/13 12:10:03 | 2016/2/13 13:10:06 | 0.69 | 74670 | -17003 | 1555.21 |
| 1 | 640 | 2016/2/14 11:09:22 | 2016/2/14 19:22:32 | 6.56 | 885300 | -14500 | 220.94 |
| 1 | 640 | 2016/2/18 10:10:15 | 2016/2/18 11:35:09 | 0.43 | 285270 | -79050 | 973.63 |
| 3 | 578 | 2016/2/15 12:12:00 | 2016/2/15 12:52:32 | 0.16 | 21030 | -15388 | 228.80 |
| ... | ... | ... | ... | ... | ... | ... | ... |

FIG.30A

321 USER INFORMATION TABLE

| IDENTIFI-CATION ID | NAME | NICKNAME | SEX | DATE OF BIRTH | PINCODE |
|---|---|---|---|---|---|
| 1 | ◇◇◇◇ | ◇◇ | MALE | 1985/10/24 | 0098 |
| 2 | — | △△ | MALE | 1990/2/14 | 9786 |
| 3 | ○○○○ | ○○ | FEMALE | 1980/5/5 | 1012 |
| ... | ... | ... | ... | ... | ... |

FIG.30B

322 MEMBER INFORMATION TABLE

| IDENTIFI-CATION ID | NATION-ALITY | ZIP CODE | ADDRESS | PHONE NUMBER | E-MAIL ADDRESS |
|---|---|---|---|---|---|
| 1 | JPN | 100-0000 | ···, Tokyo | 03-xx··· | aa@···.jp |
| 2 | — | — | — | — | — |
| 3 | PHL | 0928 | ··0928, Manila | 1234··· | bb@···.ph |
| ... | ... | ... | ... | ... | ... |

FIG.31

323 FRIEND INFORMATION TABLE

| IDENTIFI-CATION ID | FRIEND ID | BLOCK |
|---|---|---|
| 1 | 5 | 0 |
| 1 | 8 | 1 |
| 1 | 21 | 0 |
| 3 | 8 | 0 |
| 3 | 9 | 0 |
| 3 | 10 | 0 |
| 3 | 80 | 1 |
| ... | ... | ... |

FIG.32A

421 DONATION SETTING INFORMATION TABLE

| IDENTIFICATION ID | AUTOMATIC DONATION | RANKING DISPLAY | FRACTION DONATION | DONATION AMOUNT SPECIFYING | CONDITIONAL DONATION ||||  DONATION NOTIFICATION |
|---|---|---|---|---|---|---|---|---|---|
| | | | | | BASE AMOUNT | TARGET | AMOUNT/ PERCENT- AGE | COLLECT- ION TIMING | |
| 1 | 1 | NICKNAME | 1 | — | — | — | — | — | 1 |
| 2 | 0 | — | — | — | — | — | — | — | 1 |
| 3 | 1 | HIDDEN | 1 | — | 1000 | POINTS | 100 | CASHING-OUT | 0 |
| 4 | 1 | NAME | 0 | — | — | — | — | — | 1 |
| 5 | 1 | NICKNAME | 1 | — | — | — | — | — | 1 |
| 6 | 1 | NICKNAME | 0 | 1 | 1000 | PAYOUT | 10% | OCCUR- RENCE OF PAYOUT | 1 |
| 7 | 1 | HIDDEN | 0 | 1023 | — | — | — | — | 0 |
| ... | ... | ... | ... | ... | ... | ... | ... | ... | ... |

FIG.32B

422 DONATION DESTINATION SETTING INFORMATION TABLE

| IDENTIFI- CATION ID | DONATION DESTINATION SPECIFYING PATTERN | DONATION DESTINATION | DONATION DESTINATION SELECTION CONDITION MANAGEMENT NUMBER |
|---|---|---|---|
| 1 | INDIVIDUAL | — | — |
| 2 | — | — | — |
| 3 | PREVIOUS | AA DONATION | — |
| 4 | NONE | — | — |
| 5 | INDIVIDUAL | — | — |
| 6 | PREVIOUS | AUTOMATIC SELECTION 1 | — |
| 7 | PREVIOUS | AUTOMATIC SELECTION 2 | 233587 |
| ... | ... | ... | ... |

FIG.33A

423 DONATION DESTINATION MANAGEMENT TABLE

| CATEGORY | DONATION DESTINATION NAME | PRIORITY ORDER |
|---|---|---|
| CHILDREN/ HUMAN RIGHTS | AA DONATION | 1 |
| SPORT | BB DONATION | 2 |
| EDUCATION | CC DONATION | 5 |
| CHILDREN/ HUMAN RIGHTS | DD FUND | 4 |
| CHILDREN/ HUMAN RIGHTS | EE PROJECT | 3 |
| SPORT | FF PROJECT | 6 |
| EDUCATION | GG FUND | 7 |
| ... | ... | ... |

FIG.33B

424 POINT EXCHANGE RATE MANAGEMENT TABLE

| TARGET | EXCHANGE RATE | EXCHANGE UNIT |
|---|---|---|
| POINTS (DURING A NORMAL TIME) | 1.0 | 100 |
| POINTS (DURING A CAMPAIGN) | 1.5 | 10 |

FIG.34

425 DONATION TRACK RECORD MANAGEMENT TABLE

| IDENTIFI-CATION ID | DONATION COLLECTION DATE AND TIME | DONATION DESTINATION | DONATION AMOUNT | DONATION TYPE | DONATION OPERATION TYPE |
|---|---|---|---|---|---|
| 1 | 2016/2/8 15:00:03 | AA DONATION | 29 | FRACTION | AUTOMATIC |
| 1 | 2016/2/8 18:20:13 | DD FUND | 5 | FRACTION | AUTOMATIC |
| 1 | 2016/2/8 18:28:04 | AA DONATION | 3 | FRACTION | AUTOMATIC |
| 3 | 2016/2/15 11:15:38 | AA DONATION | 10 | FRACTION | AUTOMATIC |
| 3 | 2016/2/15 15:22:49 | AA DONATION | 12 | PAYOUT | AUTOMATIC |
| 6 | 2016/2/10 15:02:53 | AA DONATION | 52 | PAYOUT | AUTOMATIC |
| 6 | 2016/2/28 15:08:44 | EE PROJECT | 30 | SPECIFIED AMOUNT | AUTOMATIC |
| 6 | 2016/2/28 16:21:09 | AA DONATION | 100 | POINTS | AUTOMATIC |
| 8 | 2016/2/10 15:02:53 | AA DONATION | 500 | POINTS | MANUAL |
| 9 | 2016/2/28 15:08:44 | EE PROJECT | 360 | SPECIFIED AMOUNT | MANUAL |
| ... | ... | ... | ... | ... | ... |

GAME SYSTEM, SERVER, AND DONATION CONTROL METHOD

CROSS-REFERENCE TO RELATED APPLICATION

This application claims the benefit of Japanese Patent Application No. 2016-069395 filed on Mar. 30, 2016, which application is incorporated herein by reference in its entirety.

FIELD OF THE INVENTION

The present invention relates to a game system, a server, and a donation control method for making a donation in a game facility.

BACKGROUND OF THE INVENTION

A user card is inserted into a player tracking device as in the above-described U.S. Unexamined Patent Application Publication No. 2012/0135799 as well as the above-described U.S. Pat. No. 8,777,734, whereby a game is executed on a gaming machine by credit data associated with said user card. Since the credit obtained as an outcome of the game can be added to a value of an account of a user (player), the user can easily enjoy the game without cumbersome taking-in-and-out of cash or the like.

In addition, in the conventional system which includes each of the configurations disclosed in the above-described Japanese Patent Application Laid-Open Publication No. 2012-022657 and the above-described Japanese Patent Application Laid-Open Publication No. 2005-230348, refund money in a publicly operated competition and points obtained in games can be donated.

However, in each of the conventional configurations, during playing games, a donation of an arbitrary amount determined by a user cannot be made without any cumbersome operation.

BRIEF SUMMARY OF THE INVENTION

The present invention provides a game system, a server, and a donation control method as described below.

The invention according to a first aspect of the present invention has the below-described configuration.

The game system (for example, a game system 1) is to control a donation made by a user using each gaming machine (for example, a slot machine 1010), the each gaming machine enabling execution of a game played by the user in accordance with a value of game media, the each gaming machine providing a value of game media for the user in accordance with an outcome of the game, the game system including:

a storage part for storing the value of the game media provided for the user as a payout in accordance with the outcome of the game for each game; and a server for performing control so as to obtain a predetermined percentage of the payout based on the payout stored in the storage part and a setting made by the user in order to donate the predetermined percentage of the payout at predetermined timing.

By employing the above-described configuration of the present invention, since upon the occurrence of the payout in the game, it is made possible to collect a donation amount, whose percentage is previously set by the user, from said payout, the donation of the arbitrary amount set by the user can be made without any cumbersome operation. In addition, besides a feeling of satisfaction obtained by playing games, the user can obtain a sense of fulfillment and a sense of satisfaction in that the user contribute to society. Further, a game facility or the like which installs and manages gaming machines and provides amusement which is gambling also can appeal, to the public, an attitude that the game facility is actively promoting social contribution.

In the first aspect, the invention according to a second aspect of the present invention has the below-described configuration.

The configuration is arranged such that the predetermined timing is timing at which the user performs an operation on the gaming machine (for example, upon cashing-out) or is timing based on timing at which the value of the game media is provided for the user (for example, upon the occurrence of a payout).

By employing the above-described configuration of the present invention, since the timing at which the donation is made is set based on the timing at which the user performs the operation on the gaming machine or the timing at which the value of the game media is provided for the user, the user can clearly recognize the timing of the donation.

In the second aspect, the invention according to a third aspect of the present invention has the below-described configuration.

The configuration is arranged such that the predetermined timing is previously set by the user (for example, a setting on a user information input screen 4050 shown in FIG. 39).

By employing the above-described configuration of the present invention, since the timing of the donation can be previously set, the user can make the setting in which the donation is made at timing desired by the user.

In the first aspect, the invention according to a fourth aspect of the present invention has the below-described configuration.

The configuration is arranged such that a donation destination of the donation is previously set by the user (for example, a setting on a user information input screen 4060 shown in FIG. 40).

By employing the above-described configuration of the present invention, since the donation destination to which the donation is made can be previously set, the user can make the setting in which the donation is made to a donation destination desired by the user.

In the first aspect, the invention according to a fifth aspect of the present invention has the below-described configuration.

The configuration is arranged such that as a condition for donating the predetermined percentage of the payout, the setting made by the user further includes a condition related to a game history of the user (for example, a setting on the user information input screen 4050 shown in FIG. 39).

By employing the above-described configuration of the present invention, since when a state of the game history of the user satisfies a fixed condition, the predetermined percentage of the payout is donated, the setting can be made so as to make the donation in a case of the fixed state such as a state in which the user obtains a large number of the game media.

The invention according to a sixth aspect of the present invention has the below-described configuration.

A server is to control a donation made by a user using a gaming machine, the gaming machine enabling execution of a game played by the user in accordance with a value of game media, the gaming machine providing a value of game media for the user in accordance with an outcome of the game, the server is configured to be operable to access a storage part for storing the value of the game media provided for the user as a payout in accordance with the outcome of the game for each game, and the server performs control so as to obtain a predetermined percentage of the payout based on the payout stored in the storage part and a setting made by the user in order to donate the predetermined percentage of the payout at predetermined timing.

By employing the above-described configuration of the present invention, since upon the occurrence of the payout in the game, it is made possible to collect a donation amount, whose percentage is previously set by the user, from said payout, the donation of the arbitrary amount set by the user can be made without any cumbersome operation. In addition, besides a feeling of satisfaction obtained by playing games, the user can obtain a sense of fulfillment and a sense of satisfaction in that the user contribute to society. Further, a game facility or the like which installs and manages gaming machines and provides amusement which is gambling also can appeal, to the public, an attitude that the game facility is actively promoting social contribution.

The invention according to a seventh aspect of the present invention has the below-described configuration.

The donation control method is to control a donation made by a user using a gaming machine, the donation control method being executed on a server, the gaming machine enabling execution of a game played by the user in accordance with a value of game media, the gaming machine providing a value of game media for the user in accordance with an outcome of the game, the donation control method including the steps of: on the server, accessing a storage part for storing the value of the game media provided for the user as a payout in accordance with the outcome of the game for each game; and performing control so as to obtain a predetermined percentage of the payout based on the payout stored in the storage part and a setting made by the user in order to donate the predetermined percentage of the payout at predetermined timing.

By employing the above-described configuration of the present invention, since upon the occurrence of the payout in the game, it is made possible to collect a donation amount, whose percentage is previously set by the user, from said payout, the donation of the arbitrary amount set by the user can be made without any cumbersome operation. In addition, besides a feeling of satisfaction obtained by playing games, the user can obtain a sense of fulfillment and a sense of satisfaction in that the user contribute to society. Further, a game facility or the like which installs and manages gaming machines and provides amusement which is gambling also can appeal, to the public, an attitude that the game facility is actively promoting social contribution.

By the game system, the server, and the donation control method according to the present invention, since upon the occurrence of the payout in the game, it is made possible to collect a donation amount, whose percentage is previously set by the user, from said payout, the donation of the arbitrary amount set by the user can be made without any cumbersome operation. In addition, besides a feeling of satisfaction obtained by playing games, the user can obtain a sense of fulfillment and a sense of satisfaction in that the user contribute to society. Further, a game facility or the like which installs and manages gaming machines and provides amusement which is gambling also can appeal, to the public, an attitude that the game facility is actively promoting social contribution.

BRIEF DESCRIPTION OF THE DRAWINGS

FIG. 10 is a diagram showing an example of a symbol combination table which the slot machine according to the one embodiment of the present invention includes;

FIGS. 29A and 29B are diagrams showing examples of tables stored in a database according to the one embodiment of the present invention;

FIGS. 30A and 30B are diagrams showing examples of tables stored in a database according to the one embodiment of the present invention;

FIG. 31 is a diagram showing an example of a table stored in the database according to the one embodiment of the present invention;

FIGS. 32A and 32B are diagrams showing examples of tables stored in a database according to the one embodiment of the present invention;

FIGS. 33A and 33B are diagrams showing examples of tables stored in the database according to the one embodiment of the present invention;

FIG. 34 is a diagram showing an example of a table stored in the database according to the one embodiment of the present invention;

DETAILED DESCRIPTION OF THE PREFERRED EMBODIMENT

One embodiment of the present invention will be described with reference to the accompanying drawings.

[Description of Outline of Game System]

Figure 1:
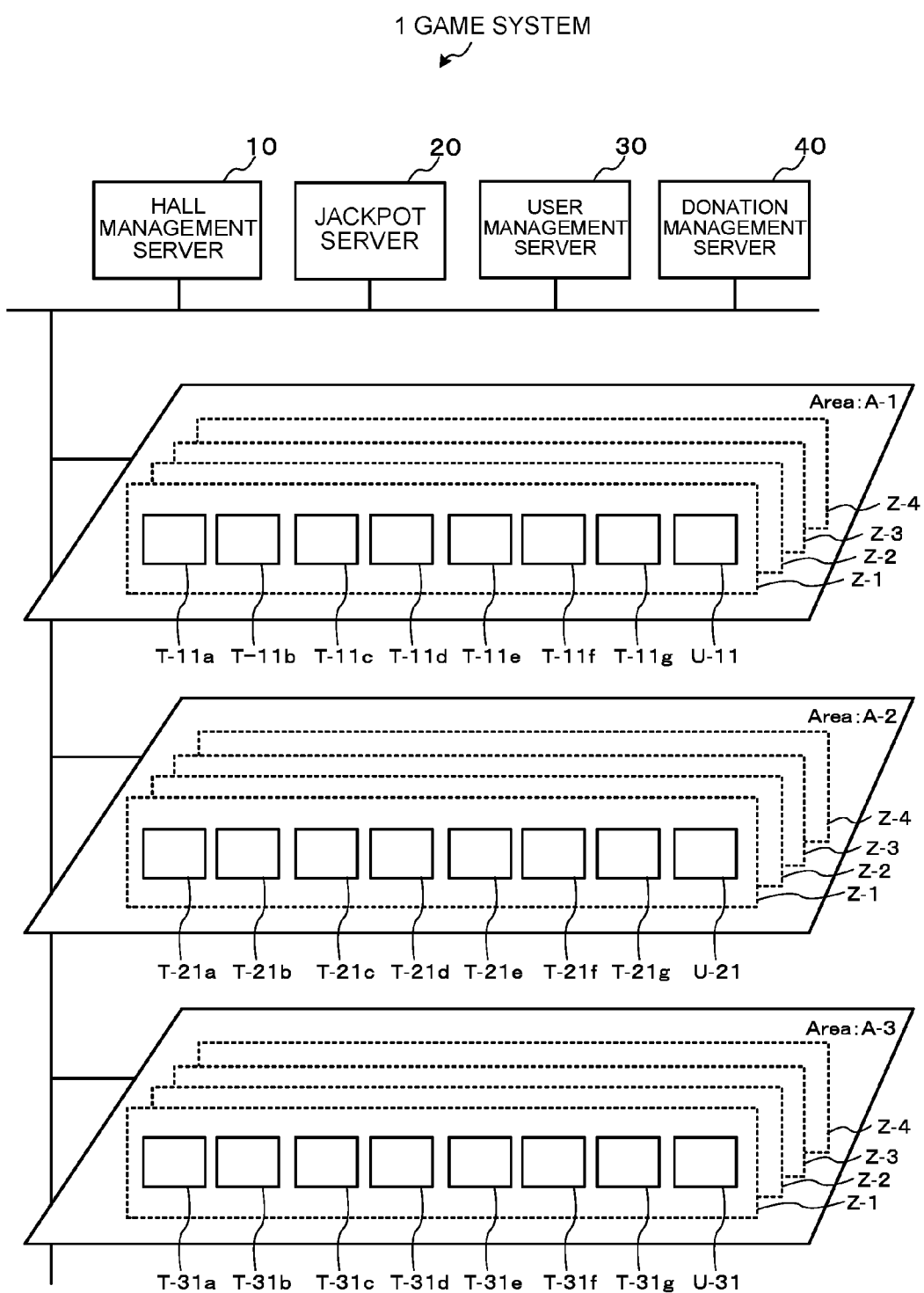
FIG. 1 is a diagram schematically illustrating a game system according to one embodiment of the present invention.

First, with reference to FIG. 1, an outline of a game system will be described. FIG. 1 is a schematic diagram schematically illustrating an overview of a game system 1 according to one embodiment of the present invention.

The game system 1 includes a hall management server 10, a jackpot server 20, a user management server 30, a donation management server 40, and a plurality of gaming machines. Each of the gaming machines is, for example, a slot machine. It is to be noted that in the present specification, there is a case where a user who plays games on a slot machine is referred to as a player. The term "user" used in general refers to a user of the above-described game system 1 (that is, a user who utilizes a gaming machine), and a player who executes games on a slot machine (who plays games) is also included.

The hall management server 10 totalizes and manages a flow of money within a game facility, prepares a balance sheet and the like, and manages communications between the other servers and respective slot machines 1010. In addition, the hall management server 10 obtains, from the respective gaming machines, game information which includes timing at which each of the gaming machines starts a unit game; timing at which each of the gaming machines terminates the unit game; a drawing result in the unit game; a Bet money amount; a payout money amount; and the like, and accumulates the game information, thereby managing a game history. The hall management server 10 manages a card balance for each user associated with the later-described user card (for example, an IC card).

The jackpot server 20 manages accumulation and paying-out of jackpot amounts for a jackpot. For the jackpot, a part of coins which a player consumes on each of the gaming machines is accumulated as a jackpot amount, and in a case where a jackpot trigger has been established on any of the gaming machines, coins corresponding to the accumulated jackpot amounts are paid out to that gaming machine. In this case, each of the gaming machines calculates an accumulated amount (an accumulation amount) as the jackpot amount each time a game is played and transmits the calculated accumulated amount to the jackpot server 20 which is an external control device. The jackpot server 20 accumulates the accumulation amounts transmitted from the slot machines to the jackpot amount.

The user management server 30 stores user information and the like inputted by a user so as to be associated with a user card and manages the user information. A user card is, for example, issued by a card issuing terminal in a game facility or provided upon checking in at a hotel in connection with the game facility. A user inputs user information on a gaming machine, a kiosk terminal, or the like which reads a user card, thereby associating said user information with the user card. In addition, an address, a phone number, and the like of the user are inputted when the user makes member registration, these pieces of information (member registration information) are also associated with the above-mentioned user card.

The user information and the member registration information are stored in a database of the user management server 30 together with an identification ID of the user card (for example, a UID which uniquely identifies an IC card, etc.). In addition, upon issuing a user card by the card issuing terminal or inputting the user information, a face of said user can also be shot by a camera, and the shot image is stored in the database of the user management server 30 so as to be associated with an identification ID of a user card.

The donation management server 40 executes and manages donations made by a user. A user can perform a donation operation from the gaming machine, the kiosk terminal, or the like. In response to said operation performed by a user, the donation management server 40 performs control such that a part or all of a money amount (card balance) or a payout money amount, which is stored in a user card, is donated to a selected donation destination. In addition, setting can be made such that upon inputting the user information, a user can automatically donate a predetermined money amount from a card balance, a payout money amount, or the like to a donation destination on predetermined conditions. Based on said setting, the donation management server 40 controls the automatic donation to be made.

As shown in FIG. 1, the gaming machines are installed in a plurality of areas (for example, as shown in FIG. 1, A-1 to A-3). Here, the areas correspond to, for example, one floor of a game facility or areas within the floor. In this example, although the areas from A-1 to A-3 are shown, this is merely one example.

Further, the gaming machines are installed in each zone (for example, as shown in FIG. 1, in Z-1 to Z-4) within each of the areas. Here, each of the zones corresponds to specific space within each of the areas or a "bank" in which gaming machines are installed in a grouped manner. In this example, although the four zones (Z-1 to Z-4) are provided in each of the areas, respectively, this is also merely one example. In addition, in this example, although seven gaming machines are installed in each one of the zones, respectively, this is also merely one example, and various numbers of the gaming machines can be installed.

As shown in FIG. 1, in the zone Z-1 of the area A-1, seven gaming machines of T-11a to T-11g are installed and further, a kiosk terminal or a signage which is shown as U-11 is installed. Similarly, in the zone Z-2 of the area A-1, seven gaming machines of T-12a to T-12g are installed (thereinafter, not shown) and further, a kiosk terminal or a signage (thereinafter, not shown) of U-12 is installed. In the zone Z-3 of the area A-1, seven gaming machines of T-13a to T-13g and U-13 are installed. In the zone Z-4 of the area A-1, seven gaming machines of T-14a to T-14g and U-14 are installed. It is to be noted that although in this example, either one of the kiosk terminal and the signage is installed in each of the zones, this is also merely one example and various numbers of kiosk terminals or signages to be installed can be set (a case where even one of the kiosk terminal or the signage is not installed is included).

Further, as shown in FIG. 1, in the zone Z-1 of the area A-2, seven gaming machines of T-21a to T-21g and U-21 are installed; similarly, in the zone Z-2 of the area A-2, seven gaming machines of T-22a to T-22g and U-22 are installed (thereinafter, not shown); in the zone Z-3 of the area A-2, seven gaming machines of T-23a to T-23g and U-23 are installed; and in the zone Z-4 of the area A-2, seven gaming machines of T-24a to T-24g and U-24 are installed. In addition, in the zone Z-1 of the area A-3, seven gaming machines of T-31a to T-31g and U-31 are installed; similarly, in the zone Z-2 of the area A-3, seven gaming machines of T-32a to T-32g and U-32 are installed (thereinafter, not shown); in the zone Z-3 of the area A-3, seven gaming machines of T-33a to T-33g and U-33 are installed; and in the zone Z-4 of the area A-3, seven gaming machines of T-34a to T-34g and U-34 are installed.

It is to be noted that as shown in FIG. 1, the respective gaming machines and the kiosk terminal or the signage are connected to the hall management server 10 and the like via a LAN connection or the like, for example, by Ethernet (a registered trademark).

In addition, each of the gaming machines is provided with a unique identifier, and the hall management server 10 or the like identifies transmission sources of data transmitted from the respective gaming machines by using the identifiers. In addition, also in a case where the hall management server 10 or the like transmits data to the gaming machines, based on the identifiers, transmission destinations are specified. Although as the identifiers, for example, network addresses such as IP addresses can be used, identifiers other than the network addresses may also be provided, thereby allowing the individual gaming machines to be managed.

It is to be noted that the game system 1 may be constructed within one game facility where various games can be conducted or may be constructed over a plurality of game facilities. In addition, when the game system 1 is constructed in a single game facility, the game system 1 may be constructed in each floor or section of the game facility. A communication line for connecting the servers and the gaming machines may be a wired or wireless line, and the Internet (for example, used as a secret line using a VPN), a dedicated line, an exchange line, or the like can be adopted.

[Description of Outline of Gaming Machine]

Figure 2:
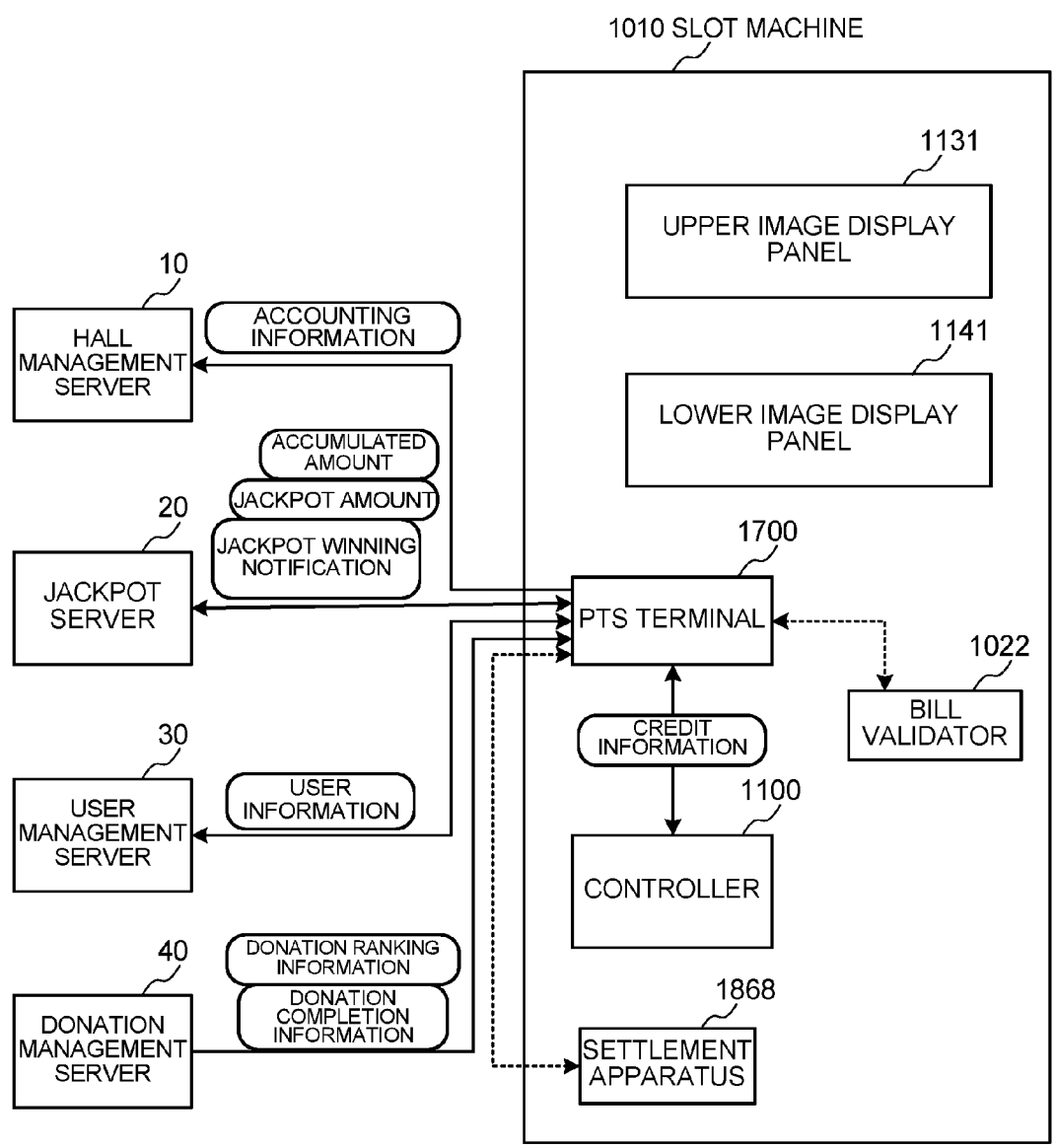
FIG. 2 is a diagram schematically illustrating a slot machine according to one embodiment of the present invention.

Next, with reference to FIG. 2, an outline of a gaming machine according to the embodiment of the present invention will be described. In FIG. 2, a configuration of a slot machine 1010 which is a gaming machine including a player tracking device is conceptually shown. It is to be noted that the player tracking device is a terminal for realizing a player tracking system, and in the present specification, hereinafter, this device is referred to as a PTS terminal. In addition, the PTS terminal in the present embodiment is configured to include a PTS front unit and a PTS main body. The PTS front unit is located on a front face of the gaming machine in an integrated manner and includes an operation part operated by a player. In addition, the PTS main body includes a control part connected to the PTS front unit by a cable or the like and is located so as to be remote from the PTS front unit. It is to be noted that although in the below description, a case where the slot machine is used as the gaming machine will be described, the present invention is not limited to the case of the slot machine and is applicable to gaming machines which conducts a variety of games.

As shown in FIG. 2, the slot machine 1010 has the PTS terminal 1700 mounted therein and further includes an upper image display panel 1131, a lower image display panel 1141, and a settlement apparatus 1868. The slot machine 1010 is connected via the PTS terminal 1700 to a hall management server 10, a jackpot server 20, a user management server 30, and a donation management server 40 via a network. In the present embodiment, one slot machine 1010 is provided with one PTS terminal 1700.

In the present embodiment, the PTS terminal 1700 is connected to a bill validator 1022 via a communication line (or the slot machine 1010).

In addition, based on a predetermined protocol, the PTS terminal 1700 conducts transmission and reception of data to and from a controller (the later-described controller 1100 of the slot machine 1010) and conducts data communication with the above-mentioned hall management server 10 and the like connected via the network. For example, from the PTS terminal 1700 to the controller 1100, information pertinent to a credit required to start a game, a stop command to instruct to stop a unit game upon predetermined presentation, and the like are transmitted. From the controller 1100 to the PTS terminal 1700, information pertinent to a credit as a game outcome (a payout or a prize), start notification of the unit game, and termination notification thereof are transmitted.

In addition, from the PTS terminal 1700 to the hall management server 10, accounting information including start notification and termination notification of a unit game, a drawing result, a Bet money amount, a payout money amount, and the like is transmitted. It is to be noted that although in the present embodiment, the accounting information of the slot machine 1010 is transmitted via the PTS terminal 1700 to the hall management server 10, said accounting information can also be transmitted, with no PTS terminal 1700 included, via a communication interface or via a device other than the PTS terminal 1700 from the controller 1100 to the hall management server 10.

Further, from the PTS terminal 1700 to the jackpot server 20, a calculated accumulation amount and jackpot winning notification indicating that winning of a jackpot has occurred are transmitted. From the jackpot server 20 to the PTS terminal 1700, in response to the reception of the jackpot winning notification, a jackpot amount is transmitted.

In addition, between the PTS terminal 1700 and the user management server 30, user information is transmitted and received. From the PTS terminal 1700 to the user management server 30, the user information including attribute information of a user and donation setting information, which are inputted by a user, is transmitted. On the other hand, from the user management server 30 to the PTS terminal 1700, in response to a user operation, in order to display the user information on the PTS terminal 1700, data stored in a user information table or the like is transmitted.

In addition, from the donation management server 40 to the PTS terminal 1700, donation completion information indicating that donation has been made and donation ranking information indicating ranking of donations are transmitted.

It is to be noted that in the present embodiment, data transmission and reception between the PTS terminal 1700 and the jackpot server 20, the user management server 30, and the donation management server 40 is controlled by the hall management server 10 via the hall management server 10.

Here, an outline of a game flow is as described below. First, by operating a card issuing terminal, a user obtains a user card (IC card). In addition, the user card can be provided by employing a variety of methods such as a method in which the user card is provided by a hotel in connection with a game facility. At this time, user information including a nickname and donation setting information may be inputted by a user. However, said user information can also be inputted from the PTS terminal or a kiosk terminal afterward. In addition, here, member registration in which a name and an address of a user are registered can be made. However, this member registration can also be made on the PTS terminal or the kiosk terminal afterward.

Thereafter, when a game is played on the gaming machine, a user inserts the user card into the PTS terminal 1700 of the slot machine 1010 and inputs cash there. It is to be noted that when a card balance is set on the user card (through a campaign, promotion, or the like) from the beginning, inputting of cash is not indispensable. When bills have been inputted to the bill validator 1022, the bill validator 1022 identifies a currency kind and a money amount and transmits currency kind data and money amount data as an identification result to the PTS terminal 1700. The PTS terminal 1700 calculates a credit for a game from the currency kind data and the money amount data and transmits the calculated credit to the controller 1100.

For example, in a case where a rate (line bet) of the slot machine 1010 is one PHP (Philippine Peso), when two 1000 PHP bills (a total of 2000 PHP) which are banknotes of the Philippines are inputted into the bill validator 1022, the calculation is performed based on the above-mentioned rate, a 2000 credit is obtained, and this data is transmitted to the controller 1100 and is displayed as the credit.

Based on the credit transmitted from the PTS terminal 1700, the controller 1100 executes a game. In accordance with the progress of the game, a credit balance is managed. For example, in a case where a number of lines of the slot machine 1010 is 30, a 30-credit is subtracted from the credit balance to play a unit game. When a payout has occurred in said game, that payout is added to the credit balance.

Here, in a case where the 30-credit is required to execute the unit game as mentioned above, the above-mentioned user who holds the 2000-credit obtained by inputting the 2000 PHP so as to be associated with the user card can execute the game at 66 times, which is obtained through the calculation using an equation: the 30 credit×66 times=1980 (assuming that a payout is zero), and a 20-credit remains as a fraction. In a case where the user terminates the game here, the 20-credit is printed out and converted to cash or the like or the user card having the 20-credit recorded thereon is taken out as a memorial as it is. However, many users leave with their user cards being unremoved from the card units. In such a case, a mechanism as in the game system 1 according to the present embodiment, with which a fraction is donated, can reduce a number of users who leave with their user cards being unremoved from the card units.

In addition, the above-mentioned credit in accordance with a game outcome is managed on the controller 1100, and when an instruction of cashing-out or the like is issued from a user, credit information is transmitted from the controller 1100 to the PTS terminal 1700, and on the PTS terminal 1700, calculation of a payout is performed based on the game outcome and a money amount paid out to a user is determined. The PTS terminal 1700 adds this determined money amount to a card balance of the user card, writes the card balance obtained as a result of the addition onto the user card, and ejects said user card. In addition, in accordance with the execution of the game or the like, the user card is provided with predetermined points.

In addition, the PTS terminal 1700 receives a credit in accordance with a Bet number and a game outcome for each game from the controller 1100 (in real time or at predetermined timing) and (after the conversion thereof to predetermined currency as needed) transmits the obtained accounting information to the hall management server 10. At this time, together with the accounting information, an identification ID of that user and a machine ID for identifying the slot machine 1010 are transmitted to the hall management server 10. The accounting information transmitted as mentioned above is grasped and accumulated as a game history of the corresponding user on the hall management server 10.

In addition, at timing of cashing-out or at predetermined timing, the PTS terminal 1700 can transmits a card balance of the user card as accounting information to the hall management server 10. At this time, together with the accounting information, an identification ID of that user and a machine ID for identifying the slot machine 1010 are transmitted to the hall management server 10. The accounting information transmitted as mentioned above is managed as the card balance of the corresponding user on the hall management server 10. Through this processing, a card balance which a user holds is invariably managed. It is to be noted that without receiving the above-mentioned card balance from the PTS terminal 1700, the hall management server 10 may grasp the card balance of each user by accumulating the above-mentioned accounting information (that is, information based on a credit in accordance with a Bet number and a game outcome).

When a user plays a game next, the PTS terminal 1700 reads an inserted user card and reads a card balance stored in the user card. The read card balance is converted to a credit, which is transmitted to the controller 1100. As in the above description, accounting information is transmitted from the PTS terminal 1700 to the hall management server 10.

The user can make settlement at a cashier counter or the like based on the money amount (card balance) stored on the user card as needed. In addition, as in the above-described slot machine 1010, in a case where the settlement apparatus 1868 is included therein, on said slot machine 1010, the settlement can be made by using the user card.

On the other hand, a user can start a game without using a user card, and in such a case, a game flow is as described below. The user inputs cash into the PTS terminal 1700 of the slot machine 1010. When the bills have been inputted, the bill validator 1022 identifies a currency kind and a money amount and transmits currency kind data and money amount data as an identification result to the PTS terminal 1700. The PTS terminal 1700 calculates a credit for a game from the currency kind data and the money amount data and transmits the calculated credit to the controller 1100.

Based on the credit transmitted from the PTS terminal 1700, the controller 1100 executes the game. A credit in accordance with a game outcome is transmitted from the controller 1100 to the PTS terminal 1700, calculation for paying-out based on the game outcome is performed on the PTS terminal 1700, and a money amount to be paid out to a player is determined. On the PTS terminal 1700, this determined money amount is written onto a new IC card stocked in the slot machine 1010, and the IC card is ejected. As described above, here, the user gets the IC card for the first time.

In addition, it is also possible for the user to obtain a user card (an IC card or an IC ticket) for which a money amount is charged by inputting of cash or the like. In this case, a game can be played by using this user card.

In addition, with respect to the user playing the game by using the above-mentioned user card, as in the above description, accounting information is transmitted from the PTS terminal 1700 to the hall management server 10, and a game history and a card balance are managed.

[Description of Outline of Kiosk Terminal]

Figure 3:
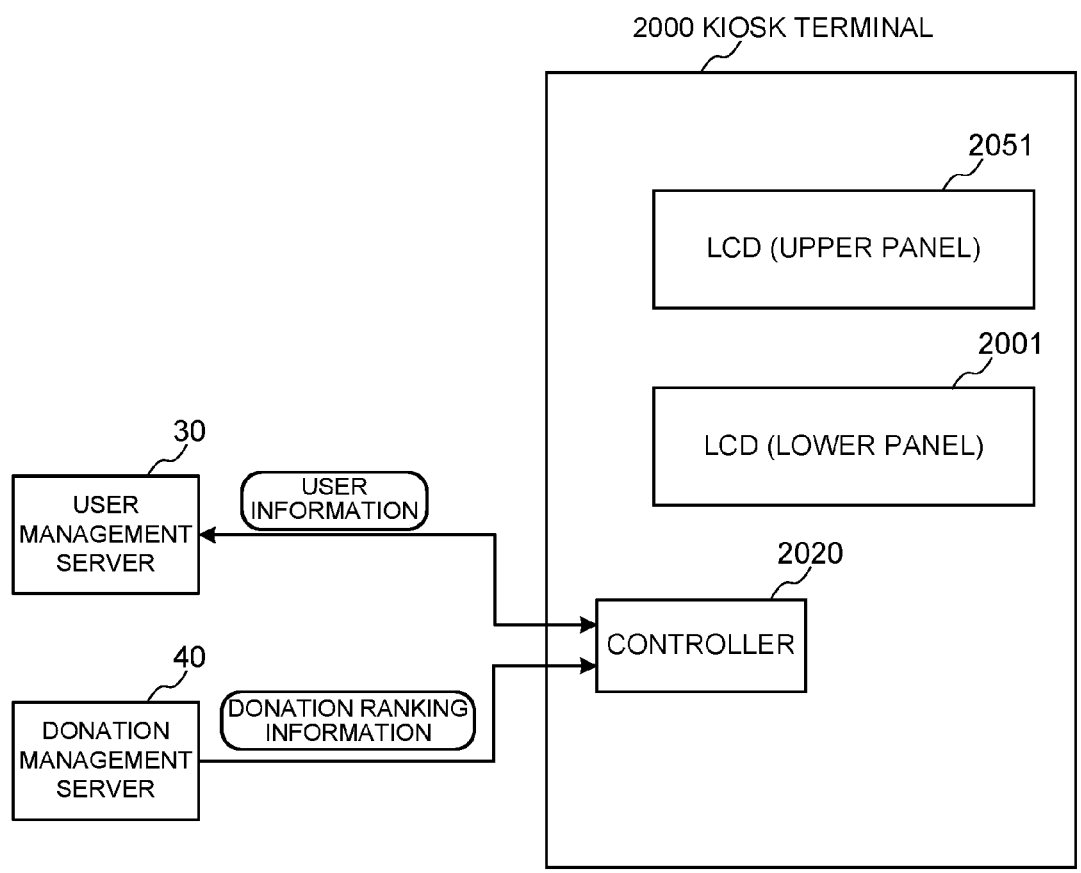
FIG. 3 is a diagram schematically illustrating a kiosk terminal according to one embodiment of the present invention.

Next, with reference to FIG. 3, an outline of a kiosk terminal according to an embodiment of the present invention will be described. In FIG. 3, a configuration of the kiosk terminal 2000 is conceptually shown. It is to be noted that the kiosk terminal 2000 is, for example, an information terminal which is installed in a variety of stores and is used, for example, to display information or the like useful for customers and can be connected to a computer or the like for administering and managing a store via a network.

As shown in FIG. 3, the kiosk terminal 2000 includes an LCD 2051 constituting an upper panel and an LCD 2001 constituting a lower panel and further, includes a controller 2020. The controller 2020 of the kiosk terminal 2000 is connected to a user management server 30 and a donation management server 40 via a network (and a hall management server 10 for controlling communication).

In addition, the kiosk terminal 2000 transmits and receives user information to and from the user management server 30. From the kiosk terminal 2000 to the user management server 30, user information inputted by a user is transmitted. On the other hand, from the user management server 30 to the kiosk terminal 2000, data stored in a user information table or the like is transmitted in order to display user information on the kiosk terminal 2000 in accordance with a user operation.

Further, from the donation management server 40 to the kiosk terminal 2000, data edited based on data stored in a donation track record management table or the like is transmitted in order to display donation ranking information on the kiosk terminal 2000 in accordance with a user operation or the like.

It is to be noted that it is shown in FIG. 3 that on the kiosk terminal 2000, the user information and the donation ranking information are handled, and similarly thereto, also on a signage 3000, displaying or the like of the user information and the donation ranking information is conducted.

In FIG. 1, the kiosk terminal 2000 or the signage 3000 is shown as U-11, U-21, and U-31. The kiosk terminal 2000 or the signage 300 is located in, for example, an end part of each zone (an end part of a "bank" in which gaming machines are installed in a grouped manner) and is operated by a user who has left a gaming machine.

[Description of Function Flow Diagram]

Figure 4:
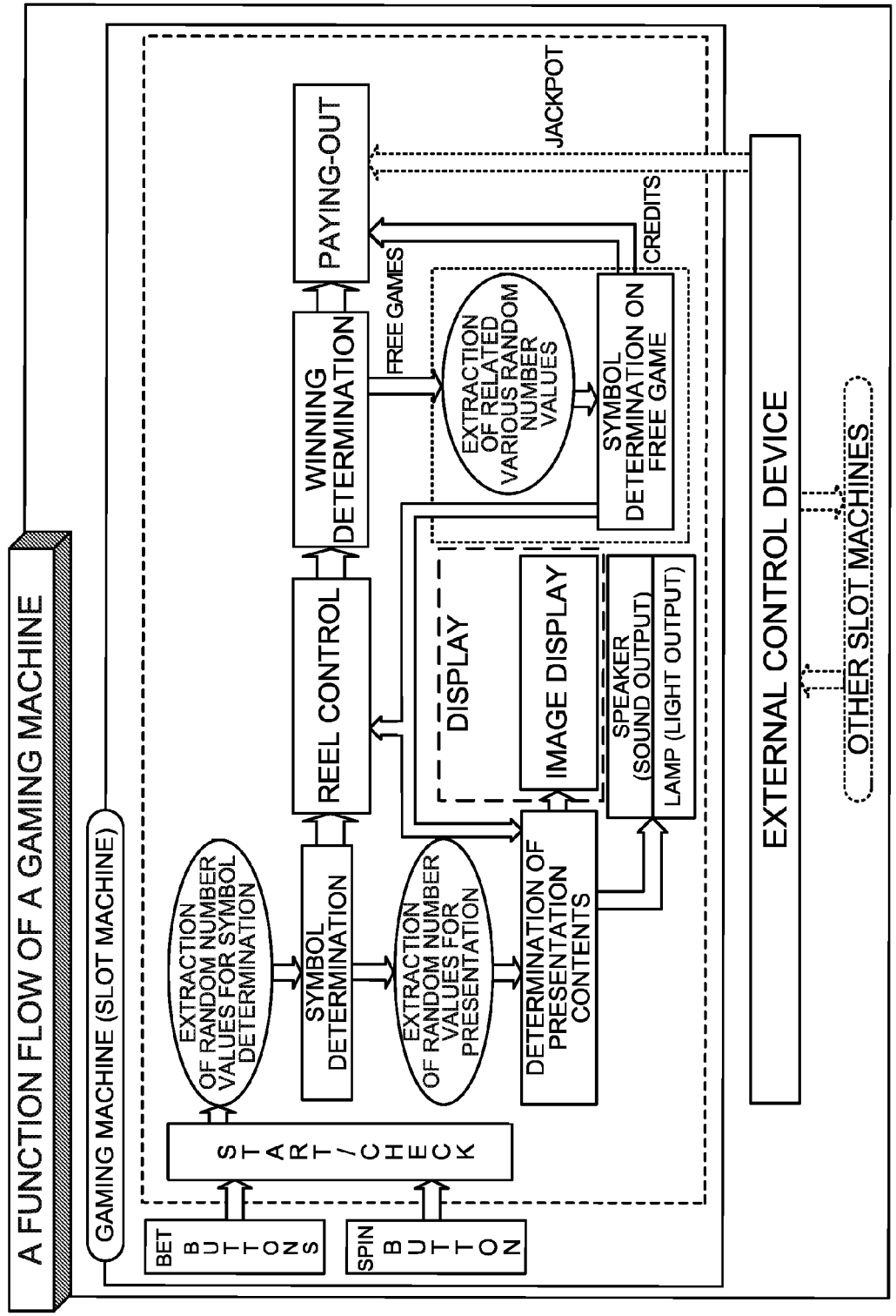
FIG. 4 a diagram showing basic functions of a gaming machine according to one embodiment of the present invention.

With reference to FIG. 4, basic functions of a gaming machine (slot machine 1010) according to one embodiment of the present invention will be described. As shown in FIG. 4, the slot machine 1010 is connected to an external control device (for example, a jackpot server 20) so as to allow data communication, and the external control device is connected to a plurality of other slot machines 1010 installed in a game facility so as to allow data communication.

<Start-Check>

First, the slot machine 1010 checks whether or not a BET button has been pressed by a player, and subsequently checks whether or not a spin button has been pressed by a player.

<Symbol Determination>

Next, when the spin button has been pressed by a player, the slot machine 1010 extracts random number values for symbol determination and determines symbols to be displayed to a player with respect to a plurality of reels at the time of stopping rotation of the reels.

<Reel Control>

Next, the slot machine 1010 starts the rotation of each of the reels and then stops the rotation such that the determined symbols are displayed to a player.

<Winning Determination>

Next, when the rotation of each of the reels has been stopped, the slot machine 1010 determines whether or not a combination of symbols displayed to a player is a combination related to winning.

<Paying-Out>

Next, when the symbols displayed to a player is the combination related to winning, the slot machine 1010 provides benefits according to the combination for a player. For example, when a combination of symbols related to paying-out of coins has been displayed, the slot machine 1010 adds a number of coins corresponding to the combination of symbols to a number of credits.

In addition, when a combination of symbols related to a jackpot trigger has been displayed, the slot machine 1010 starts a bonus game. It is to be noted that, in the present embodiment, a game (free game) in which a drawing related to the above-mentioned determination of to-be stopped symbols is conducted is conducted as a bonus game at a predetermined number of times without using coins.

In addition, when a combination of symbols related to a jackpot trigger has been displayed, the slot machine 1010 pays out coins of a jackpot amount to a player. The jackpot refers to a function which accumulates parts of coins used by players at the respective gaming machines as the amount of jackpot and which, when the jackpot trigger has been established in any of the slot machine 1010, pays out coins of the accumulated amount of the jackpot to that slot machine 1010. The slot machine 1010 calculates the amount (accumulation amount) to be accumulated to the amount of jackpot for each game (unit game) and transmits the calculated amount to the external control device. The external control device accumulates to the jackpot amount the accumulation amounts transmitted from the respective gaming machines.

Here, the unit game refers to a series of operations conducted from when the acceptance of betting is started through a player's pressing-down of the BET button to when winning is likely to be established.

<Determination of Presentation>

The slot machine 1010 conducts presentation through displaying of images by a display, outputting of light by a lamp, and outputting of sound by a speaker. The slot machine 1010 extracts random number values for the presentation and determines presentation contents based on symbols or the like determined by a drawing.

[Structure of Slot Machine]

Next, with reference to FIG. 5, an overall structure of a slot machine 1010 will be described.

On the slot machine 1010, as game media, bills or electronic valuable information corresponding to these are used. In particular, in the present embodiment, credit-related data such as cash data stored in an IC card 1500 corresponding to the above-described user card is used. It is to be noted that although the slot machine 1010 has a structure in which coins are not used as the game media, this is merely one example, and the slot machine 1010 may be configured as a slot machine on which a variety of game media including the coins can be used.

The slot machine 1010 is provided with a housing which includes a cabinet 1011 and a top box 1012 attached on an upper side of the cabinet 1011. Main parts of the cabinet 1011 and the top box 1012 are formed of metallic plate members. In addition, on a front face of the cabinet 1011, an upper door 1142 and a lower door 1144 are provided.

On a lower side of a front face of the upper door 1142, a lower image display panel 1141 is provided. The lower image display panel 1141 is constituted of a liquid crystal panel and configures a display.

In addition, on the front face of the upper door 1142 and above the above-mentioned lower image display panel 1141, a symbol display window 1135 is provided. Through the symbol display window 1135, a reel apparatus M1 which is provided inside of the cabinet 1011 and is constituted of five reels M1*a* to M1*e* is visually recognizable. On a peripheral surface of each of the reels, 12 symbols are depicted. The 12 symbols are arranged in succession along a direction in which each of the reels of the reel apparatus M1 is rotated and form a symbol array. Each of the reels M1*a* to M1*e* is rotated, the symbols depicted on each of the reels are thereby rotated in a longitudinal direction, and thereafter, the rotation is stopped, thereby allowing the symbols to be rearranged.

Here, "rearrangement" means a state in which after the arrangement of the symbols has been released, the symbols are arranged again. "Arrangement" means a state in which the symbols can be visually confirmed by an external player. The slot machine 1010 executes the so-called slot game in which based on the state of the arrangement of the symbols on the reels M1*a* to M1*e* which have been rotated and thereafter stopped, a payout in accordance with a predetermined combination is awarded.

It is to be noted that although in the present embodiment, the slot machine 1010 is a slot machine which includes a mechanical reel type reel apparatus M1, the slot machine 1010 may be a slot machine which includes a video reel type reel apparatus displaying pseudo reels, and the slot machine 1010 may be a slot machine in which the video reel type reel apparatus and the mechanical reel type reel apparatus are combined.

On a front face of the top box 1012, an upper image display panel 1131 is provided. The upper image display panel 1131 is constituted of a liquid crystal panel and configures a display. The upper image display panel 1131 displays images related to presentation and images showing introduction of contents of games and rules thereof.

On the above-mentioned lower image display panel 1141, arranged are a number-of-credits display part which indicates a state of credits (for example, a total number of credits which a player currently has) as necessary and a fraction display part which indicates a fraction, and a variety of pieces of information pertinent to a game such as contents of betting are displayed. Here, "credits" are virtual game media on a game, to be used when a player makes betting. In addition, the "fraction" is a money amount which is not converted to a credit because an inputted money amount is insufficient and in other words, is a money amount which is less than a minimum unit of game media required to play one game on the slot machine 1010.

When the IC card 1500 has been inserted into the later-described PTS terminal 1700, a number of credits in accordance with balance data stored in the IC card is displayed on the number-of-credits display part, and a fraction obtained in accordance with the balance data stored in the IC card is displayed on the fraction display part. It is to be noted that the above-mentioned balance data is stored in the later-described card management table so as to be associated with an identification ID of the user card. In addition, data of the number of credits and the fraction may be stored on the IC card and be managed by the card management table.

Here, the IC card (user card) is, for example, a non-contact IC card and has incorporated thereon an IC (Integrated Circuit) for recording and computing a variety of pieces of data to calculate a number of credits and the like and enables short-range wireless communication using, for example, an RFID (Radio Frequency Identification) technology such as NFC (Near Field Communication). By using the IC card 1500, a player can have the credit-related data and further, freely carries this with him or her among different slot machines. A player inserts the IC card 1500 into the PTS terminal 1700 of the slot machine 1010 and thereby uses the credit-related data (money amount data) stored on the IC card 1500, thereby allowing a player to play a game such as a unit game on the slot machine 1010.

It is to be noted that it may be made possible for a player to deposit cash such as coins and bills as cash data on the IC card 1500 by using an apparatus installed in a game facility.

On right and left sides of an uppermost portion of a front face of the lower door 1144, speakers 1112 are respectively provided. On the slot machine 1010, presentation of a unit game is executed through displaying of images by the upper image display panel 1131, outputting of sound by the speakers 1112, outputting of light by a lamp (not shown), and the like.

In addition, on the front face of the lower door 1144 and below said speaker 1112, a PTS front unit 1700*a* which is a front part of the PTS terminal 1700 is incorporated. On a right side of the PTS front unit 1700*a*, a printed matter discharge outlet 1136 and a bill insertion slot 1137 are located.

Further, on the front face of the lower door 1144, below the PTS front unit 1700*a*, a control panel 1030 is located. The control panel 1030 includes a base plate which is of a flat plate shape. On said base plate, a plurality of operation buttons (i.e. a spin button 1031, a MAX BET button 1032, a 5-BET button 1033, a 3-BET button 1034, a 2-BET button 1035, a 1-BET button 1036, a HELP button 1037, and a CASHOUT button 1038) are located.

In order to allow a player to easily perform a pressing operation of the spin button 1031 and easily identify the spin button 1031, the spin button 1031 is formed so as to be of a circular shape whose size is larger than those of the other buttons. The spin button 1031 is located in a right end portion of the base plate and has a function to start a game through a pressing operation.

The MAX BET button 1032 to 1-BET button 1036 are located on a left side of the spin button 1031 in an aligned manner at equal intervals. Each of these operation buttons is formed so as to be of a quadrangular shape. The MAX BET button 1032 located in a right end portion has a function to allow a game to be played with a maximum number of bets (Bet number) such as a decuple through a pressing operation. The 5-BET button 1033 has a function to allow a game to be played with a quintupled number of Bets through a pressing operation. The 3-BET button 1034 has a function to allow a game to be played with a tripled number of Bets through a pressing operation. The 2-BET button 1035 has a function to allow a game to be played with a doubled number of Bets through a pressing operation. The 1-BET button 1036 has a function to allow a game to be played with one BET through a pressing operation.

The HELP button 1037 and the CASHOUT button 1038 are located in a longitudinal direction in a left end portion of the base plate. The HELP button 1037 has a function to display HELP information indicating a game method and the like on the lower image display panel 1141 or the like through a pressing operation. In addition, the CASHOUT button 1038 has a function to store a money amount obtained based on a credit or the like on the IC card 1500 and to output the money amount or the like in the form of a printed matter through a pressing operation.

Further, in the slot machine 1010, in side portions of the cabinet 1011, air ventilation slots 1133 and an air intake slot 1134 are located and in a side portion of the top box 1012, air ventilation slots 1132 are located. In addition, in an inside portion of the cabinet 1011, which corresponds to a position of the air ventilation slots 1133, a fan (not shown) is arranged, and similarly, in an inside portion of the top box 1012, which corresponds to a position of the air ventilation slots 1132, a fan (not shown) is arranged. These fans allow air inside of the slot machine 1010 to be discharged to an outside and take in external air from the air intake slot 1134, and through such air circulation, a temperature inside of the slot machine 1010 is adjusted.

In addition, in the side portion of the cabinet 1011 of the slot machine 1010, provided are a key cylinder 1138 into which a key used to open the upper door 1142 and the lower door 1144 is inserted and a door lock bar 1139 with which the upper door 1142 and the lower door 1144 are locked.

Next, with reference to FIG. 6, the slot machine 1010 in a state in which the upper door 1142 and the lower door 1144 are opened and an internal structure of the cabinet 1011 will be described.

Figure 6:
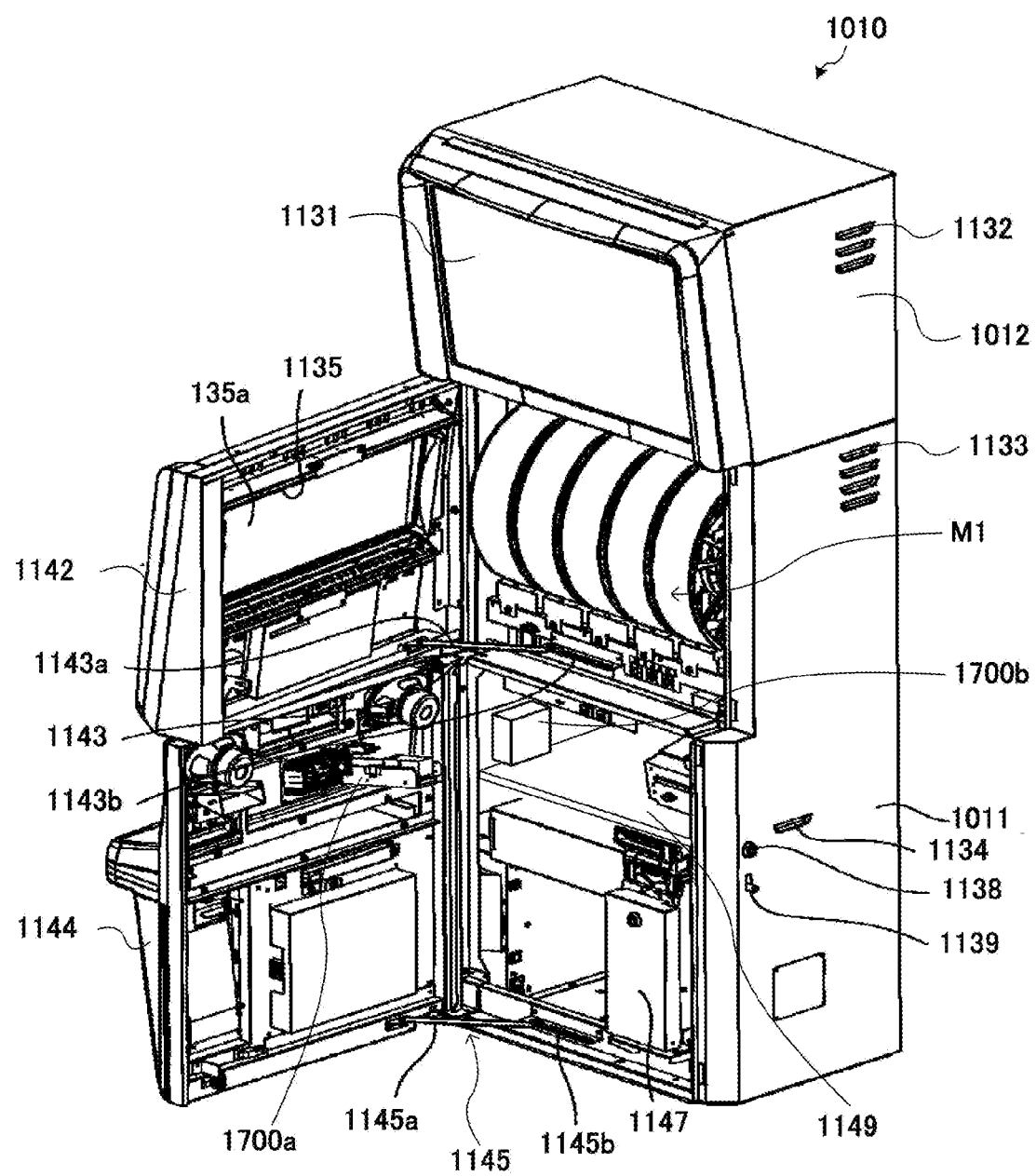
FIG. 6 is a perspective view illustrating a state in which an upper door and a lower door of the slot machine according to the one embodiment of the present invention are opened.

FIG. 6 is a perspective view illustrating the slot machine 1010 in the state in which the upper door 1142 and the lower door 1144 are opened. As shown in FIG. 6, on the front face of the top box 1012 of the slot machine 1010, as described above, the upper image display panel 1131 is located, and in the side portion of the top box 1012, the air ventilation slots 1132 are located. The cabinet 1011 of the slot machine 1010 is formed so as to be of a box-like shape with the front face being opened, and in an upper portion of the front face, the upper door 1142 is located, and in a lower portion of the front face, the lower door 1144 is located.

In addition, in an upper portion of the side portion of the cabinet 1011, the air ventilation slots 1133 are located, and in a middle portion of the side portion of the cabinet 1011, the air intake slot 1134 is located. Further, in the vicinity of the air intake slot 1134, the above-mentioned key cylinder 1138 and door lock bar 1139 are located.

As shown in FIG. 6, in a left end portion of the cabinet 1011, the cabinet 1011 pivotally supports the upper door 1142 and the lower door 1144 in a rotatable manner. On an upper end portion and a lower end portion of the upper door 1142, the upper door 1142 and the cabinet 1011 are pivotally supported in a rotatable manner and are coupled by an upper door opening mechanism 1143. The upper door opening mechanism 1143 is located on a lower side of the upper door 1142 and has a rod member 1143a whose one end portion is pivotally supported in a rotatable manner onto a rear face wall of the upper door 1142 and a slide member 1143b which is laterally provided on a front face side of the cabinet 1011. The slide member 1143b engages the other end portion of the rod member 1143a in a horizontally movable manner, temporarily stops the upper door 1142 at a predetermined opening angle, and when a predetermined force or more is applied externally in a direction in which the upper door 1142 is closed, moves the upper door 1142 in a rotatable manner in a closing direction.

In addition, on an upper end portion and a lower end portion of the lower door 1144, the lower door 1144 and the cabinet 1011 are pivotally supported in a rotatable manner and are coupled by a lower door opening mechanism 1145. The lower door opening mechanism 1145 is located on a lower side of the lower door 1144 and has a rod member 1145a whose one end portion is pivotally supported in a rotatable manner onto a rear face wall of the lower door 1144 and a slide member 1145b which is laterally provided on a front face side of the cabinet 1011. The slide member 1145b engages the other end portion of the rod member 1145a in a horizontally movable manner, temporarily stops the lower door 1144 at a predetermined opening angle, and when a predetermined force or more is applied externally in a direction in which the lower door 1144 is closed, moves the lower door 1144 in a rotatable manner in a closing direction.

In the upper door 1142, as described above, the symbol display window 1135 is arranged, the symbol display window 1135 is covered with a reel cover 1135a. The reel cover 1135a includes: for example, a base panel such as a transparent liquid crystal panel and a transparent panel; and a touch panel provided on a front face of the base panel. The symbol display window 1135 covered with the reel cover 1135a allows 15 symbols in areas of 5 columns×3 rows among symbols depicted on peripheral surfaces of the respective reels of the reel apparatus M1 to be made viewable externally.

In addition, in FIG. 6, the PTS front unit 1700a located in the middle portion of the lower door 1144 is shown. With the lower door 1144 being closed, the PTS front unit 1700a comes to be housed inside of the cabinet 1011. A configuration of the PTS terminal 1700 including the PTS front unit 1700a will be described below in detail.

In a right lower portion of the cabinet 1011, a bill stocker 1147 is housed. The bill insertion slot 1137 shown in FIG. 5 communicates with an insertion slot (an insertion slot of the bill validator 1022) of the bill stocker 1147. The bill stocker 1147 has a function, for example, to pull in bills inputted into the bill insertion slot 1137; thereafter, to determine authenticity of the bills; if any of the bills are bogus, to discharge the bogus bills from the bill insertion slot 1137; and if the bills are authentic, to classify the bills according to kinds of the bills and to house the bills. In addition, in a middle portion of the cabinet 1011, a shelf plate member 1149 which partitions inner space of the cabinet 1011 is located. The shelf plate member 1149 is formed of a metallic thin plate.

As shown in FIG. 6, a PTS main body 1700b is located, for example, inside of the cabinet 1011 and above the shelf plate member 1149. The PTS main body 1700b has a magnet with which the PTS main body 1700b is attached in contact with an inner side face of the cabinet 1011. At this time, a portion of the inner side face of the cabinet 1011, which comes in contact with or close to said magnet, is formed of at least a metallic member. It is to be noted that although the PTS front unit 1700a and the PTS main body 1700b are connected by a predetermined network (for example, a predetermined cable), the illustration thereof is omitted here.

Figure 5:
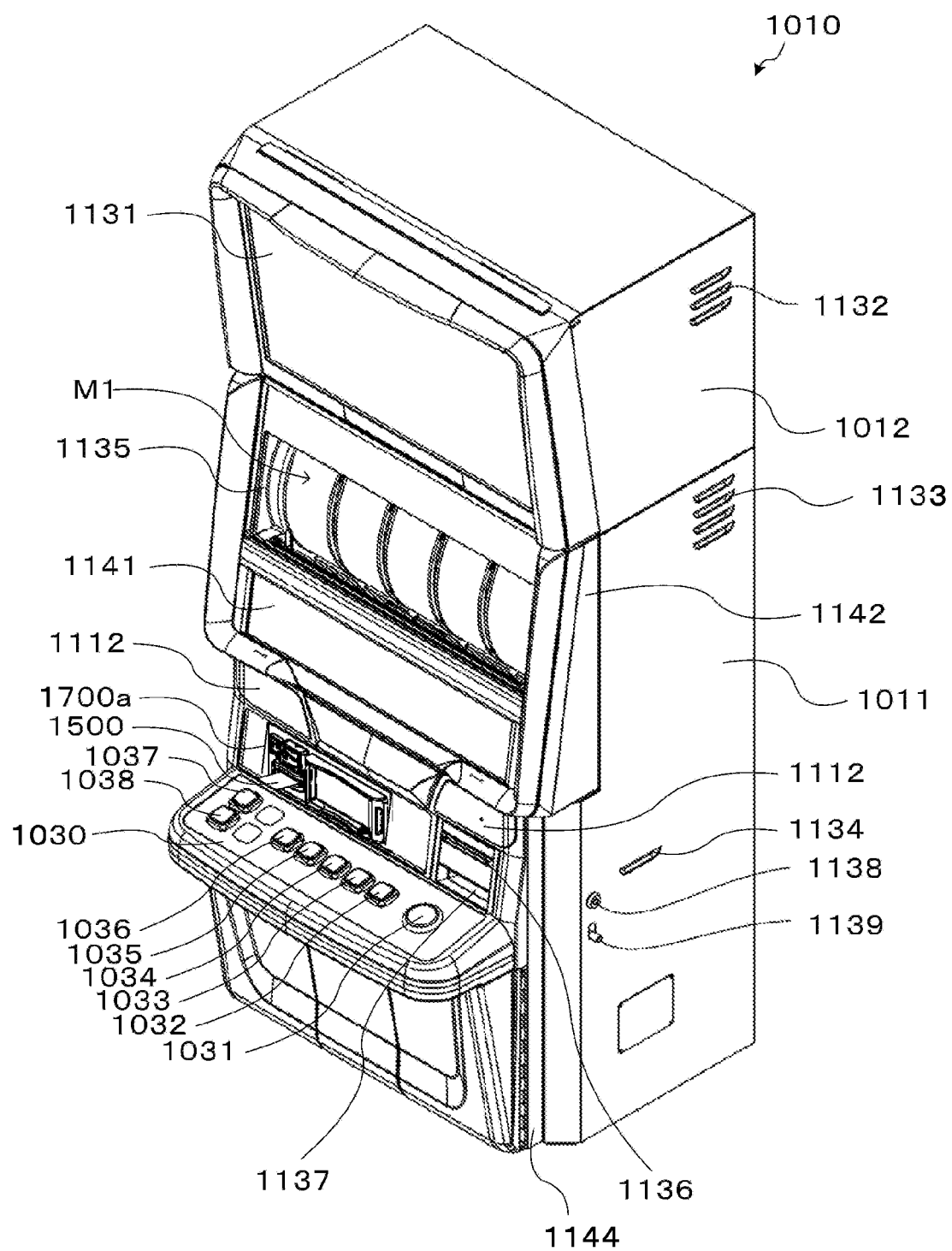
FIG. 5 is a perspective view illustrating an overall structure of the slot machine according to the one embodiment of the present invention.

It is to be noted that although hereinabove, the slot machine 1010 is described as the apparatus having the configuration as shown in FIG. 5 and FIG. 6, a variety of other configurations may be adopted.

[Configuration of PTS Terminal]

Next, with reference to FIG. 7, a configuration of a PTS front unit 1700a will be described. A PTS terminal 1700 includes the PTS front unit 1700a incorporated into a lower door 1144 of a slot machine 1010 and a PTS main body 1700b housed inside of a cabinet 1011 of the slot machine 1010. The PTS front unit 1700a and the PTS main body 1700b are connected by a predetermined network (for example, a predetermined cable). It is to be noted that the PTS terminal 1700 uses a data interface which is commonalized for gaming machines to communicate data and can be thereby incorporated into each of a variety of types of gaming machines manufactured by a variety of makers.

Figure 7:
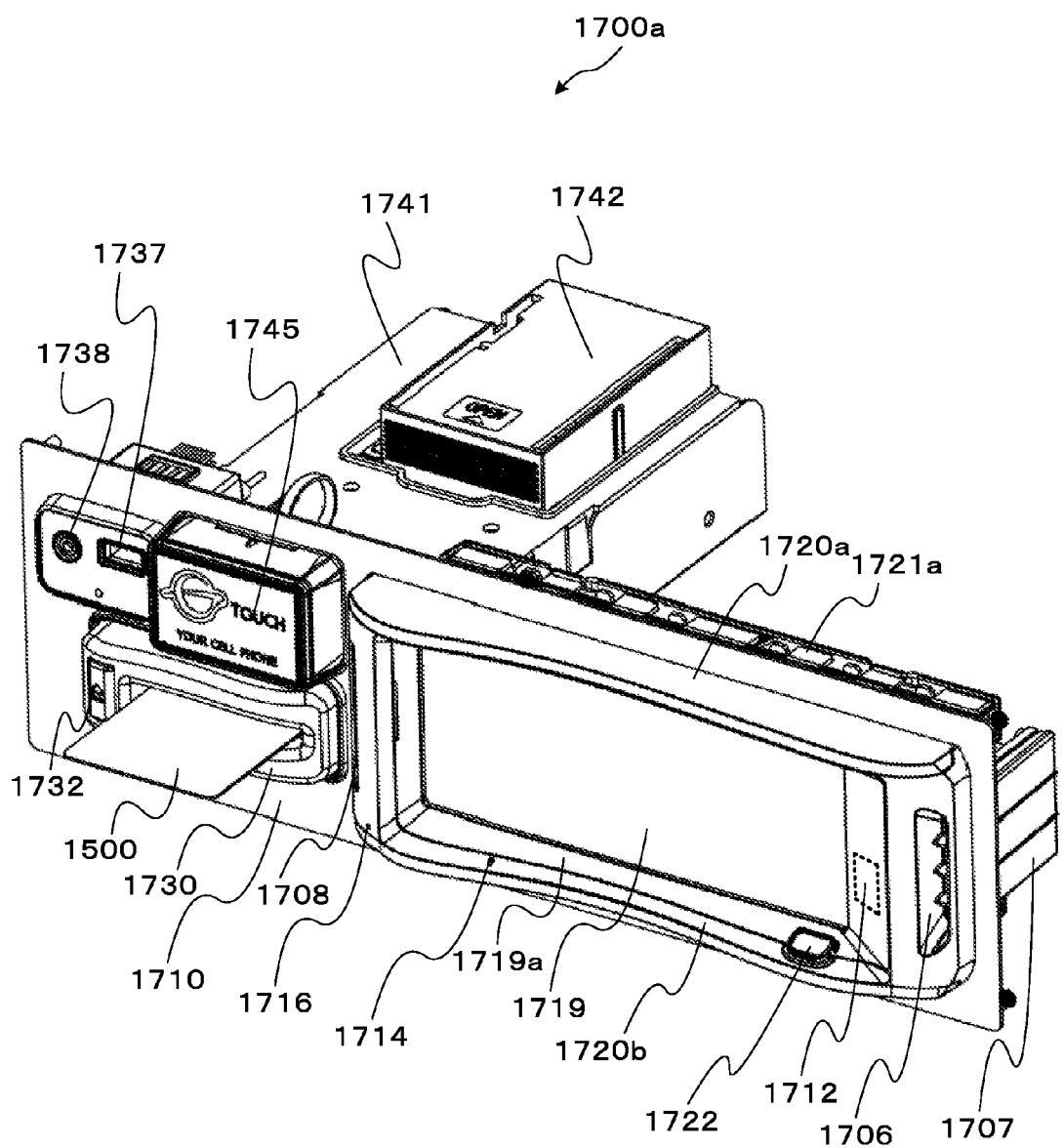
FIG. 7 is a perspective view illustrating a PTS front unit of a PTS terminal which is incorporated into the slot machine according to the one embodiment of the present invention.

FIG. 7 is a diagram illustrating only the PTS front unit 1700a shown in FIG. 5 and FIG. 6 in an enlarged manner. As shown in FIG. 7, the PTS front unit 1700a has a panel 1710, respective parts located on a front face of the panel 1710 are viewable by a player, and members located on a rear face of the panel 1710 are housed inside of the cabinet 1011 of the slot machine 1010 and are not viewable by a player.

On a right side of the front face of the panel 1710, an LCD 1719 having a touch panel function is provided. The LCD 1719 displays, for example, information related to users and information for the users, and a size of a screen thereof is 6.2 inches (approximately 15.7 cm). In addition, around the LCD 1719, an LCD cover 1719a is provided. It is to be noted that although in this example, the LCD 1719 is configured to have the touch panel function, instructions issued by a player may be inputted with other input devices such as a keyboard, a mouse, and buttons.

In addition, above the LCD 1719 and the LCD cover 1719a, a light emitting plate 1720a which is connected to LEDs and emits light is provided. The light emitting plate 1720a is formed of, for example, polycarbonate and is connected to a plurality of (for example, seven) full-color LEDs 1721a located on a rear side of the panel 1710 and emits light in accordance with light emitting of the full-color LEDs 1721a.

Below the LCD 1719 and the LCD cover 1719a, similarly, a light emitting plate 1720b which is connected to LEDs and emits light is provided. The light emitting plate 1720b is formed of, for example, polycarbonate and is connected to a plurality of (for example, seven) full-color LEDs 1721b (not shown) located on the rear side of the panel 1710 and emits light in accordance with light emitting of the full-color LEDs 1721b.

In addition, on a right side of the LCD 1719, an image pickup window 1712 is provided, and a human body detection camera 1713 (not shown) located inside of the LCD cover 1719a or on the rear side of the panel 1710 shoots an image of a player via this image pickup window 1712. The image pickup window 1712 may be also formed of, for example, a half mirror material which has undergone shield processing such as smoke processing.

In addition, at a position of the LCD cover 1719a, which is below the LCD 1719 and is on a right side, a home button 1722 is provided. The home button 1722 is a button to shift a screen displayed on the LCD 1719 to a predetermined upper level screen.

Further, at a position of the LCD cover 1719a, which is on the right side of the LCD 1719, a speaker duct 1706 is provided, and in a portion on the rear side of the panel 1710, which corresponds to a position of the speaker duct 1706, a bass reflex type speaker 1707 is provided. Similarly, on a left side of the LCD 1719, a speaker duct 1708 is provided, and in a portion on the rear side of the panel 1710, which corresponds to a position of the speaker duct 1708, a bass reflex type speaker 1709 (not shown) is provided. These speakers are speakers dedicated to the PTS terminal 1700 and are provided separately from the speakers 1112 for a slot machine game provided on the slot machine 1010. These speakers are capable of realizing presentation and a phone call by voice and of outputting notification sound for notifying a player that an IC card 1500 is left unremoved. It is to be noted that since the configuration thereof is made such that sound from the speakers passes through the above-described speaker ducts 1706 and 1708 and is heard in front thereof (on a player side) in a stereophonic manner, the speakers can be installed on the rear side of the panel 1710 and as a result, space-saving of the PTS front unit 1700a (panel face) can be realized.

In addition, at positions of the LCD cover 1719a, which are below the LCD 1719 and are on a left side, a microphone opening part 1714 and a microphone opening part 1716 are provided. In portions corresponding to the microphone opening part 1714 and the microphone opening part 1716 inside of the LCD cover 1719a, microphones 1715 and 1717 (not shown) are provided, respectively.

In a left lower portion of the front face of the panel 1710, a card insertion slot 1730 which allows the IC card 1500 to be inserted thereto and removed therefrom is provided. In a card insertion part of the card insertion slot 1730, full-color LEDs 1731 (not shown) are provided, which are lit up in a plurality of colors, thereby allowing the remaining number of IC cards 1500 stacked in the later-described card stacker 1742 to be notified. At the card insertion slot 1730, an eject button 1732 is provided, and a red full-color LED 1733 (not shown) is provided in the vicinity of the eject button 1732, and when lit up, the LED 1733 allows a position and a way of an ejection operation of the eject button 1732 to be found.

In addition, in positions on a rear side of the panel 1710, which correspond to the card insertion slot 1730, a card unit 1741 and the card stacker 1742 are provided, and the card insertion slot 1730 is configured as one part of the card unit 1741. In the card stacker 1742, approximately 30 IC cards 1500 can be retained, and when a player who has newly played a unit game makes settlement of credits, an IC card 1500 retained in the card stacker 1742 is taken out and ejected to the card insertion slot 1730.

For the IC card 1500 taken in from the card insertion slot 1730 and retained in the card unit 1741, upon the settlement of credits, credit information (for example, a card balance calculated based on a number of credits, etc.) is updated by NFC or the like, and thereafter, the IC card 1500 is ejected from the card insertion slot 1730. While a player is playing a unit game, the IC card 1500 is completely housed inside of the card unit 1741.

In addition, in a case where upon the settlement of credits, even though the IC card 1500 has been left unremoved, absence of a player is detected by the human body detection camera or the like for a predetermined period of time, the configuration may also be arranged such that the IC card 1500 can be retained in the card stacker 1742. Thus, for example, even in a case where a player has learned that the remaining amount of a card balance is small and yet has left his or her seat with the IC card 1500 left unremoved or in a case where a player has simply forgotten to remove the IC card 1500 and has left his or her seat, it does not occur that the IC card 1500 is left retained in the card unit 1741 over a long period of time.

In positions on a left upper side of the front face of the panel 1710, a USB terminal 1737 and an audio terminal 1738 are provided. The USB terminal 1737 is configured to allow battery charge or the like by connecting a USB device thereto. In addition, the audio terminal 1738 is, for example, a four-pole terminal, and a headset is inserted thereto, thereby allowing a phone call with other person to be made with headphones and the microphones. In addition, the audio terminal 1738 may be configured to be a two-pole or three-pole terminal, thereby allowing sound to be listened with the headphones.

On the front face of the panel 1710 and on the left side of the LCD 1719, a touch unit 1745 is provided. The touch unit 1745 includes an RFID module which can function as a writer to write data through data communication to an IC device (for example, a non-contact IC card, a mobile phone and a smartphone, each of which has a communication function by NFC, and the like) including an IC chip and which can function as a reader to read data through the data communication from said IC device. In addition, in four corners of the front face of the touch unit 1745, LEDs 1746 (not shown) are located, respectively. In addition, besides the touch unit 1745 or instead of the touch unit 1745, an information recording medium reading device for reading information stored in an information recording medium such as a magnetic card may be provided. In this case, instead of the IC card 1500, the magnetic card or the like may be a user card.

As described above, the PTS front unit 1700*a* according to the present embodiment is formed such that the variety of devices having the microphone function, the camera function, the speaker function, the display function, and the like are integrated into one unit, thus realizing space-saving. In addition, although hereinabove, the PTS front unit 1700*a* is described as the apparatus having the configuration shown in FIG. 7, the PTS front unit 1700*a* may be each of apparatuses having a variety of other configurations.

[Configuration of Circuitry Included in Slot Machine]

Figure 8:
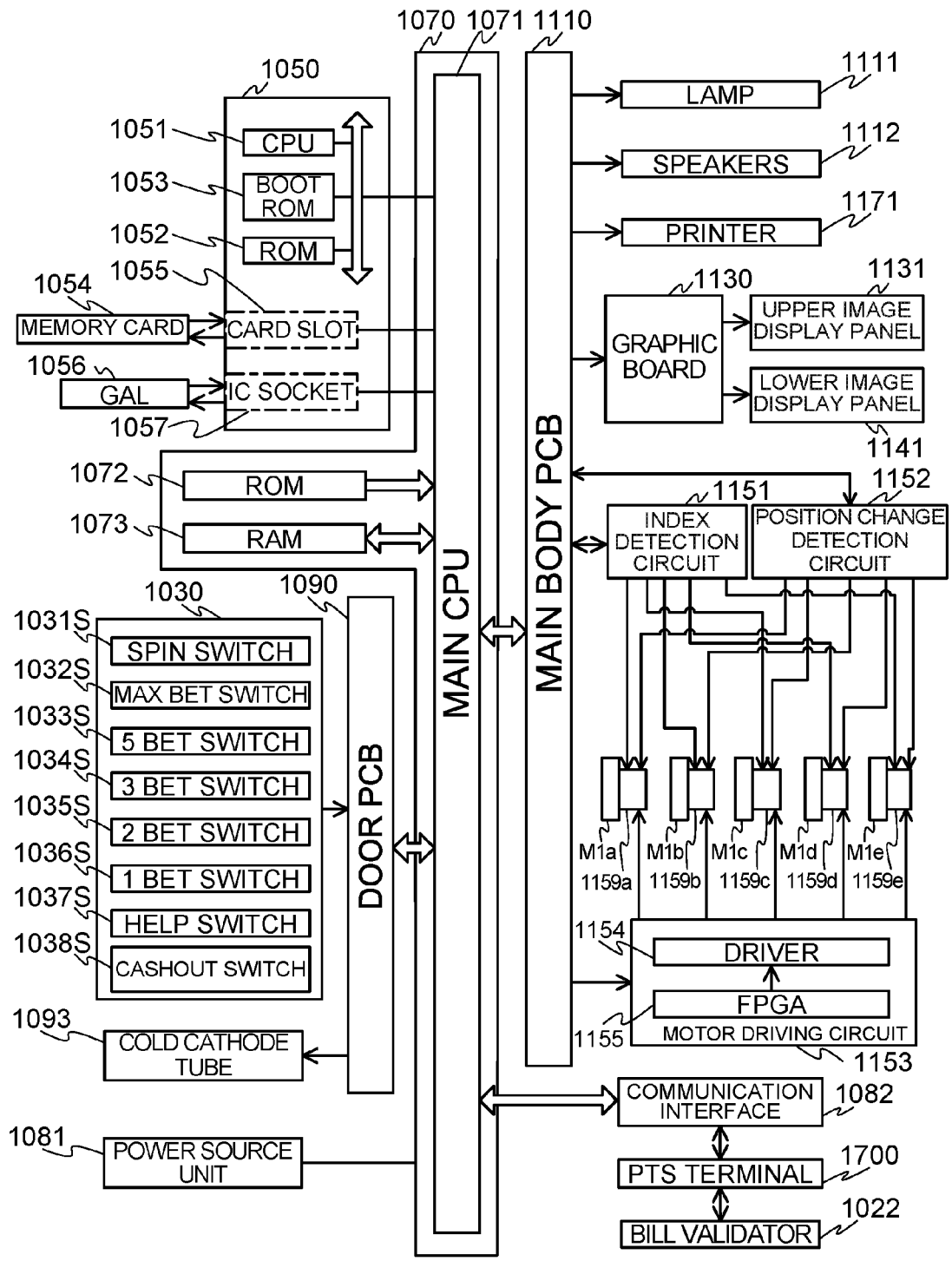
FIG. 8 is a diagram showing a circuitry configuration of the slot machine according to the one embodiment of the present invention.

Next, with reference to FIG. 8, a configuration of circuitry included in a slot machine 1010 will be described.

A gaming board 1050 is provided with: a CPU 1051, a ROM 1052, and a boot ROM 1053, which are mutually connected by an internal bus; a card slot 1055 corresponding to a memory card 1054; and an IC socket 1057 corresponding to a GAL (Generic Array Logic) 1056.

The memory card 1054 includes a non-volatile memory and stores a game program and a game system program. The game program includes a program related to game progression and a program for producing presentation by images and sounds. In addition, the above-mentioned game program includes a symbol determination program. The symbol determination program is a program for determining symbols to be rearranged.

In addition, the card slot 1055 is configured so that the memory card 1054 can be inserted thereinto and removed therefrom and is connected to a motherboard 1070 by an IDE bus. Accordingly, the memory card 1054 is pulled out from the card slot 1055, another game program is written into the memory card 1054, and that memory card 1054 is inserted into the card slot 1055, thereby allowing a kind and contents of a game played on the slot machine 1010 to be changed.

The GAL 1056 is a type of a PLD (Programmable Logic Device) having a fixed OR array structure. The GAL 1056 is provided with a plurality of input ports and output ports, and predetermined input into the input port causes output of the corresponding data from the output port.

In addition, the IC socket 1057 is configured so that the GAL 1056 can be inserted thereinto and removed therefrom and is connected to the motherboard 1070 by a PCI bus. The contents of the game to be played on the slot machine 1010 can be changed by replacing the memory card 1054 with another memory card 1054 having another program written therein or by rewriting the program written into the memory card 1054 as another program.

The CPU 1051, the ROM 1052 and the boot ROM 1053 mutually connected by the internal bus are connected to the motherboard 1070 by a PCI bus. The PCI bus enables a signal transmission between the motherboard 1070 and the gaming board 1050 and power supply from the motherboard 1070 to the gaming board 1050.

The ROM 1052 stores an authentication program. The boot ROM 1053 stores a pre-authentication program, a program (boot code) to be used by the CPU 1051 for activating the pre-authentication program, and the like.

The authentication program is a program (tamper check program) for authenticating the game program and the game system program. The pre-authentication program is a program for authenticating the above-mentioned authentication program. The authentication program and the pre-authentication program are written along a procedure (authentication procedure) for proving that the program to be the subject has not been tampered.

The mother board 1070 is configured by using a commercially available general-purpose mother board (printed circuit board having basic components of a personal computer mounted thereon) and includes a main CPU 1071, a ROM (Read Only Memory) 1072, a RAM (Random Access Memory) 1073, and a communication interface 1082. Here, the main CPU 1071 corresponds to a controller 1100 of the slot machine 1010.

The ROM 1072 includes a memory device such as a flash memory and stores a program such as a BIOS (Basic Input/Output System) to be executed by the main CPU 1071 and permanent data. When the BIOS is executed by the main CPU 1071, processing for initializing predetermined peripheral devices is conducted; and further, through the gaming board 1050, processing of loading the game program and the game system program stored in the memory card 1054 is started. It is to be noted that in the present invention, the ROM 1072 may be a ROM in which contents are rewritable or a ROM in which contents are un-rewritable.

The RAM 1073 stores data and programs such as the symbol determination program which are used in operation of the main CPU 1071. For example, when the processing of loading the above-mentioned game program, game system program, or authentication program is conducted, the RAM 1073 can store the program. The RAM 1073 is provided with working areas used for operations in execution of these programs. Examples of the areas include: areas that stores counters for managing the number of games, the number of Bets, the number of payout, the number of credits, and the like; an area that stores symbols (code numbers) determined by a drawing; and the like.

The communication interface 1082 is to control transmission and reception of data between a PTS terminal 1700 and the main CPU 1071. In addition, the motherboard 1070 is connected with the later-described door PCB (Printed Circuit Board) 1090 and a main body PCB 1110 by respective USBs. The motherboard 1070 is also connected with a power supply unit 1081.

When the power is supplied from the power supply unit 1081 to the motherboard 1070, the main CPU 1071 of the motherboard 1070 is activated, and then the power is supplied to the gaming board 1050 through the PCI bus so as to activate the CPU 1051.

The door PCB 1090 and the main PCB 1110 are connected with input devices such as switches and sensors and peripheral devices, the operations of which are controlled by the main CPU 1071.

The door PCB 1090 is connected with a control panel 1030 and a cold cathode tube 1093.

The control panel 1030 is provided with a spin switch 1031S, a MAX-BET switch 1032S, a 5-BET switch 1033S, a 3-BET switch 1034S, a 2-BET switch 1035S, a 1-BET switch 1036S, a HELP switch 1037S, and a CASHOUT switch 1038S which correspond to the above-mentioned respective buttons. Each of the switches outputs a signal to the main CPU 1071 upon detection of pressing of the button corresponding thereto by a player.

The cold cathode tube 1093 functions as a backlight installed on the rear face sides of the upper image display panel 1131 and the lower image display panel 1141 and lights up based on a control signal outputted from the main CPU 1071.

The main body PCB 1110 is connected with a lamp 1111, speakers 1112, a printer 1171, and a graphic board 1130. It is to be noted that although in this example, a bill validator 1022 is connected to the PTS terminal 1700, a configuration in which the bill validator 1022 is connected to the slot machine 1010 may be adopted.

The lamp 1111 lights up based on a control signal outputted from the main CPU 1071. The speakers 1112 outputs sounds such as BGM, based on a control signal outputted from the main CPU 1071. Based on a control signal outputted from the main CPU 1071, the printer 1171 prints on a ticket, for example, a barcode representing encoded data of a number of credits, date and time, an identification number of a slot machine 1010, and the like stored in the RAM 1073 and then outputs the ticket as a ticket with a barcode.

It is to be noted that the upper image display panel 1131 and the lower image display panel 1141 may be configured as touch panels. Each of the touch panel detects a position where a finger or the like of a player touches and outputs a signal corresponding to the detected position to the main CPU 1071.

The bill validator 1022 identifies whether or not bills are authentic and accepts authentic bills into the cabinet 1011. An amount of the bills inputted into the cabinet 1011 is converted to a number of coins and a credit which is equivalent to the converted number of coins is added as a credit which a player has.

The graphic board 1130 controls display of images conducted by the respective upper image display panel 1131 and lower image display panel 1141 based on control signals outputted from the main CPU 1071. The graphic board 1130 is provided with a VDP (Video Display Processor) generating image data, a video RAM storing the image data generated by the VDP, and the like. It is to be noted that the image data used in generation of image data by the VDP is included in the game program which has been read from the memory card 1054 and stored into the RAM 1073.

A motor driving circuit 1153 includes an FPGA (Field Programmable Gate Array) 1155 and a driver 1154. Connected to the motor driving circuit 1153 are stepping motors 1159a to 1159e for rotating the respective reels M1a to M1e. The FPGA 1155 is a programmable electronic circuit such as LSI and functions as a control circuit for the stepping motors 1159a to 1159e. The driver 1154 functions as an amplifying circuit for pulses inputted to the stepping motors 1159a to 1159e.

An index detection circuit 1151 is to detect a position of each of the reels M1a to M1e which are rotating and further, is capable of detecting losing of steps of each of the reels M1a to M1e. A position change detection circuit 1152 detects a change of a position where each of the reels M1a to M1e has stopped. For example, in a case where although in reality, a combination of symbols displayed after stopping of the reels M1a to M1e is not associated with any of combinations of symbols related to winning, the position where each of the reels M1a to M1e has stopped is changed by an external action such as a fraudulent act so as to establish any of combinations of symbols related to winning, the position change detection circuit 1152 detects the change of the position where each of the reels M1a to M1e has stopped. The position change detection circuit 1152 is configured to detect, for example, fins (not shown) attached at predetermined intervals to internal portions of each of the reels M1a to M1e and to be capable of thereby detecting the change of the position where each of the reels M1a to M1e has stopped.

It is to be noted that an excitation system of the stepping motors 1159a to 1159e is not particularly limited and a 1-2 phase excitation system or a 2 phase excitation system may be adopted. In addition, instead of the stepping motors, DC motors may be adopted. In a case where the DC motors are adopted, connected to the main body PCB 110 are a deviation counter, a D/A converter, and a servo amplifier in this order, and the DC motors are connected to the servo amplifier. In addition, rotation positions of the DC motors are detected by a rotary encoder, current rotation positions of the DC motors are supplied as data from the rotary encoder to the deviation counter.

It is to be noted although the configuration of the circuitry of the slot machine 1010 is described as the configuration shown in FIG. 8 hereinabove, a variety of other configurations may be adopted.

[Circuitry Configuration of PTS Terminal]

Figure 9:
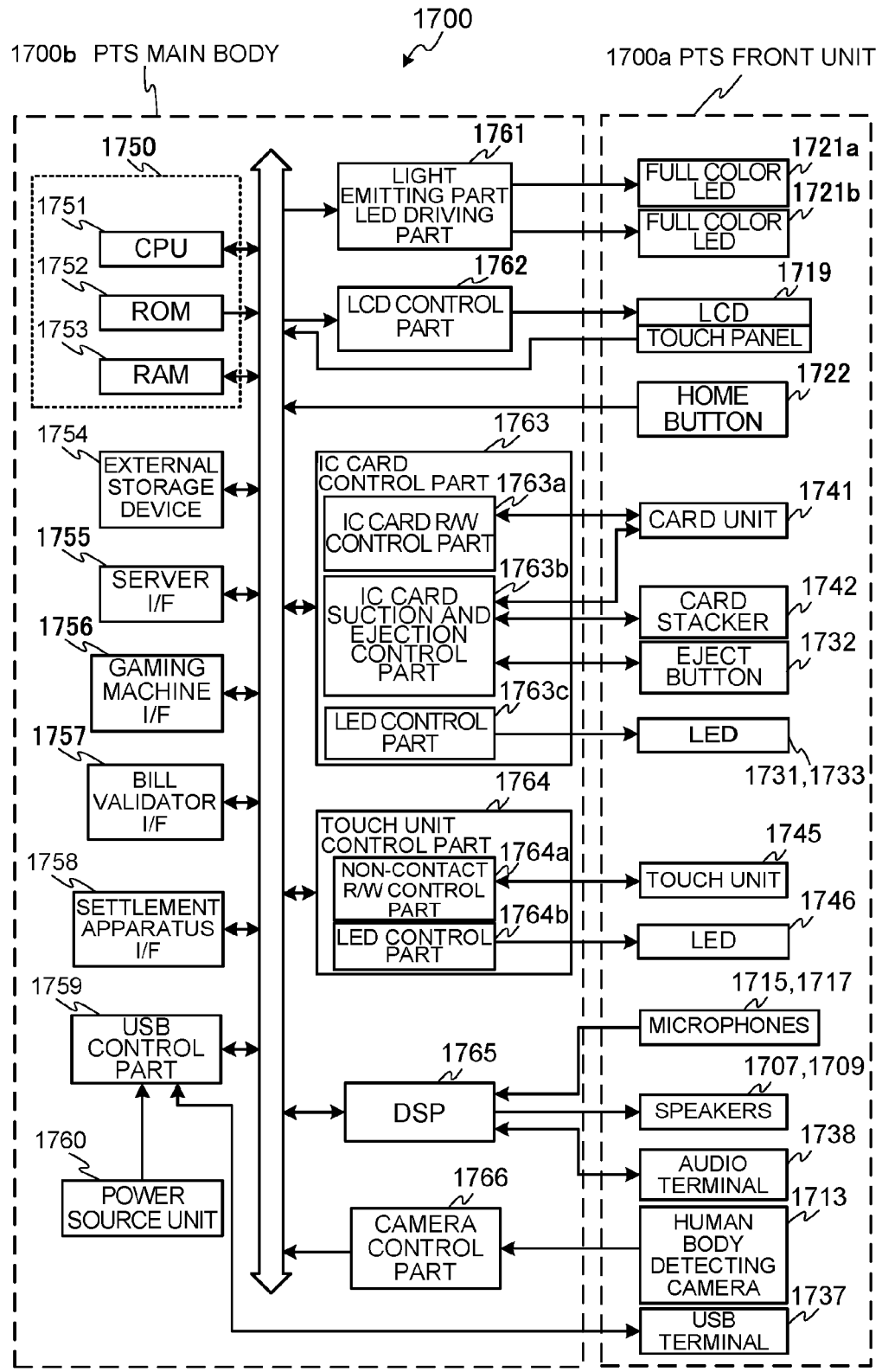
FIG. 9 is a diagram showing a circuitry configuration of the PTS terminal according to the one embodiment of the present invention.

Next, with reference to FIG. 9, a configuration of circuitry or the like which a PTS terminal 1700 includes will be described. As described above, the PTS terminal 1700 includes a PTS front unit 1700a and a PTS main body 1700b. In FIG. 9, however, the circuitry or the like which the PTS terminal 1700 includes is shown by dividing the circuitry or the like into circuitry or the like included in the PTS front unit 1700a and circuitry or the like included in the PTS main body 1700b.

A PTS controller 1750 for controlling the PTS terminal 1700 has a CPU 1751, a ROM 1752, and a RAM 1753.

The CPU 1751 controls execution of each component of the PTS terminal 1700, executes a variety of programs stored in the ROM 1752, and performs computation. For example, the CPU 1751 executes a credit updating program and updates credit-related data stored in an IC card 1500.

The ROM 1752 is constituted of a memory device such as a flash memory and has stored therein permanent data executed by the CPU 1751. For example, in the ROM 1752, a credit updating program for rewriting credit-related data (for example, a card balance) stored in the IC card 1500 or the like can be stored.

The RAM 1753 temporarily stores data required upon executing a variety of programs stored in the ROM 1752.

An external storage device 1754 is a storage device, for example, such as a hard disk device and stores a program executed by the CPU 1751 and data which a program executed by the CPU 1751 uses.

A server I/F (interface) 1755 realizes data communication between servers such as a hall management server 10, a jackpot server 20, and the like and the PTS terminal 1700. A gaming machine I/F (interface) 1756 realizes data communication between a slot machine 1010 and the PTS terminal 1700, and for said data communication, a specified protocol can be used.

Besides, the PTS terminal 1700 is connected to a bill validator 1022 via a bill validator I/F (interface) 1757 and connected to a settlement apparatus 1868 via a settlement apparatus I/F (interface) 1758 and is capable of performing transmission and reception of data as needed.

A USB control part 1759 determines whether on a USB terminal 1737, power is supplied from a power supply unit 1760 and when a predetermined condition is satisfied, enables the recharging on the USB terminal 1737. When the predetermined condition is satisfied, a player connects an electronic device to the USB terminal 1737, thereby allowing said electronic device to be recharged.

A light emitting part LED driving part 1761 performs control such that in order to cause an upper light emitting plate 1720a of an LCD 1719 to emit light, full-color LEDs 1721a are lit up at predetermined timing and performs control such that in order to cause a lower light emitting plate 1720b of the LCD 1719 to emit light, full-color LEDs 1721b are lit up at predetermined timing.

An LCD control part 1762 performs control to cause the LCD 1719 to display information pertinent to users, information for the users, and the like and to display data read out from an IC card 1500 and data inputted by a player. In addition, the LCD 1719 has a touch panel function and when a touch panel is operated by a player, a predetermined signal is transmitted to the CPU 1751.

A home button 1722 is provided in the vicinity of the LCD 1719 and is a button for shifting a screen displayed on the LCD 1719 to a predetermined upper level screen. When the home button 1722 is pressed by a player, that operation by a player is transmitted to the CPU 1751, and the CPU 1751 transmits an instruction to the LCD control part 1762 to update the display on the LCD 1719 in accordance with said operation.

An IC card control part 1763 performs control for insertion and ejection of an IC card 1500, writing of credit data thereto, and the like. The IC card control part 1763 includes an IC card R/W (reader/writer) control part 1763a, an IC card suction and ejection control part 1763b, and an LED control part 1763c.

The IC card R/W control part 1763a controls a card unit 1741 and updates credit-related data stored in an IC card 1500. In addition, when an IC card 1500 is newly issued, credit-related data corresponding a settled money amount is stored. The card unit 1741 has an antenna part for reading data by an NFC or the like from the IC card 1500 or writing the data thereto.

Although the card unit 1741 has functions of an IC card reader for reading information stored in an IC card 1500 and an IC card writer for writing information to an IC card 1500, the card unit 1741 may have a function of either one of the IC card reader and the IC card writer as needed.

The IC card suction and ejection control part 1763b performs control for suction and ejection of an IC card 1500. When an IC card 1500 is inserted by a player into the card insertion slot 1730, the IC card suction and ejection control part 1763b performs control to retain the IC card while a player is executing a game. In addition, after the credit-related data has been written in the IC card 1500 upon the settlement, the IC card suction and ejection control part 1763b performs control to eject that IC card 1500. Further, when an eject button 1732 is pressed, the IC card suction and ejection control part 1763b ejects the IC card 1500.

In addition, when an IC card 1500 is newly issued, the IC card suction and ejection control part 1763b newly takes out an IC card 1500 from a card stacker 1742 and in order to cause the IC card 1500 to store credit-related data, supplies the IC card 1500 to the card unit 1741.

The LED control part 1763c performs control to light up LEDs (full-color LEDs 1731) provided in the vicinity of the card insertion slot 1730 of the card unit 1741 and to light up an LED (red full-color LED 1733) provided in the vicinity of the eject button 1732.

A touch unit control part 1764 controls data transmission and reception associated with a touch operation on an IC card 1500, a mobile phone, a smartphone, or the like. The touch unit control part 1764 includes a non-contact R/W (reader/writer) control part 1764a and an LED control part 1764b.

The non-contact R/W control part 1764a determines whether or not the IC card 1500 or the mobile phone comes near within a predetermined distance (for example, a touch operation has been conducted) with a touch unit 1745, and when the IC card 1500 or the mobile phone has come near within the predetermined distance, the non-contact R/W control part 1764a obtains a reading-out result from the touch unit 1745. The touch unit 1745 has an antenna part for performing data transmission and reception to and from the IC card 1500 or the mobile phone by an NFC or the like.

Although the touch unit 1745 has functions of the IC card reader for reading information stored in the IC card 1500 or the mobile phone and the IC card writer for writing information to the IC card 1500 or the mobile phone, the touch unit 1745 may have a function of either one thereof as needed.

The LED control part 1764b controls LEDs 1746 located in four corners of a front face of the touch unit 1745 to light up the LEDs 1746 at predetermined timing.

A DSP 1765 receives sound data obtained from microphones 1715 and 1717 and conducts predetermined processing for the sound data and thereafter, transmits the processed data to the CPU 1751. In addition, the DSP 1765 transmits the received sound data to speakers 1707 and 1709. Further, the DSP 1765 outputs the sound, received to an audio terminal connected with a headset, to headphones and processes the sound received from the microphones and transmits the processed sound to the CPU 1751. It is to be noted that here, the configuration of the outline is described and the description of an A/D converter, a D/A converter, an amplifier, and the like are omitted.

A camera control part 1766 obtains an image of a player or the like shot by a human body detection camera 1713, subjects the image to predetermined image processing as needed, and transmit the processed data to the CPU 1751. Said data is transmitted, for example, via a server I/F 1755 to the hall management server 10.

It is to be noted that although hereinabove, the circuitry configuration of the PTS terminal 1700 is descried as the configuration shown in FIG. 9, a variety of other configurations may be adopted.

[Configuration of Symbol Combination Table]

Next, with reference to FIG. 10, a symbol combination table will be described.

The symbol combination table specifies combinations of drawn symbols related to winning and the numbers of payout. On a slot machine 1010, the rotation of symbol arrays of five reels M1a to M1e (a first reel to a fifth reel) of a reel apparatus M1 is stopped, and winning is established when the combination of symbols displayed along a winning line matches one of the combinations of symbols specified by the symbol combination table. According to the winning combination, a benefit such as payout of a credit or the like is provided for a player. It is to be noted that winning is not established (i.e. the game is lost) when the combination of symbols displayed along the winning line does not match any of the combinations of symbols specified by the symbol combination table. It is to be noted that in the present embodiment, a number of winning lines is 30.

Basically, winning is established when all symbols displayed along the winning line by all of the five reels M1a to M1e are of one kind out of kinds of symbols "RED", "APPLE", "BLUE 7", "BELL", "CHERRY", "STRAWBERRY", "PLUM", and "ORANGE". However, with respect to the respective kinds of symbols "CHERRY" and "ORANGE", winning is also established when one or three symbols of either kind are displayed along the winning line by the reel or the reels.

For example, when all the symbols displayed along the winning line by all of the five reels M1a to M1e of the reel apparatus M1 are the symbols "BLUE 7", the winning combination is a "BLUE" combination, and "10" is determined as the number of payout. Based on the determined number of payout, the provision of a credit is conducted. Such a credit is converted to, for example, a unit of a card balance and is added to a card balance stored on the IC card 1500. The IC card 1500 on which the card balance is updated is thereafter ejected from the card insertion slot 1730.

[Contents of Program Executed on Slot Machine]

Next, with reference to FIG. 11 to FIG. 17, one example of a program executed on a slot machine 1010 will be described.

<Main Control Process>

Figure 11:
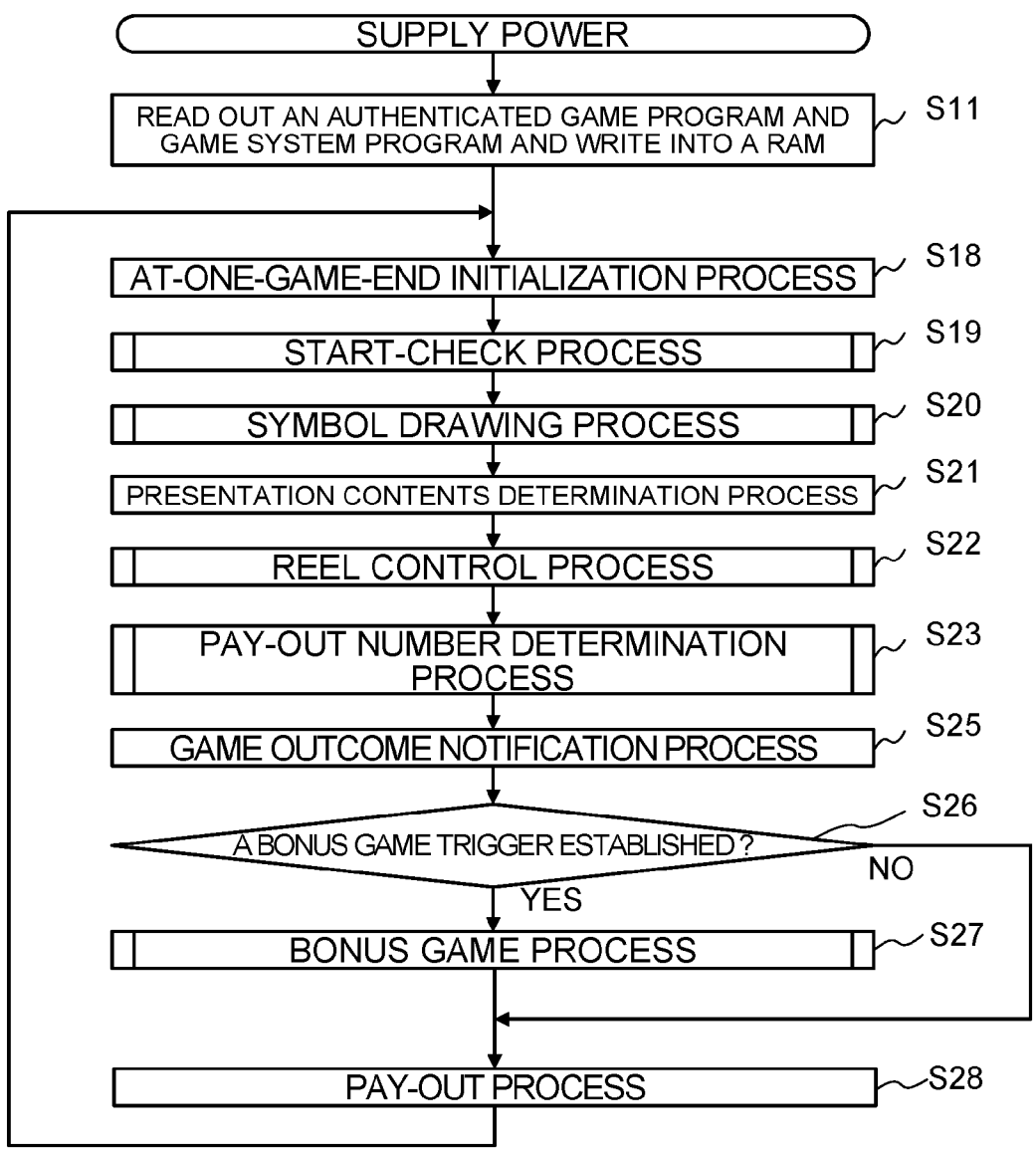
FIG. 11 is a flowchart showing a procedure of a main control process executed on the slot machine according to the one embodiment of the present invention.

First, with reference to FIG. 11, a main control process will be described. FIG. 11 is a flowchart of the main control process executed on a slot machine 1010 according to the embodiment of the present invention.

First, when the power is supplied to the slot machine 1010, a main CPU 1071 reads the authenticated game program and game system program from a memory card 1054 via a gaming board 1050 and writes the programs into a RAM 1073 (step S11).

Next, the main CPU 1071 conducts an at-one-game-end initialization process (step S18). For example, data that becomes unnecessary after each game in working areas of the RAM 1073, such as the number of Bets and the symbols determined by a drawing, is cleared.

Next, the main CPU 1071 conducts a start-check process which is described later (step S19). In this process, input from a BET switch and a spin switch is checked.

Next, the main CPU 1071 conducts a symbol drawing process which is described later (step S20). In this process, to-be stopped symbols are determined based on random number values for symbol determination.

Next, the main CPU 1071 conducts a presentation contents determination process (step S21). The main CPU 1071 extracts random number values for presentation and determines any of the presentation contents from a predetermined plurality of presentation contents by a drawing. The presentation contents can be determined in accordance with a winning combination and a state of a game on the slot machine 1010. For example, the configuration can be arranged such that in accordance with winning combinations and the states of the game on the slot machine 1010, drawing probabilities related to respective presentation contents are made different from one another.

Next, the main CPU 1071 conducts a reel control process which is described later (step S22). In this process, rotation of five reels M1a to M1e (a first reel to a fifth reel) of a reel apparatus M1 is started, and the to-be stopped symbols determined in the symbol drawing process at step S20 are stopped in predetermined positions (for example, in a symbol display window 1135). In other words, three symbols including the to-be stopped symbols with respect to each of the reels are displayed in the symbol display window 1135.

Next, the main CPU 1071 conducts a to-be-paid-out number determination process which is described later (step S23). In this process, based on a combination of symbols displayed on a winning line L (the 30 winning lines), a to-be-paid-out number is determined and stored in a to-be-paid-out number storage region provided in the RAM 1073.

Next, the main CPU 1071 conducts a game outcome notification process (step S25). In this process, data which includes termination time at which a unit game is terminated (for example, time at which the to-be-paid-out number determination process is conducted); game contents (for example, a to-be-paid-out number); and a machine ID for identifying the slot machine 1010 is transmitted to a PTS terminal 1700. Here, the PTS terminal 1700 obtains an identification ID of an IC card 1500 and transmits the above-mentioned received data to a hall management server 10 together with this identification ID. Based on this data, the hall management server 10 updates a card balance for each player and stores the updated card balance in a card management table and accumulates information (game history information) pertinent to a game progress in a game history management table for each player and each machine.

Next, the main CPU 1071 determines whether or not a bonus game trigger has been established (step S26). When the main CPU 1071 determines that the bonus game trigger has been established, the main CPU 1071 conducts a bonus game process which is described later (step S27).

After the process at step S27 or when determining at step S26 that the bonus game trigger has not been established, the main CPU 1071 conducts a paying-out process (step S28). The main CPU 1071 adds a value stored in the to-be-paid-out number storage region to a number-of-credits storage region provided in the RAM 1073. Here, for example, when a player presses a CASHOUT button, a CASHOUT switch 1038S which has detected the pressing thereof outputs a signal to the main CPU 1071 and a money amount calculated based on a value stored in the number-of-credits storage region is added to a card balance stored in the IC card 1500 held by a card unit 1741. It is to be noted that a ticket with a barcode may be issued by a printer 1171. After finishing the paying-out process, the main CPU 1071 returns to the process at step S18 and the unit game is repeated.

<Start-Check Process>

Figure 12:
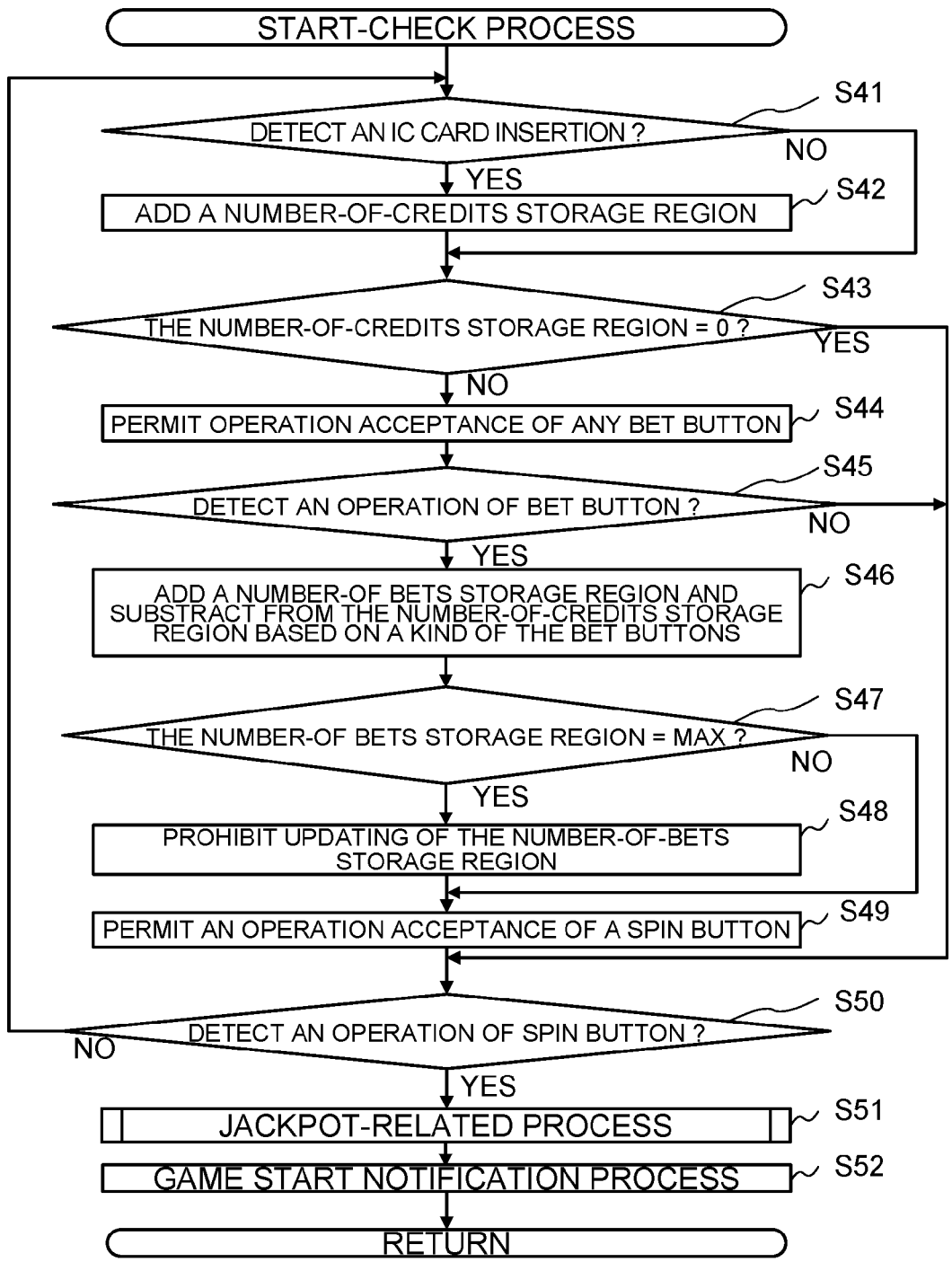
FIG. 12 is a flowchart showing a procedure of a start-check process executed on the slot machine according to the one embodiment of the present invention.

Next, with reference to FIG. 12, a start-check process will be described. FIG. 12 is a flowchart of the start-check process executed on a slot machine 1010 according to the present embodiment of the present invention.

The main CPU 1071 determines whether or not an IC card 1500 inserted from a card insertion slot 1730 has been held by a card unit 1741 and whether or not bills are inputted into a bill validator 1022 (step S41). When the main CPU 1071 determines that the insertion of the IC card 1500 or the inputting of the bills has been detected, authenticity of said IC card 1500 or said bills are confirmed and thereafter, addition thereof to a number-of-credits storage region is performed (step S42).

After the process at step S42 or when determining at step S41 that the insertion of the IC card 1500 or the like has not been detected, the main CPU 1071 determines whether or not a value stored in the number-of-credits storage region is zero (step S43). When the main CPU 1071 determines that the value stored in the number-of-credits storage region is not zero, the main CPU 1071 permits operation acceptance of a BET button (for example, any of a MAX BET button 1032, a 5-BET button 1033, a 3-BET button 1034, a 2-BET button 1035, and a 1-BET button 1036) (step S44).

Next, the main CPU 1071 determines whether or not operation of any of the BET buttons has been detected (step S45). When the pressing of any BET button by a player has been detected by a BET switch (for example, any of a MAX-BET switch 1032S, a 5-BET switch 1033S, a 3-BET switch 1034S, a 2-BET switch 1035S, a 1-BET switch 1036S), the main CPU 1071 performs addition to a numberof-BETs storage region provided in the RAM 1073 and subtraction from the number-of-credits storage region based on the kind of the BET button (step S46).

Next, the main CPU 1071 determines whether or not a value stored in the number-of-BETs storage region is at its maximum (step S47). When the main CPU 1071 determines that the value stored in the number-of-BETs storage region is at its maximum, the main CPU 1071 prohibits updating of the value stored in the number-of-BETs storage region (step S48). After step S48 or when determining at step S47 that the value stored in the number-of-BETs storage region is not at its maximum, the main CPU 1071 permits operation acceptance of a spin button (step S49).

After step S49 or when determining at step S45 that the operation of any of the BET buttons has not been detected, or when determining at step S43 that the value stored in the number-of-credits storage region is zero, the main CPU 1071 determines whether or not operation of the spin button has been detected (step S50). When the main CPU 1071 determines that the operation of the spin button has not been detected, the main CPU 1071 shifts the processing to step S41.

When the main CPU 1071 determines that the operation of the spin button has been detected, the main CPU 1071 conducts a jackpot-related process which is described later. In this process, one part of the bet credit is paid out via a PTS terminal 1700 to a jackpot server 20, for example, as a jackpot amount to be accumulated for a jackpot (step S51).

Next, the main CPU 1071 conducts a game start notification process (step S52). In this process, data which includes game start time at which a unit game is started (for example, time at which a spin button is pressed); game contents (for example, a Bet number); and a machine ID for identifying the slot machine 1010 is transmitted to a PTS terminal 1700. Here, the PTS terminal 1700 obtains an identification ID of an IC card 1500 and transmits the above-mentioned received data to a hall management server 10 together with this identification ID. Based on this data, the hall management server 10 updates a card balance for each player and stores the updated card balance in a card management table and accumulates information (game history information) pertinent to a game progress in a game history management table for each player and each machine.

After the process at step S52 has been conducted, the start-check process is completed.

<Symbol Drawing Process>

Figure 13:
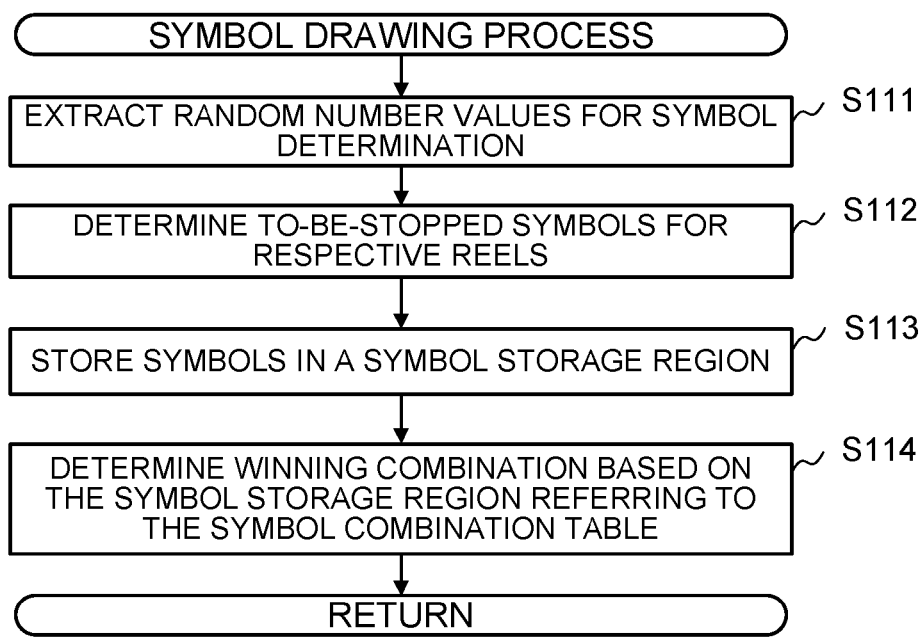
FIG. 13 is a flowchart showing a procedure of a symbol drawing process executed on the slot machine according to the one embodiment of the present invention.

Next, with reference to FIG. 13, a symbol drawing process will be described. FIG. 13 is a flowchart of the symbol drawing process executed on a slot machine 1010 according to the embodiment of the present invention.

First, the main CPU 1071 extracts random number values for symbol determination (step S111). Next, the main CPU 1071 determines to-be stopped symbols for five reels M1a to M1e (a first reel to a fifth reel) of a reel apparatus M1 (step S112). The main CPU 1071 conducts a drawing for each of the reels and determines any of 12 symbols as to-be stopped symbols.

Next, the main CPU 1071 stores the determined to-be stopped symbols for the respective reels in a symbol storage region provided in a RAM 1073 (step S113). Next, the main CPU 1071 references a symbol combination table (FIG. 10) and determines a winning combination for each winning line based on the symbol storage region (step S114). The main CPU 1071 determines whether or not the combination of symbols to be displayed along a winning line by the respective reels matches any of the combinations of symbols specified by the symbol combination table and determines the winning combination. After the process has been conducted, the symbol drawing process is completed.

<Reel Control Process>

Figure 14:
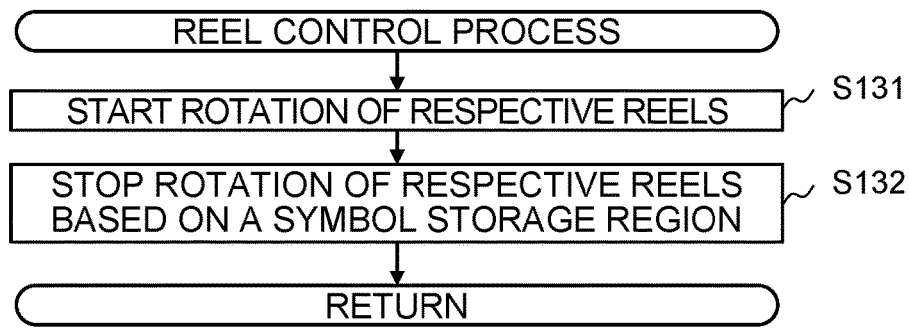
FIG. 14 is a flowchart showing a procedure of a reel control process executed on the slot machine according to the one embodiment of the present invention.

Next, with reference to FIG. 14, a reel control process will be described. FIG. 14 is a flowchart of the reel control process executed on a slot machine 1010 according to the embodiment of the present invention.

First, the main CPU 1071 controls stepping motors 1159a to 1159e and starts rotation of five reels M1a to M1e of a reel apparatus M1 (step S131). Next, the main CPU 1071 controls the stepping motors 1159a to 1159e and stops the rotation of the five reels M1a to M1e based on the above-mentioned symbol storage region (step S132). After the process has been conducted, the reel control process is completed.

It is to be noted that in accordance with timing of starting and stopping of the rotation of the reels M1a to M1e in the reel control process or other timing, the presentation determined in the presentation contents determination process (FIG. 11) is executed. For example, a moving image and a still image are displayed on an upper image display panel 1131 of the slot machine 1010, sound is outputted from speakers 1112, and a lamp 1111 is lit up, thereby allowing said presentation to be executed.

<To-Be-Paid-Out Number Determination Process>

Figure 15:
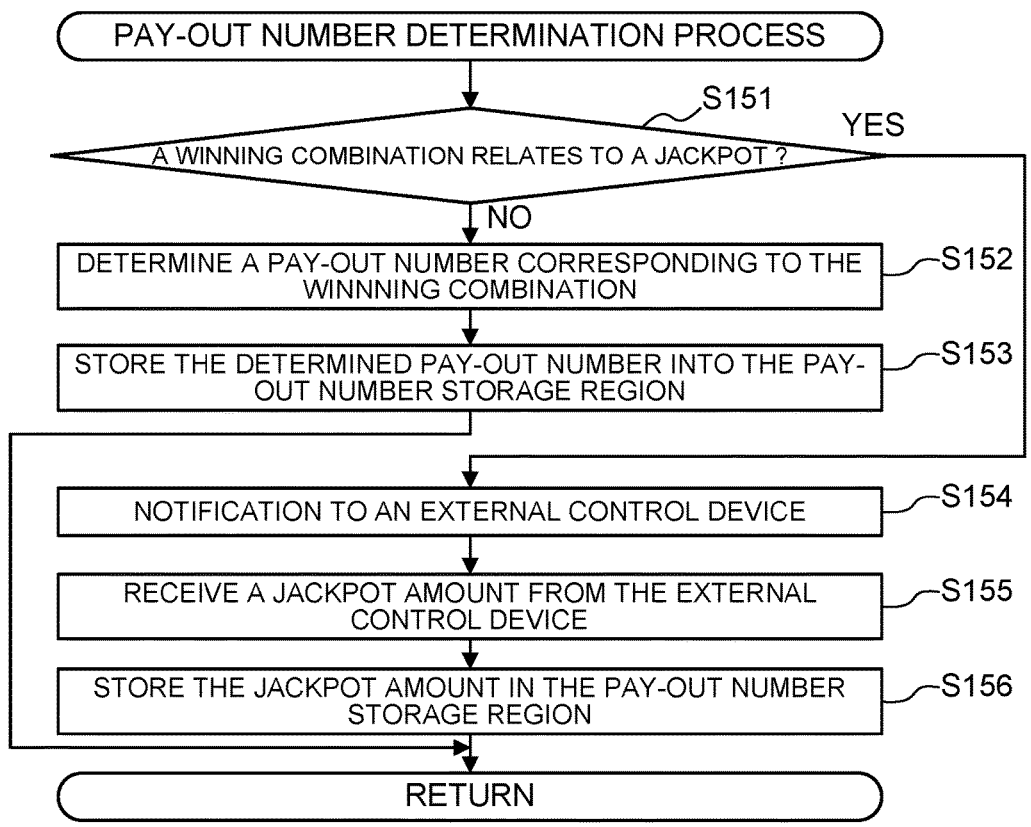
FIG. 15 is a flowchart showing a procedure of a to-be-paid-out number determination process executed on the slot machine according to the one embodiment of the present invention.

Next, with reference to FIG. 15, a to-be-paid-out number determination process will be described. FIG. 15 is a flowchart of the to-be-paid-out number determination process executed on a slot machine 1010 according to the embodiment of the present invention.

First, the main CPU 1071 determines whether or not a winning combination is a combination related to a jackpot (step S151). When the main CPU 1071 determines that the winning combination is not the combination of the jackpot, the main CPU 1071 determines a to-be-paid-out number corresponding to the winning combination for each winning line (step S152). For example, when the winning combination is a combination of symbols "BELL", the main CPU 1071 determines "8" as the to-be-paid-out number (refer to FIG. 10). It is to be noted that the main CPU 1071 determines "0" as the to-be-paid-out number in a case where a game is lost. Next, the main CPU 1071 stores the determined to-be-paid-out number into a to-be-paid-out number storage region (step S153). After the process has been conducted, the to-be-paid-out number determination process is completed.

When the main CPU 1071 determines that the winning combination is the combination of the jackpot, the main CPU 1071 notifies an external control device (that is, a jackpot server 20) of the winning of the jackpot (jackpot winning notification) (step S154). It is to be noted that upon reception of the notification, the jackpot server 20 transmits to the slot machine 1010 the amount of a jackpot having been updated up to that time. At this time, a part (e.g. 80%) of the amount of jackpot may be an amount to be paid out and the rest (e.g. 20%) may be carried over for the upcoming establishment of a jackpot trigger.

Next, the main CPU 1071 receives the jackpot amount from the jackpot server 20 (step S155). Next, the main CPU 1071 stores the received jackpot amount into the to-be-paid-out number storage region (step S156). After this process has been conducted, the to-be-paid-out number determination process is completed.

<Jackpot-Related Process>

Figure 16:
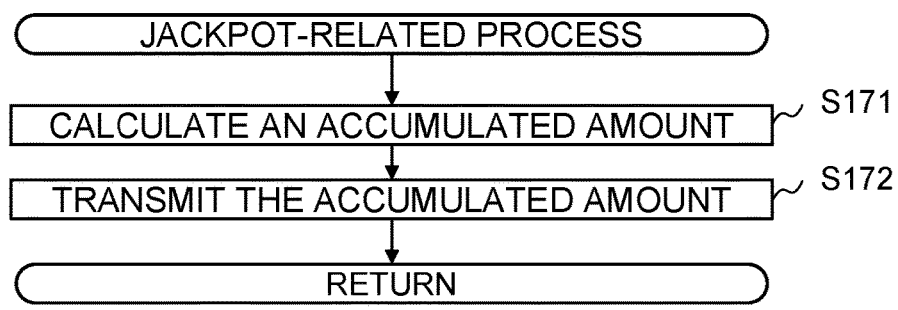
FIG. 16 is a flowchart showing a procedure of a jackpot-related process executed on the slot machine according to the one embodiment of the present invention.

Next, with reference to FIG. 16, a jackpot-related process will be described. FIG. 16 is a flowchart of the jackpot-related process executed on a slot machine 1010 according to the embodiment of the present invention First, the main CPU 1071 calculates an accumulation amount (step S171). The main CPU 1071 obtains a product of a value stored in a number-of-BETs storage region and a predetermined accumulation ratio, thereby calculating the accumulation amount to the amount of a jackpot.

Next, the main CPU 1071 transmits the calculated accumulation amount to a jackpot server 20 (step S172). Upon reception of the accumulation amount, the jackpot server 20 updates the amount of the jackpot. After the process has been conducted, the jackpot-related process is completed.

<Bonus Game Process>

Figure 17:
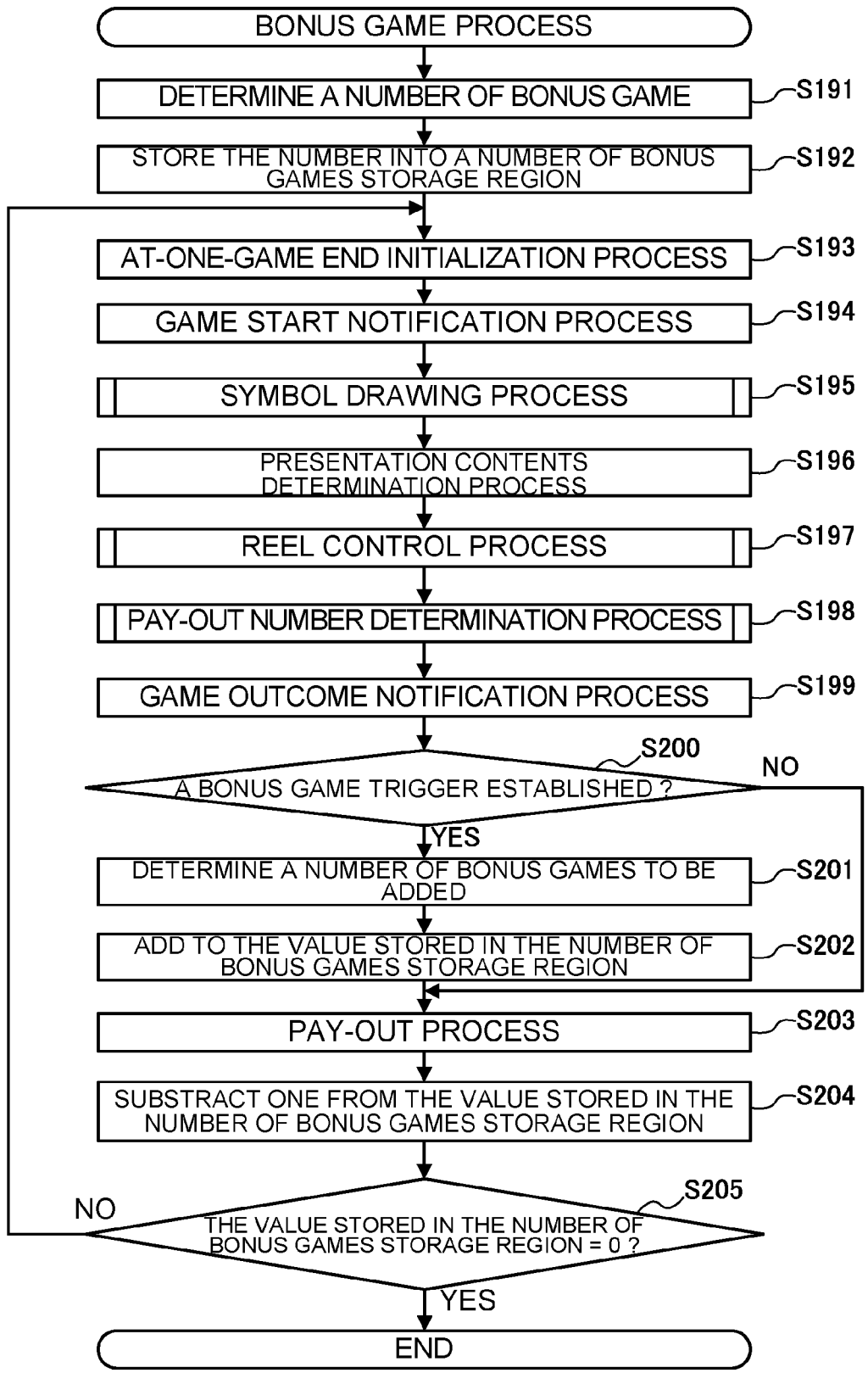
FIG. 17 is a flowchart showing a procedure of a bonus game process executed on the slot machine according to the one embodiment of the present invention.

Next, with reference to FIG. 17, a bonus game process will be described. FIG. 17 is a flowchart of the bonus game process executed on a slot machine 1010 according to the embodiment of the present invention.

First, the main CPU 1071 determines a number of bonus games (step S191). The main CPU 1071 extracts random number values for number-of-bonus-games determination and determines any one of the various numbers of bonus games such as "10", "20" and "30" by a drawing.

Next, the main CPU 1071 stores the determined number of bonus games into a number-of-bonus-games storage region provided in a RAM 1073 (step S192).

Next, the main CPU 1071 conducts an at-one-game-end initialization process in the same way as the process at step S18 described with reference to FIG. 11 (step S193).

Next, the main CPU 1071 conducts a game start notification process (step S194). This process is the same as the game start notification process at step S52 shown in FIG. 12, and in this process, data which includes game start time at which a unit game (in a bonus game) is started; game contents (for example, a Bet number); and a machine ID for identifying a slot machine 1010 is transmitted to a PTS terminal 1700.

Next, the main CPU 1071 conducts a symbol drawing process described with reference to FIG. 13 (step S195). Next, the main CPU 1071 conducts a presentation contents determination process, as with the process of step S21 described with reference to FIG. 11 (step S196). Next, the main CPU 1071 conducts a reel control process described with reference to FIG. 14 (step S197). Next, the main CPU 1071 conducts a to-be-paid-out number determination process described with reference to FIG. 15 (step S198).

Next, the main CPU 1071 conducts a game outcome notification process (step S199). This process is the same as the game outcome notification process at step S25 shown in FIG. 11, and in this process, data which includes termination time at which a unit game (in a bonus game) is terminated (for example, time at which the to-be-paid-out number determination process is conducted); game contents (for example, a to-be-paid-out number); and a machine ID for identifying the slot machine 1010 is transmitted to the PTS terminal 1700.

Next, the main CPU 1071 determines whether or not a bonus game trigger has been established (step S200). When the main CPU 1071 determines that the bonus game trigger has been established, the main CPU 1071 determines a number of bonus games to be added (step S201). In the same way as the above-mentioned process at step S191, the main CPU 1071 determines the number of bonus games. Next, the main CPU 1071 adds the determined number of bonus games to a value stored in a number-of-bonus-games storage region (step S202).

After the process of step S202 or when determining at step S200 that the bonus game trigger has not been established, the main CPU 1071 conducts a paying-out process (step S203). In this paying-out process, the main CPU 1071 adds the value stored into the to-be-paid-out number storage region in the above-mentioned to-be-paid-out number determination process at step S198 to a value stored in a to-be-paid-out number storage region for bonuses. The to-be-paid-out number storage region for bonuses is a region for storing a total of the to-be-paid-out numbers determined during the bonus games.

When the bonus game process has been completed, the main CPU 1071 adds the value stored in the to-be-paid-out number storage region for bonuses to the value stored in the number-of-credits storage region provided in the RAM 1073, in the paying-out process at step S28 described with reference to FIG. 11. In other words, the total of the to-be-paid-out numbers determined during the bonus games is collectively paid out.

Next, the main CPU 1071 subtracts one from the value stored in the number-of-bonus-games storage region (step S204). Next, the main CPU 1071 determines whether or not a value stored in the number-of-bonus-games storage region is zero (step S205). When the main CPU 1071 determines that the value stored in the number-of-bonus-games storage region is not zero, the main CPU 1071 shifts the processing to step S193. On the other hand, when the main CPU 1071 determines that the value stored in the number-of-bonus-games storage region is zero, the main CPU 1071 completes the bonus game process. When the bonus game process has been completed, the processing is shifted to the process at step S28 described with reference to FIG. 11.

On the slot machine 1010 according to the present embodiment, each game executed as the bonus game is each free game in which without consuming coins, a drawing related to determination of to-be stopped symbols is conducted, the free game being repeated at a number of times which is determined by a drawing as a number of bonus games. In addition, a Bet number at this time is a Bet number in a case where a 1-BET button 1036 is pressed by a player.

[Configuration of Kiosk Terminal]

Next, with reference to FIG. 18, a configuration of a kiosk (KIOSK) terminal used as an information terminal in the present embodiment will be described. The kiosk terminal 2000 is, for example, an information terminal which is installed in a variety of stores and is used, for example, to display information or the like useful for customers and can be connected to a computer or the like (for example, a hall management server 10) for administering and managing a store via a network. It is to be noted that in the present specification, an apparatus which provides some sort of information for a user is defined as the information terminal, and as this information terminal, the kiosk terminal 2000 according to the present embodiment and a gaming machine including a pachinko machine, a pachinko-slot machine, and the like are also included.

Figure 18:
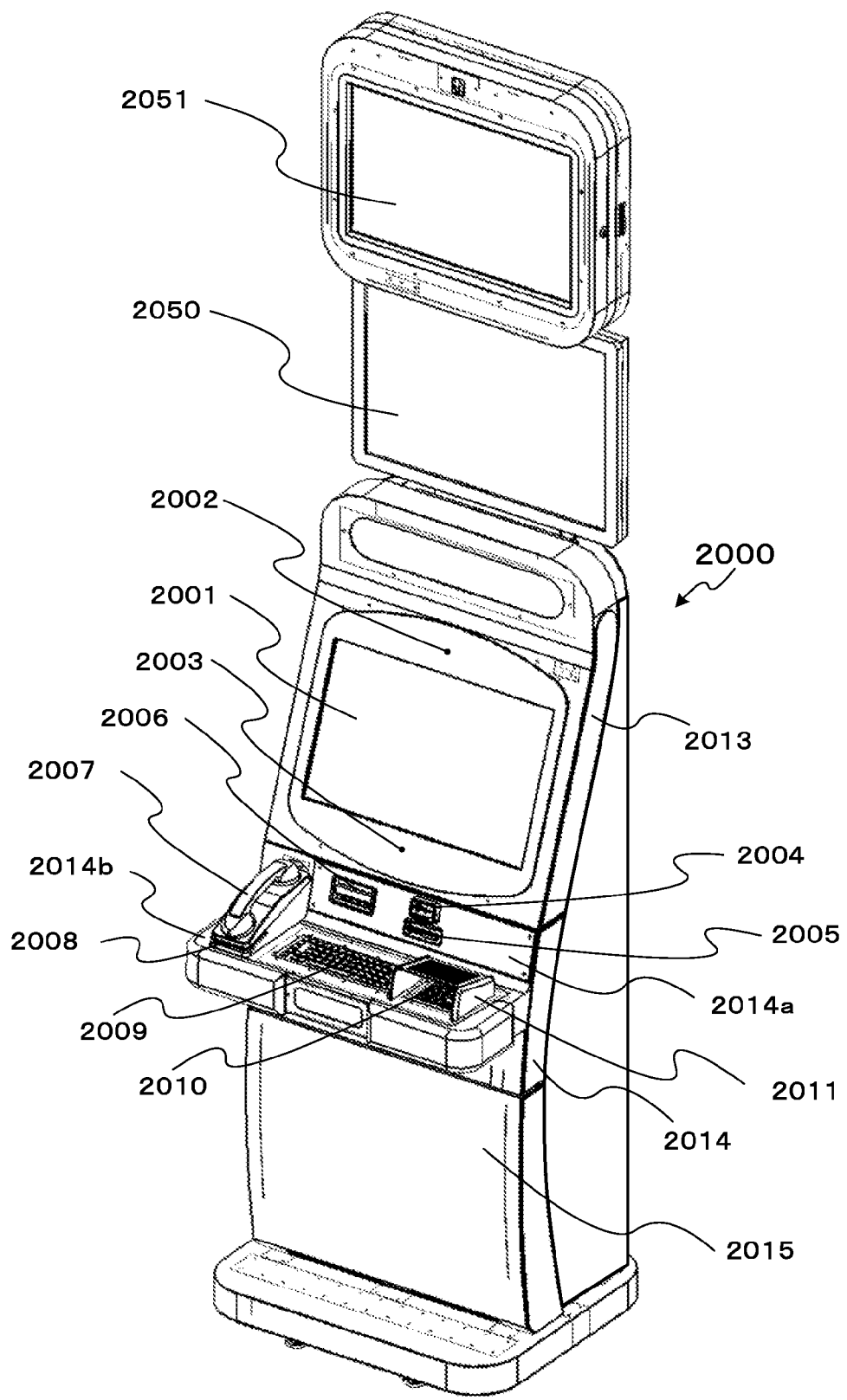
FIG. 18 is a view illustrating an overall structure of the kiosk terminal according to the one embodiment of the present invention.

In addition, as shown in FIG. 18, on an upper portion of the kiosk terminal 2000, an LCD 2050 and an LCD 2051 are located. In this example, each of the LCD 2050 and the LCD 2051 has a touch panel function, is connected to the kiosk terminal 2000, and is controlled to display a variety of pieces of information as needed.

In addition, a configuration may also be arranged such that instead of the LCD 2050 and the LCD 2051, an advertisement display board which is formed of paper is located and non-electronic information which does not electronically change is displayed thereon. The above-mentioned advertisement display board can be easily replaced manually by staff of a store or the like with other information board.

A housing of the kiosk terminal 2000 includes: an upper front door 2013 having an LCD 2001 on an upper portion of a front face thereof; a middle front door 2014 having a front panel 2014*a* and a control panel 2014*b* on a middle portion of the front face thereof; and a lower front door 2015 on a lower portion of the front face thereof.

It is to be noted that each of the "doors" of the kiosk terminal 2000 in the present specification is not limited to a door which rotates rightward and leftward around a rotation axis in a vertical direction, which is formed by hinges or the like, and includes doors in a variety of forms such as a door which is flapped up (or down) around a rotation axis in a horizontal direction, which is formed by hinges; a door which is drawn out in a horizontal direction along rail guides; and a door which is simply detached from a main body.

The LCD 2001 is a liquid crystal display device having a touch panel function, and on this LCD, for example, information or the like pertinent to a store is displayed. It is to be noted that although in this example, the LCD 2001 is configured to have the touch panel function, instructions may be inputted by other input devices such as the later-described keyboard 2009 and numeric keypad 2010.

Further, the kiosk terminal 2000 includes motion sensors 2002 and 2003 above and below the LCD 2001, respectively. The motion sensors 2002 and 2003 are, for example, cameras, and images shot by the motion sensors 2002 and 2003 are used to analyze behavior of a user of the kiosk terminal 2000 and customers passing along passages.

On a front panel 2014*a* of the middle front door 2014, a touch unit 2004 is located. The touch unit 2004 includes an RFID module which is operable to perform data communication with a non-contact IC card, and a mobile phone and a smartphone, each of which has a communication function by NFC. A user in a game facility holds a user card (IC card) associated with the user over this touch unit 2004, thereby allowing a user menu screen to be displayed on the LCD 2001 and can conduct, for example, displaying and inputting of user information, member registration, displaying of donation ranking, and the like there. It is to be noted that the displaying of the donation ranking can also be conducted without holding a user card over the touch unit 2004.

In addition to the touch unit 2004 or instead of the touch unit 2004, the kiosk terminal 2000 may include an information recording medium reading device for reading information stored in an information recording medium such as a magnetic card. In this case, instead of the IC card 1500, the magnetic card can be used as a user card.

In addition, a staff member of a game facility holds an IC card of the staff member thereover, can thereby log therein, and can display a menu screen for staff or the like on the LCD 2001.

On the front panel 2014*a* of the middle front door 2014, further, a card insertion slot 2005 of a card unit 2030 is located, and insertion and taking-out of an IC card as well as ejection of a newly issued IC card can be conducted. In addition, the card insertion slot 2005 is provided with an eject button 2030*c*. Here, the card insertion slot 2005 is configured as a part of the card unit 2030.

When a user card is inserted from the card insertion slot 2005, a user menu screen and information (user information) pertinent to that user can be displayed on the LCD 2001. In addition, the card unit 2030 can issue a special card (for example, an IC card for which some added value is provided on a predetermined condition) or the like and can collect an IC card.

In addition, on the front panel 2014*a* of the middle front door 2014, a common bezel 2006 which is connected to a discharge port of printed matter discharged from a ticket printer 2038 and an input port for inputting a paper sheet into a paper sheet processing device 2040 is located. For example, a ticket or a coupon is printed (issued) by the ticket printer 2038 and is discharged from the bezel 2006 connected to the discharge port. In addition, for example, when a ticket or a coupon is inputted from the bezel 2006 connected to the input port, the ticket or the like is collected by the paper sheet processing device 2040, and after information of the ticket has been read, processing in accordance with said read information is conducted.

In addition, the bezel 2006 is provided with a bezel LED 2042 which lights up in conjunction with processing of the ticket printer 2038 and processing of the paper sheet processing device 2040. It is to be noted that the paper sheet processing device 2040 may be a bill validator having a bill identification function.

In addition, on an upper face of a control panel 2014*b* which is formed as a bulging part bulging (protruding) from the middle front door 2014, a phone receiver 2007 used in a phone call by VoIP is located. A user of the kiosk terminal 2000 can have conversation with a user of other kiosk terminal 2000 or a staff member in a game facility via the phone receiver 2007. In addition, an incoming LED 2008 located on a mounting part on which the phone receiver 2007 is mounted is controlled to emit light upon incoming of a phone call by the VoIP.

Further, on the upper face of the control panel 2014*b*, a keyboard 2009 and a numeric keypad 2010 which a user uses to input data are located. Further, on both sides and an upper side of the numeric keypad 2010, a keypad guard 2011 for peep prevention is provided.

Behind the lower front door 2015 of the kiosk terminal 2000 (inside of the housing of the kiosk terminal 2000), the later-described controller 2020 and a control part for controlling LCDs, LEDs, and the like are housed.

[Configuration of Circuitry of Kiosk Terminal]

Figure 19:
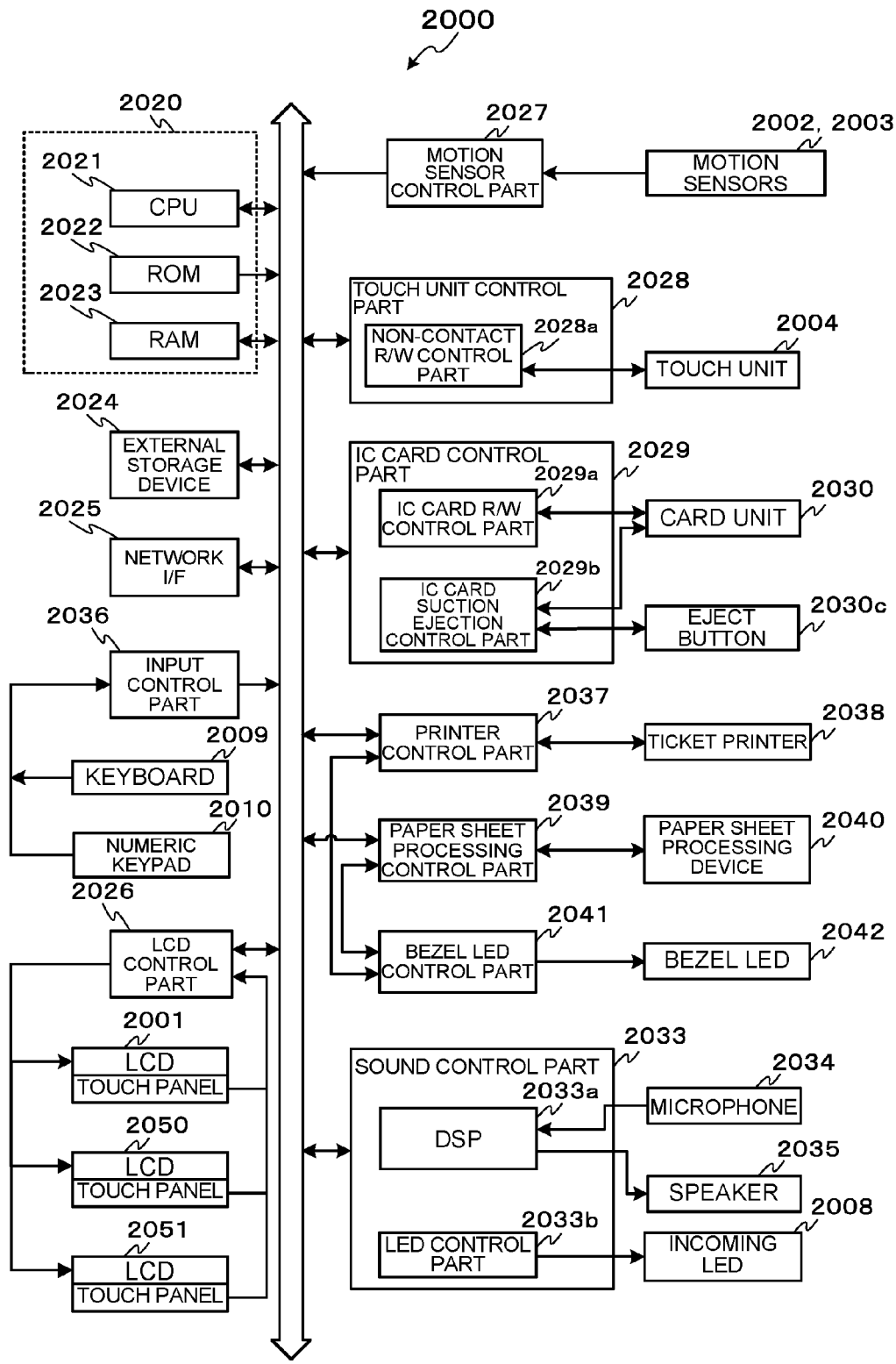
FIG. 19 is a diagram showing a circuitry configuration of the kiosk terminal according to the one embodiment of the present invention.

Next, with reference to FIG. 19, a configuration of circuitry which a kiosk terminal 2000 includes will be described.

A controller 2020 for controlling the kiosk terminal 2000 has a CPU 2021, a ROM 2022, and a RAM 2023.

The CPU 2021 performs execution control of the respective components of the kiosk terminal 2000, executes various kinds of programs stored in the ROM 2022, and performs computation therefor.

The ROM 2022 is constituted of a memory device such as a flash memory, and permanent data used for the execution by the CPU 2021 is stored therein. For example, a communication control program by the VoIP and the like can be stored therein.

The RAM 2023 temporarily stores data required upon executing the various kinds of programs stored in the ROM 2022.

An external storage device 2024 is, for example, a storage device such as a hard disk device and stores programs executed in the CPU 2021 and data which the programs executed in the CPU 2021 use.

A network I/F (interface) 2025 realizes data communication with a computer (for example, a hall management server 10) in a game facility, a server on the Internet, and the like.

An LCD control part 2026 controls the LCD 2001, the LCD 2050, and the LCD 2051 to display a variety of pieces of information. In addition, each of the LCD 2001, the LCD 2050, and the LCD 2051 has a touch panel function, and an operation on the touch panel by a user is transmitted to the CPU 2021.

A motion sensor control part 2027 obtains images of a user and the like received from motion sensors (for example, cameras) 2002 and 2003, subjects the images to predetermined image processing as needed, and transmits the processed data to the CPU 2021.

A touch unit control part 2028 controls data transmission and reception in association with a touch operation of an IC card or a mobile phone on a touch unit 2004. The touch unit control part 2028 includes a non-contact R/W (reader/writer) control part 2028*a*.

The non-contact R/W control part 2028*a* determines whether or not there has been the touch operation of an IC card or a mobile phone on the touch unit 2004 and when there has been the touch operation, obtains a read result or the like from the touch unit 2004. The touch unit 2004 has an antenna part for performing data transmission and reception with an IC card or a mobile phone through NFC or the like.

An IC card control part 2029 controls insertion and ejection of an IC card, reading of data, and the like. The IC card control part 2029 includes an IC card R/W (reader/writer) control part 2029*a* and an IC card suction ejection control part 2029*b*.

The IC card R/W control part 2029*a* controls a card unit 2030 to read an identification ID or the like stored on an IC card. The card unit 2030 has an antenna part for writing data through NFC or the like into an IC card.

The IC card suction ejection control part 2029*b* controls suction and ejection of an IC card. When an IC card is inserted into a card insertion slot 2005 by a user, the IC card suction ejection control part 2029*b* controls the IC card to be held in the card unit 2030 until the user logs off. In addition, when an eject button is pressed, the IC card suction ejection control part 2029*b* ejects the IC card.

In addition, the card unit 2030 includes a stacker which is capable of holding a plurality of IC cards so as to allow an IC card to be newly issued on a predetermined condition. It is to be noted that although in the present embodiment, the card unit 2030 conducts the suction, the ejection, the issuance, and the like of an IC card, the card unit 2030 can also be configured to handle other media (for example, a magnetic card, and the like).

A ticket printer control part 2037 controls a ticket printer 2038, for example, to print (issue) a ticket and a coupon.

A paper sheet processing control part 2039 controls a paper sheet processing device 2040, for example, to collect a ticket and a coupon and to conduct processing in accordance with information read from the ticket and the like. As described above, the paper sheet processing control part 2039 and the paper sheet processing device 2040 may be configured as a bill validator for handling bills.

A bezel LED control part 2041 is connected to the ticket printer 2038 and the paper sheet processing device 2040 and controls a bezel LED 2042 to light up in conjunction with processing of the ticket printer 2038 and the paper sheet processing device 2040. For example, when a user is operating the kiosk terminal 2000, at timing when a ticket is printed and ejected, the bezel LED 2042 is controlled to light up, and when a user is prompted to input a coupon, the bezel LED 2042 is controlled to light up. In addition, the bezel LED 2042 may light up in any mode.

Here, the lighting up mode of the bezel LED 2042 can also be set such that a lighting up mode related to the processing of the ticket printer 2038 is different from a lighting up mode related to the processing of the paper sheet processing device 2040.

It is to be noted that although in this example, the bezel LED 2042 is configured to light up in conjunction with the processing of the ticket printer 2038 and the processing of the paper sheet processing device 2040, in order to conduct notification to a user, another notification device which is different from the bezel LED 2042 may be used.

A sound control part 2033 inputs and outputs sounds by using a microphone 2034 and a speaker 2035 included in the phone receiver 2007. The sound control part 2033 includes a DSP 2033*a* and an LED control part 2033*b*. The DSP 2033*a* performs control through predetermined sound signal processing related to sound inputting from the microphone 2034 and sound outputting from the speaker 2035. The LED control part 2033*b* controls an incoming LED 2008 to emit light based on an incoming signal by a VoIP phone call or the like.

An input control part 2036 converts input on a keyboard 2009 and input on a numeric keypad 2010 from a user to signals and transmits the signals to the CPU 2021.

[Configuration of Signage]

Figure 20:
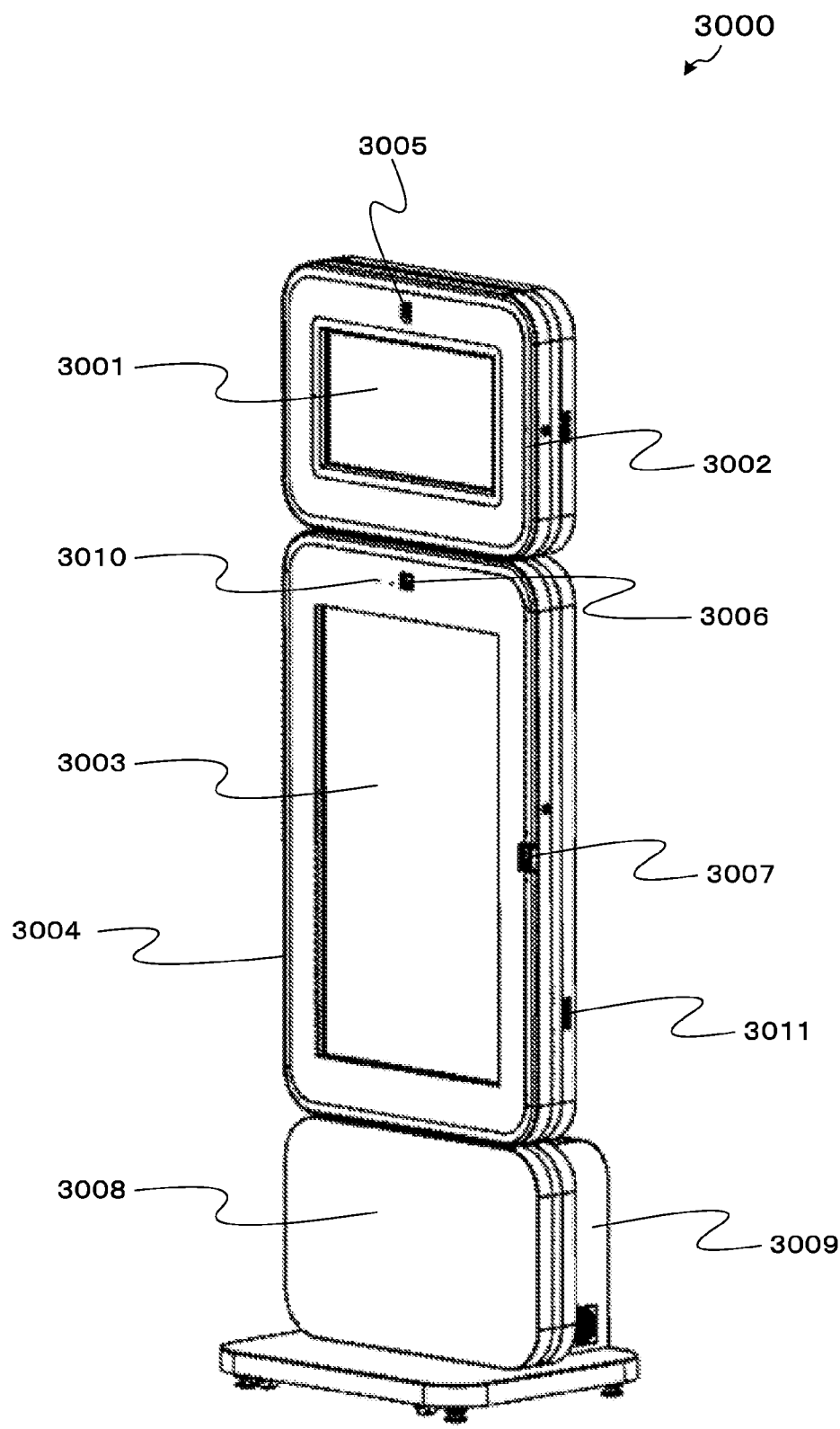
FIG. 20 is a view illustrating an overall structure of a signage according to one embodiment of the present invention.

Next, with reference to FIG. 20, a configuration of a signage which can be used as an information terminal in the present embodiment will be described. The signage 3000 is an information display device used to display store advertisement (including advertisement signboards), a floor guide of a game facility, and the like and can be connected to a server (for example, a hall management server 10) of a game system 1 via a network.

The signage 3000 includes an LCD 3001 and an LCD 3003 having a touch panel function. The LCD 3001 is, for example, a 24-inch (approximately 60.96 cm) liquid crystal display device and the LCD 3003 is, for example, a 46-inch (approximately 116.84 cm) liquid crystal display device, and on these LCDs, as described above, the advertisement information, the guide information, and the like are displayed. In addition, the touch panel function which the LCD 3003 has is performed by, for example, a touch panel using an infrared ray system. It is to be noted that although in this example, the LCD 3003 is configured to have the touch panel function, the LCD 3003 may be configured such that other input devices such as a keyboard and a mouse are used to input instructions thereto.

The LCD 3001 and the LCD 3003 are housed in respective cabinets, and on peripheral parts of said cabinet front faces, presentation LEDs 3002 and 3004 for presentation are provided, respectively. The presentation LEDs 3002 and 3004 are, for example, tape-shaped LED lights.

Further, the signage 3000 includes motion sensors 3005 and 3006 in the cabinet of the LCD 3001 and the cabinet of the LCD 3003, respectively. The motion sensors 3005 and 3006 are, for example, cameras, and images shot by the motion sensors 3005 and 3006 are used to analyze behavior of a user of the signage 3000 and customers passing along passages.

The signage 3000 also includes a touch unit 3007 including an RFID module which is operable to perform data communication with a non-contact IC card, and a mobile phone and a smartphone, each of which has a communication function by NFC. A user holds a user card (IC card) associated with the user over the touch unit 3007, can thereby display a user menu screen on the LCD 3001 or the LCD 3003, and can conduct, for example, displaying and inputting of user information, member registration, displaying of donation ranking, and the like there. It is to be noted that the displaying of the donation ranking can also be conducted without holding a user card over the touch unit 3007.

In addition, a staff member of a hall holds an IC card of the staff member thereover, can thereby log therein and can display a menu screen for a staff member or the like on the LCD 3001 or the LCD 3003.

The signage 3000 has no card unit for holding an IC card 1500, as compared with a PTS terminal 1700 and only includes the touch unit 3007. However, the signage 3000 is arranged such that even when after a user has touched the IC card, the user has left without logging off, the information of a member displayed on the LCD 3003 or the like through the touching comes not to be displayed after the elapse of a predetermined time period and the logging off is automatically made.

Further, the signage 3000 includes a microphone 3033 for obtaining sound into the cabinet of the LCD 3003. In the cabinet of the LCD 3003, a microphone opening 3010 whose position corresponds to a position where the microphone is provided is located. In FIG. 20, beside the motion sensor 3006, this microphone opening 3010 is shown.

In addition, the signage 3000 includes speakers 3034 and 3035 for outputting sound into the cabinet of the LCD 3003. In the cabinet of the LCD 3003, speaker ducts whose positions correspond to positions where the speakers are provided are located. In FIG. 20, the speaker duct 3011 which corresponds to one of the speakers is shown.

In addition thereto, the signage 3000 includes a base unit 3008 for supporting the cabinet of the LCD 3001 and the cabinet of the LCD 3003 and a control unit 3009 in which a control part for controlling the respective LCDs, LEDs, and the like is housed.

[Configuration of Circuitry of Signage]

Figure 21:
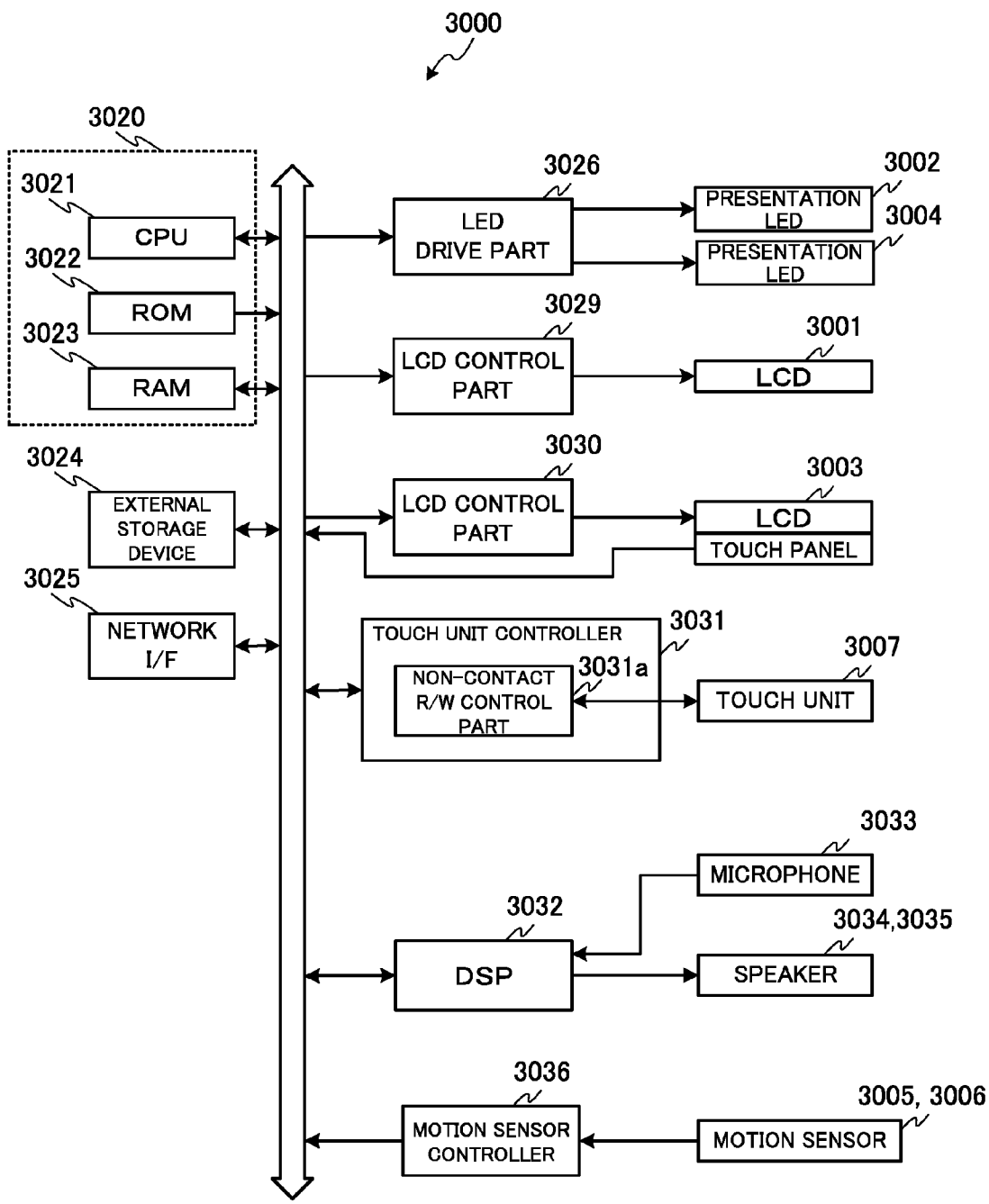
FIG. 21 is a diagram showing a circuitry configuration of the signage according to the one embodiment of the present invention.

Next, with reference to FIG. 21, a configuration of circuitry which a signage 3000 includes will be described.

A signage controller 3020 which controls the signage 3000 has a CPU 3021, a ROM 3022, and a RAM 3023.

The CPU 3021 performs execution control of the respective components of the signage, executes various kinds of programs stored in the ROM 3022, and performs computation therefor.

The ROM 3022 is constituted of a memory device such as a flash memory, and permanent data used for the execution by the CPU 3021 is stored therein.

The RAM 3023 temporarily stores data required upon executing the various kinds of programs stored in the ROM 3022.

An external storage device 3024 is, for example, a storage device such as a hard disk device and stores programs executed in the CPU 3021 and data which the programs executed in the CPU 3021 use.

A network I/F (interface) 3025 realizes data communication with a hall management server 10.

An LED driving part 3026, in response to a predetermined presentation start request, a lighting-up instruction, or the like, controls presentation LEDs 3002 and 3004 to light up at predetermined timing. In addition, the LED driving part 3026 can also cause the presentation LEDs 3002 and 3004 to emit light in synchronization with displaying of advertisement information, displaying of guide information, displaying of user information based on an operation by a user, and the like.

An LCD control part 3029 controls pieces of information such as the above-described donation ranking and advertisement information to be displayed on an LCD 3001.

An LCD control part 3030 controls the above-described user menu screen and the pieces of information such as the donation ranking and the advertisement information to be displayed on an LCD 3003. In addition, the LCD 3003 includes a touch panel function, with which an operation from a user is transmitted to the CPU 3021.

A touch unit control part 3031 controls data transmission and reception in association with a touch operation of an IC card or a mobile phone on a touch unit 3007. The touch unit control part 3031 includes a non-contact R/W (reader/writer) control part 3031*a*.

The non-contact R/W control part 3031*a* determines whether or not there has been the touch operation of an IC card or a mobile phone on the touch unit 3007 and when there has been the touch operation, obtains a read result or the like from the touch unit 3007. The touch unit 3007 has an antenna part for performing data transmission and reception with an IC card or a mobile phone through NFC or the like.

When the CPU 3021 has obtained an identification ID of a user card (IC card) from the touch unit 3007, the CPU 3021 obtains user information of a user associated with the identification ID from a user information table, checks a Pincode, and thereafter, causes the user menu screen including said user information to be displayed on the LCD 3001 or the LCD 3003. In addition, the CPU 3021 can also cause advertisement information suited for the user to be displayed on the LCD 3001 or the LCD 3003.

A DSP 3032 receives sound data obtained from a microphone 3033, subjects the received sound data to predetermined processing, and thereafter, transmits the processed data to the CPU 3021. In addition, in order to output the received sound data, the DSP 3032 transmits this data to speakers 3034 and 3035.

A motion sensor control part 3036 obtains images of a user and the like received from motion sensors (for example, cameras) 3005 and 3006, subjects the images to predetermined image processing as needed, and transmits the processed data to the CPU 3021.

[Configuration of Hardware of Each Server]

Figure 22:
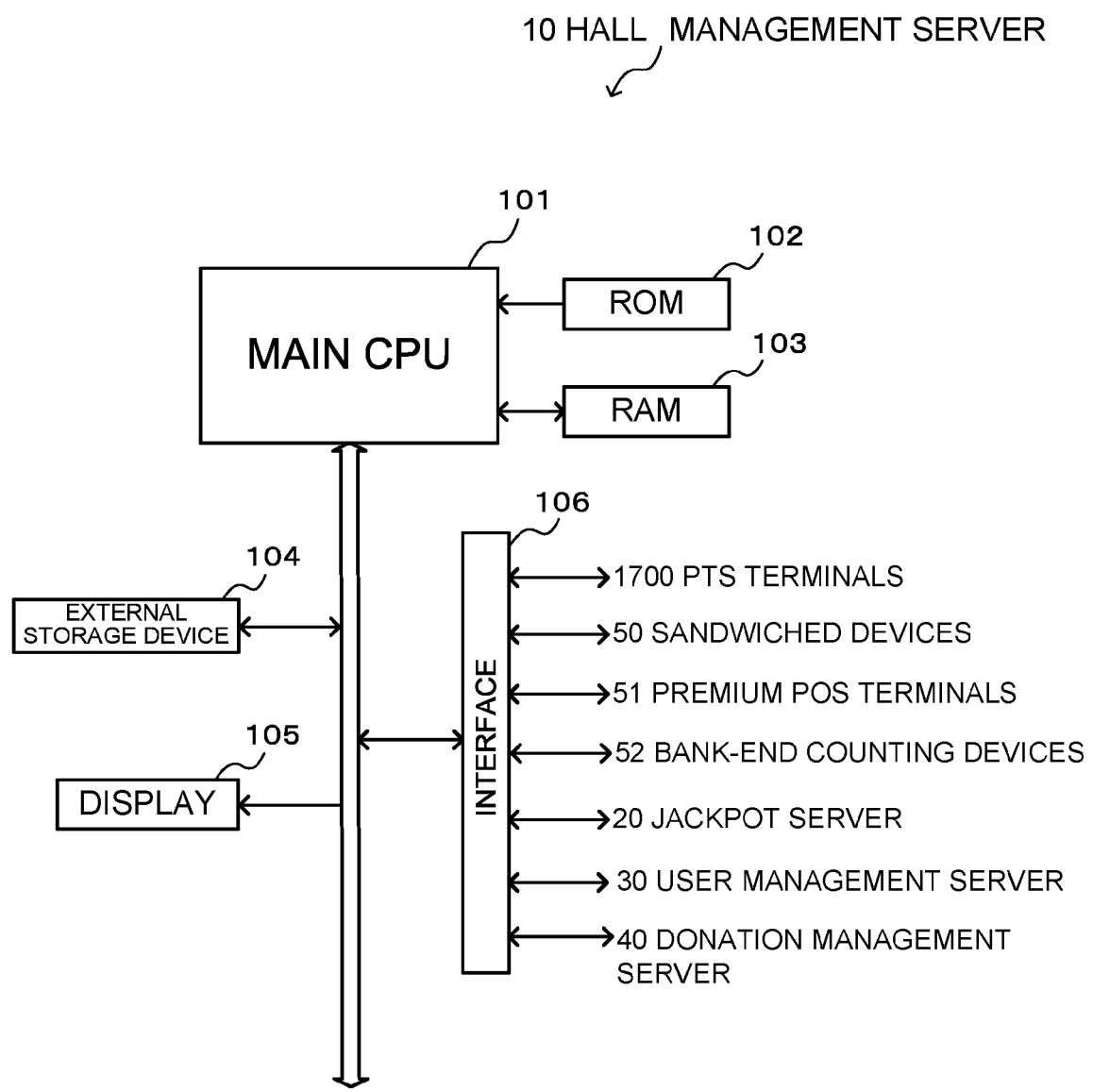
FIG. 22 is a diagram showing a hardware configuration of a hall management server according to one embodiment of the present invention.

Next, with reference to FIG. 22 to FIG. 25, hardware configurations of respective servers in a game system 1 according to the present embodiment will be described. First, with reference to FIG. 22, a hardware configuration of a hall management server 10 will be described. FIG. 22 is a block diagram showing the hardware configuration of the hall management server 10. The hall management server 10 includes, a main CPU 101, a ROM 102, a RAM 103, an external storage device 104, a display 105, and an interface 106.

The main CPU 101 reads out and executes control programs stored in the ROM 102 and the RAM 103. For example, based on accounting information received from each slot machine 1010 via a PTS terminal 1700, the main CPU 101 manages information of a user card for each user. In addition, the main CPU 101 transmits data received from slot machines 1010 via the PTS terminals 1700 to the other servers (a jackpot server 20, a user management server 30, and a donation management server 40) as needed. Further, the main CPU 101 controls outputting of data displayed on the display 105.

In the external storage device 104, the later-described hall management DB is stored, and a card management table and a game history management table are stored therein.

The display 105 is to display states of accounting information managed by the hall management server 10 and data transmission and reception with the slot machines 1010 or to notify the occurrence of fraudulence or abnormality. This display 105 is realized by, for example, a liquid crystal display device.

The interface 106 controls communication with other computers via a network. The hall management server 10 is connected so as to be operable to communicate, via the interface 106, with the PTS terminals 1700 (slot machines 1010), the jackpot server 20, the user management server 30, and the donation management server 40. In addition, the game system 1 can include sandwiched devices 50, premium POS terminals 51, bank-end counting devices 52, and the like, which are not shown in FIG. 1 or the like. The hall management server 10 is connected so as to be operable to communicate, via the interface 106, also with these devices.

It is to be noted that control programs executed on the hall management server 10 to implement the present invention are stored, for example, in the external storage device 104 and are loaded to the RAM 103, and thereafter, the main CPU 101 executes the control programs. In addition, said control programs can also be provided via the interface 106 from other device or via a network including the Internet from other external device.

Figure 23:
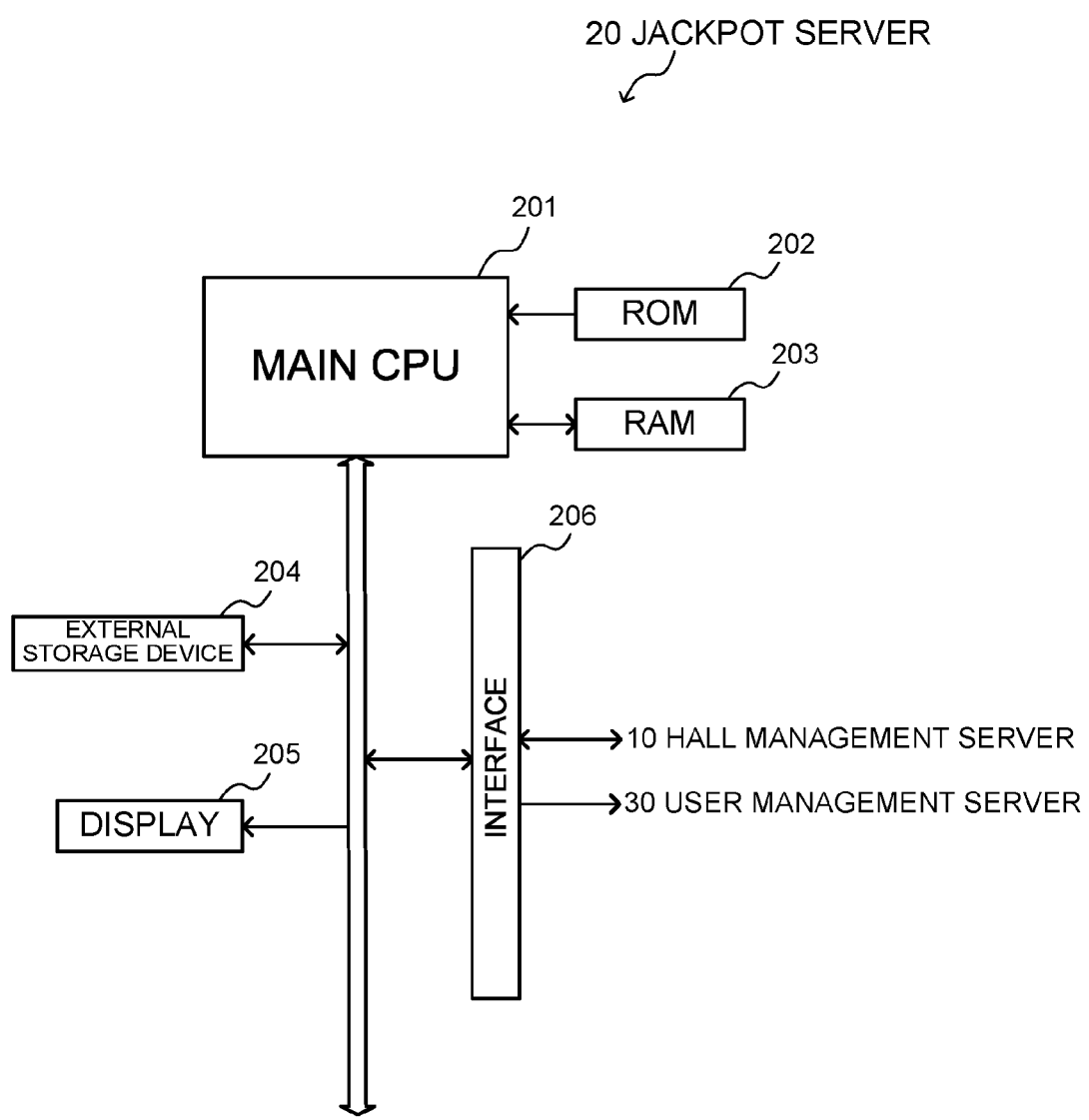
FIG. 23 is a diagram showing a hardware configuration of a jackpot server according to one embodiment of the present invention.

Next, with reference to FIG. 23, a hardware configuration of the jackpot server 20 will be described. FIG. 23 is a block diagram showing the hardware configuration of the jackpot server 20. The jackpot server 20 includes a main CPU 201, a ROM 202, a RAM 203, an external storage device 204, and an interface 206. In addition, a display 205 can be included therein as needed.

The main CPU 201 reads out and executes control programs stored in the ROM 202 and the RAM 203. For example, the main CPU 201 stores accumulation amounts received from slot machines 1010, and when jackpot winning notification is received from a slot machine 1010, the main CPU 201 transmits a jackpot amount to that slot machine 1010. In addition, in a case where the display 205 is included, the main CPU 201 controls outputting of data displayed on the display 205.

In the external storage device 204, a DB and the like for managing the above-mentioned accumulation amounts are stored.

The interface 206 controls communication via a network with other computers. The jackpot server 20 is connected so as to be operable to communicate, via the interface 206, with the hall management server 10 and the user management server 30. In the present embodiment, via the hall management server 10, data transmission and reception with the slot machines 1010 is performed.

Figure 24:
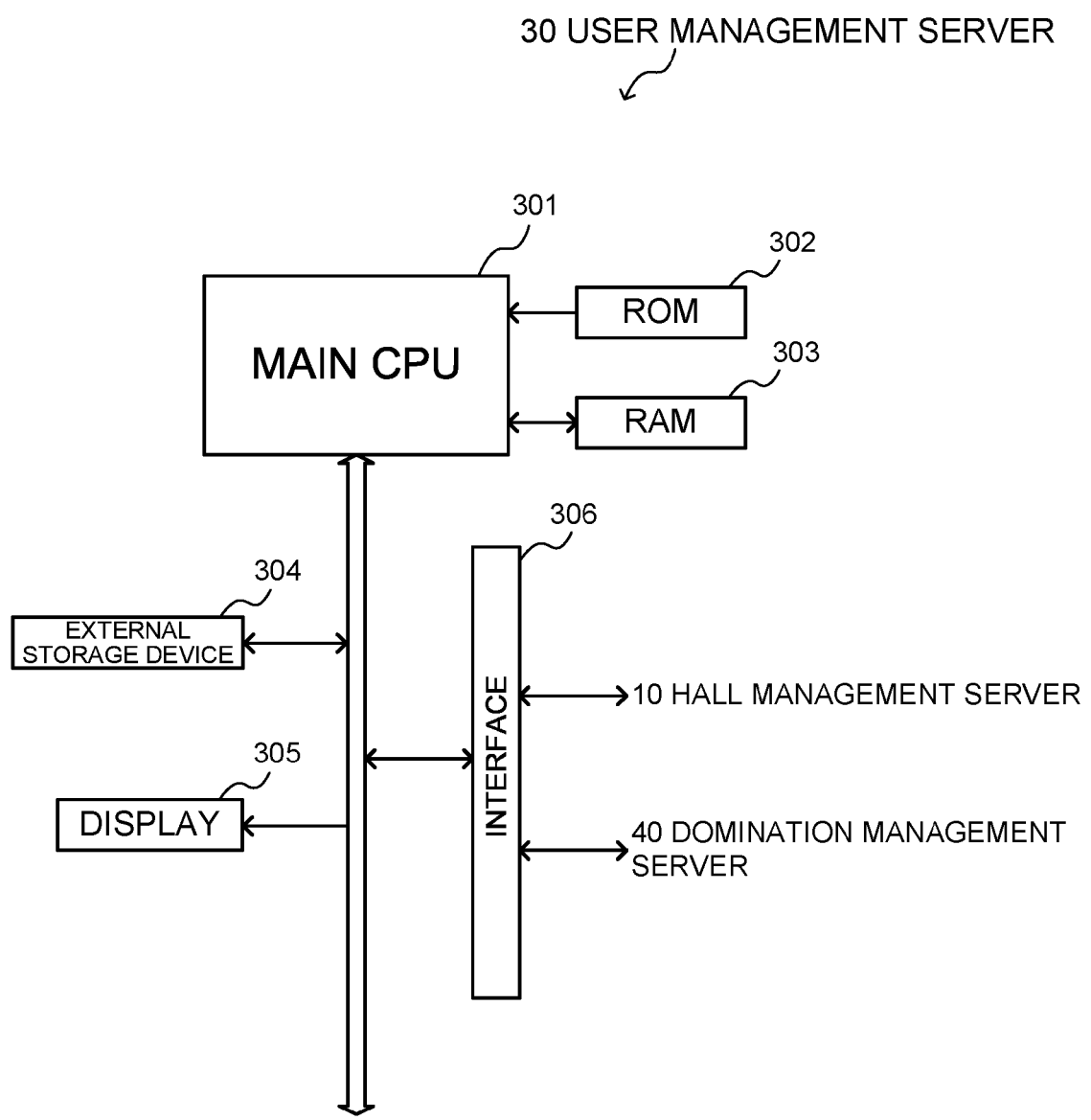
FIG. 24 is a diagram showing a hardware configuration of a user management server according to one embodiment of the present invention.

Next, with reference to FIG. 24, a hardware configuration of the user management server 30 will be described. FIG. 24 is a block diagram showing the hardware configuration of the user management server 30. The user management server 30 includes a main CPU 301, a ROM 302, a RAM 303, an external storage device 304, and an interface 306. In addition, a display 305 can be included therein as needed.

The main CPU 301 reads out and executes control programs stored in the ROM 302 and RAM 303. For example, based on user information received from the slot machines 1010 via the hall management server 10, the main CPU 301 manages user information and member information. Further, the main CPU 301 controls outputting of data displayed on the display 305 as needed.

In the external storage device 304, the later-described user management DB is stored, and a user information table, a member information table, and a friend information table are stored therein.

The interface 306 controls communication via a network with other computers. The user management server 30 is connected so as to be operable to communicate, via the interface 306, with the hall management server 10 and the donation management server 40.

It is to be noted that control programs executed on the user management server 30 to implement the present invention are stored, for example, in the external storage device 304 and are loaded to the RAM 303, and thereafter, the main CPU 301 executes the control programs. In addition, said control programs can also be provided via the interface 306 from other device or via a network including the Internet from other external device.

Figure 25:
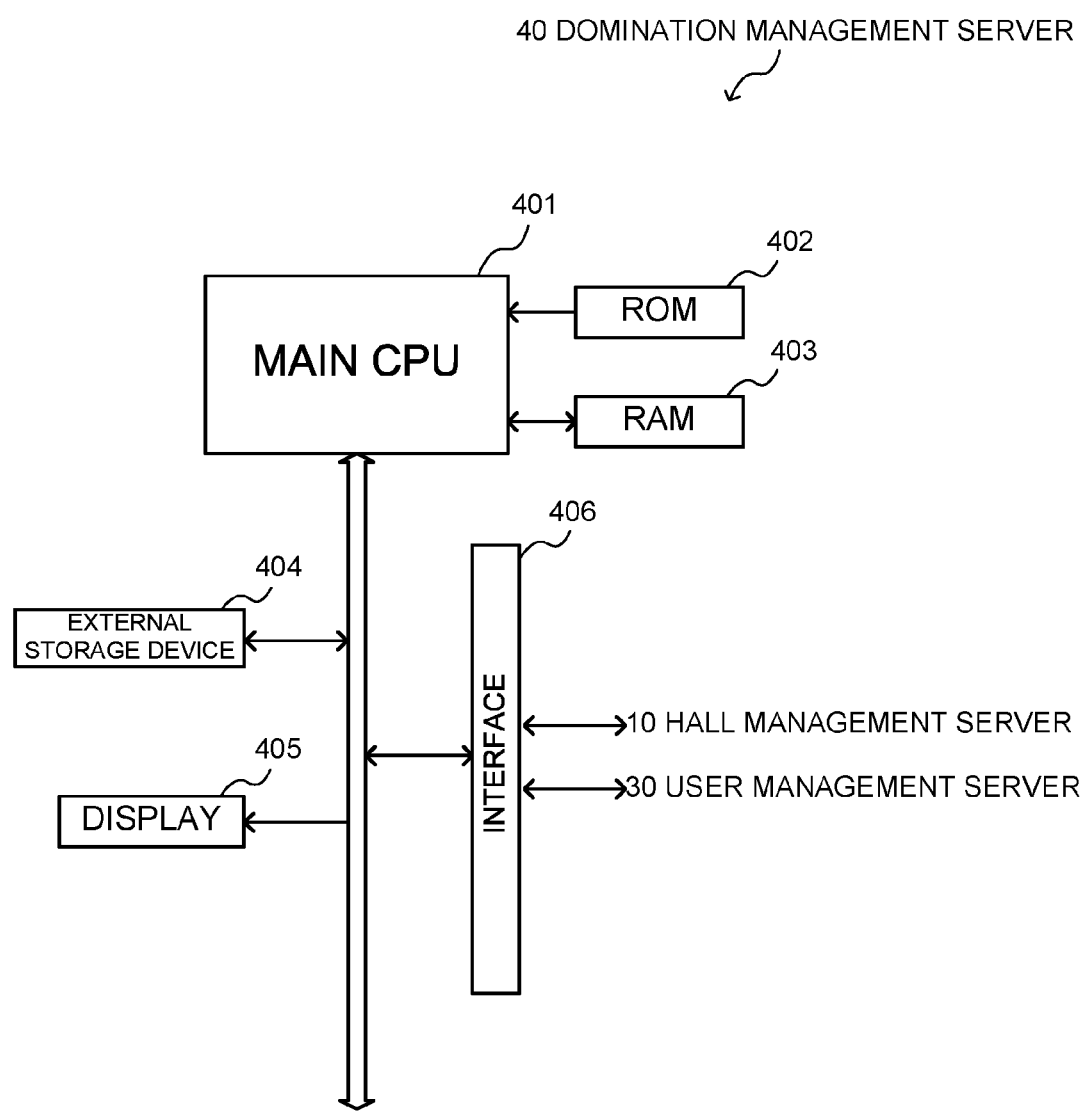
FIG. 25 is a diagram showing a hardware configuration of a donation management server according to one embodiment of the present invention.

Next, with reference to FIG. 25, a hardware configuration of the donation management server 40 will be described. FIG. 25 is a block diagram showing the hardware configuration of the donation management server 40. The donation management server 40 includes a main CPU 401, a ROM 402, a RAM 403, an external storage device 404, and an interface 406. In addition, a display 405 can be included therein as needed.

The main CPU 401 reads out and executes control programs stored in the ROM 402 and the RAM 403. For example, based on donation setting information, the main CPU 401 collects a predetermined donation amount from a card balance or a payout of a user and updates the card balance of the corresponding user. Further, the main CPU 401 controls outputting of data displayed on the display 405.

In the external storage device 404, the later-described donation management DB is stored, and a donation setting information table, a user donation information management table, a donation destination management table, a point exchange rate management table, and a donation track record management table are stored therein.

The interface 406 controls communication via a network with other computers. The donation management server 40 is connected so as to be operable to communicate, via the interface 406, with the hall management server 10 and the user management server 30.

It is to be noted that control programs executed on the donation management server 40 to implement the present invention are stored, for example, in the external storage device 404 and are loaded to the RAM 403, and thereafter, the main CPU 401 executes the control programs. In addition, said control programs can also be provided via the interface 406 from other device or via a network including the Internet from other external device.

[Outline of Functions of Each Server]

Figure 26:
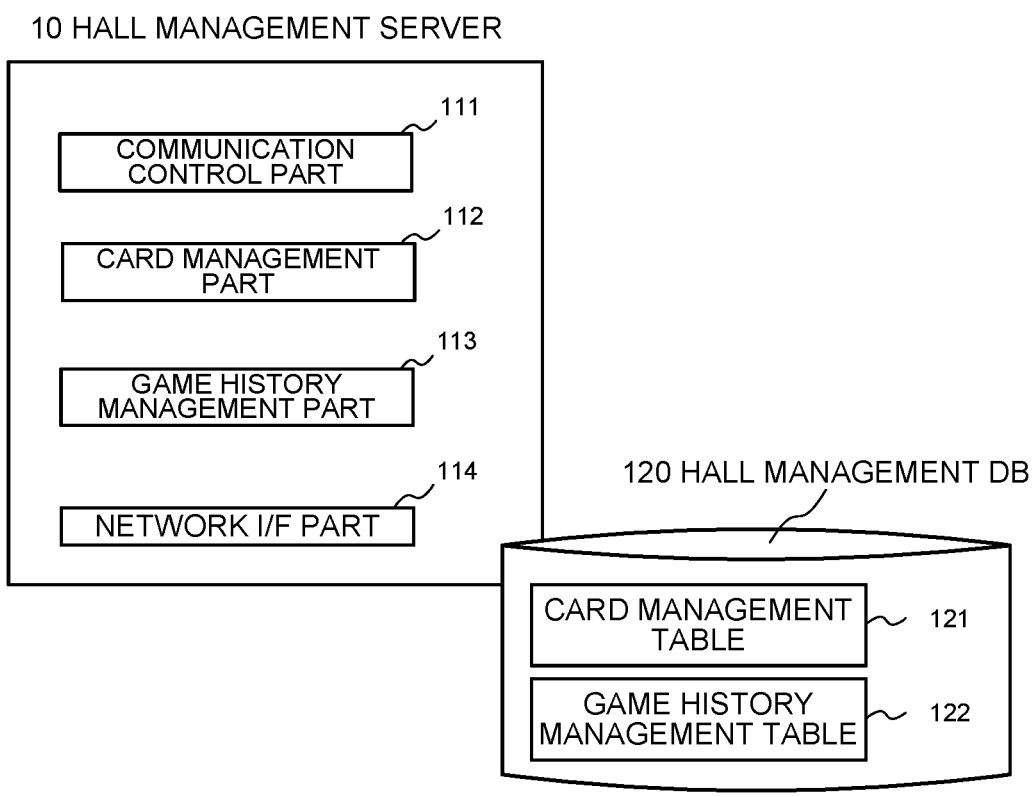
FIG. 26 is a functional block diagram of the hall management server according to the one embodiment of the present invention.

Next, with reference to FIG. 26 to FIG. 28, outlines of functions of respective servers in a game system 1 according to the present embodiment will be described. It is to be noted that description of an outline of functions of a jackpot server 20 is omitted. First, with reference to FIG. 26, respective functions of a hall management server 10 will be described. FIG. 26 is a functional block diagram of the hall management server 10.

As shown in FIG. 26, the hall management server 10 includes a communication control part 111, a card management part 112, a game history management part 113, and a network I/F part 114. In addition, the hall management server 10 includes a hall management DB 120, and in the hall management DB 120, a card management table 121 and a game history management table 122 are stored.

The communication control part 111 transmits, to a relevant server (the jackpot server 20, a user management server 30, or a donation management server 40), data received, via each PTS terminal 1700, from each slot machine 1010, a kiosk terminal 2000, a signage 3000, or the like. When the data is received from each of these servers, the communication control part 111 performs control so as to transmit said data to a slot machine 1010 having a corresponding machine ID or the like as needed.

As described above, in the game system 1 according to the present embodiment, the hall management server 10 functions also as a communication server. However, a configuration may be arranged such that each of the relevant servers directly receives data transmitted from a slot machine 1010, a kiosk terminal 2000, a signage 3000, or the like, and data is directly transmitted from said server to a slot machine 1010 or the like.

The card management part 112, based on accounting information or the like received from a slot machine 1010, manages a card balance or the like of each user so as to be associated with a user card and updates contents of the card management table 121. In addition, the card management part 112 manages a coupon and a rank of each user so as to be associated with a user card and updates contents of the card management table 121.

The game history management part 113, based on accounting information or the like received from a slot machine 1010, manages a game history of each user on each slot machine and stores contents thereof in the game history management table 122.

The network I/F part 114 controls an interface 106 to perform data transmission and reception with other apparatuses.

Next, with reference to FIG. 27, respective functions of the user management server 30 will be described. FIG. 27 is a functional block diagram of the user management server 30.

Figure 27:
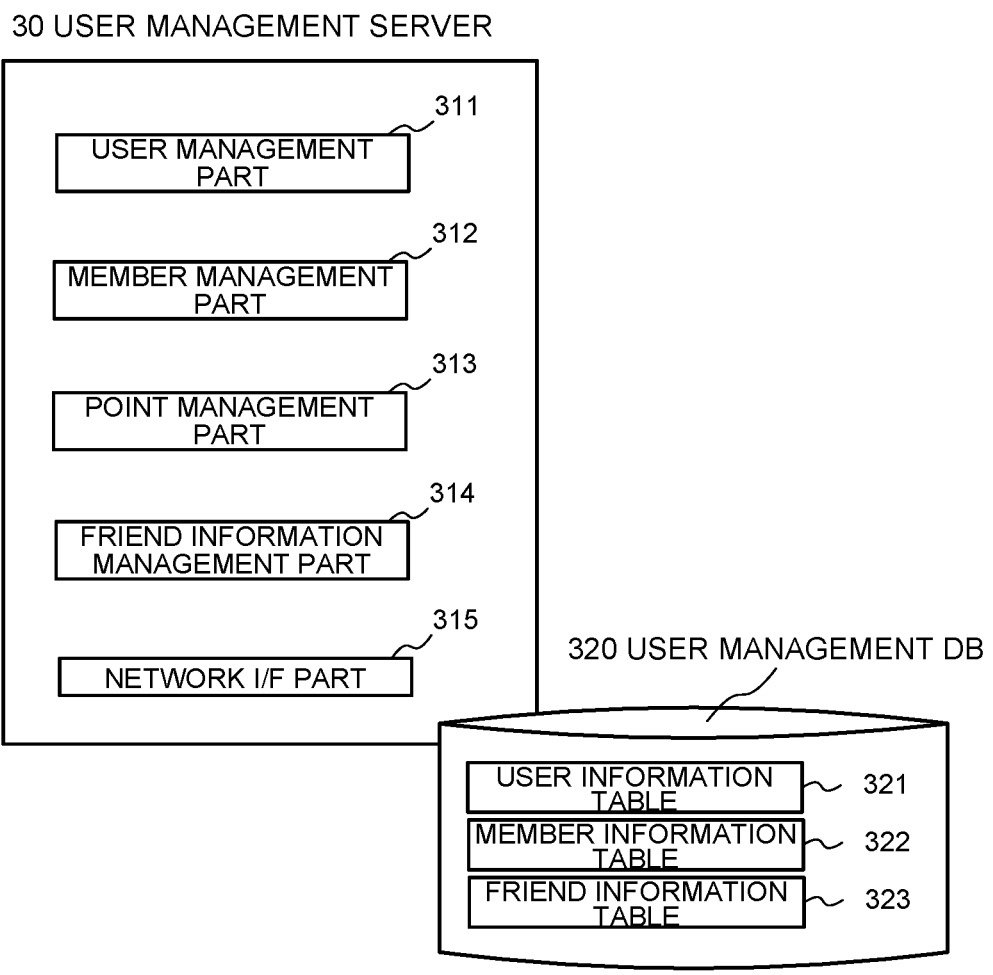
FIG. 27 is a functional block diagram of the user management server according to the one embodiment of the present invention.

As shown in FIG. 27, the user management server 30 includes a user management part 311, a member management part 312, a point management part 313, a friend information management part 314, and a network I/F part 315. In addition, the user management server 30 includes a user management DB 320, and a user information table 321, a member information table 322, and a friend information table 323 are stored therein.

The user management part 311, based on user information transmitted from each slot machine 1010, the kiosk terminal 2000, or the like, manages a name or a nickname of each user, a Pincode, and the like and stores these pieces of information in the user information table 321.

The member management part 312, based on user information transmitted from each slot machine 1010, the kiosk terminal 2000, or the like, manages, an address, a phone number, and the like of each user which are pieces of member information and stores these pieces of information in the member information table 322.

The point management part 313, based on a user operation or game states on each slot machine 1010, the kiosk terminal 2000, or the like, calculates points provided for each user, and when points are consumed for a donation, subtracts said consumed points, and thereby manages user points. In addition, when a user has made a donation, said points are provided for said user in accordance with that donation amount.

User points of each user are stored in the card management table 121 so as to be associated with a user card. These points provided for each user can be used, for example, for predetermined service in a game facility, and in accordance with points, a rank promotion condition of each user is changed to advantageous one.

The friend information management part 314, based on a user operation for friend new registration or the like on each slot machine 1010, the kiosk terminal 2000, or the like, manages friends of each user and stores information pertinent to the friends in the friend information table 323. When a user has made a donation, the friend information management part 314 references the friend information table 323 and performs control so as to display predetermined information on a slot machine 1010 or slot machines 1010 (a PTS terminal 1700 or PTS terminals 1700 thereof) on which a friend or friends of said user is or are playing games.

The network I/F part 315 controls an interface 306 to perform data transmission and reception with other apparatuses.

Next, with reference to FIG. 28, respective functions of the donation management server 40 will be described. FIG. 28 is a functional block diagram of the donation management server 40.

Figure 28:
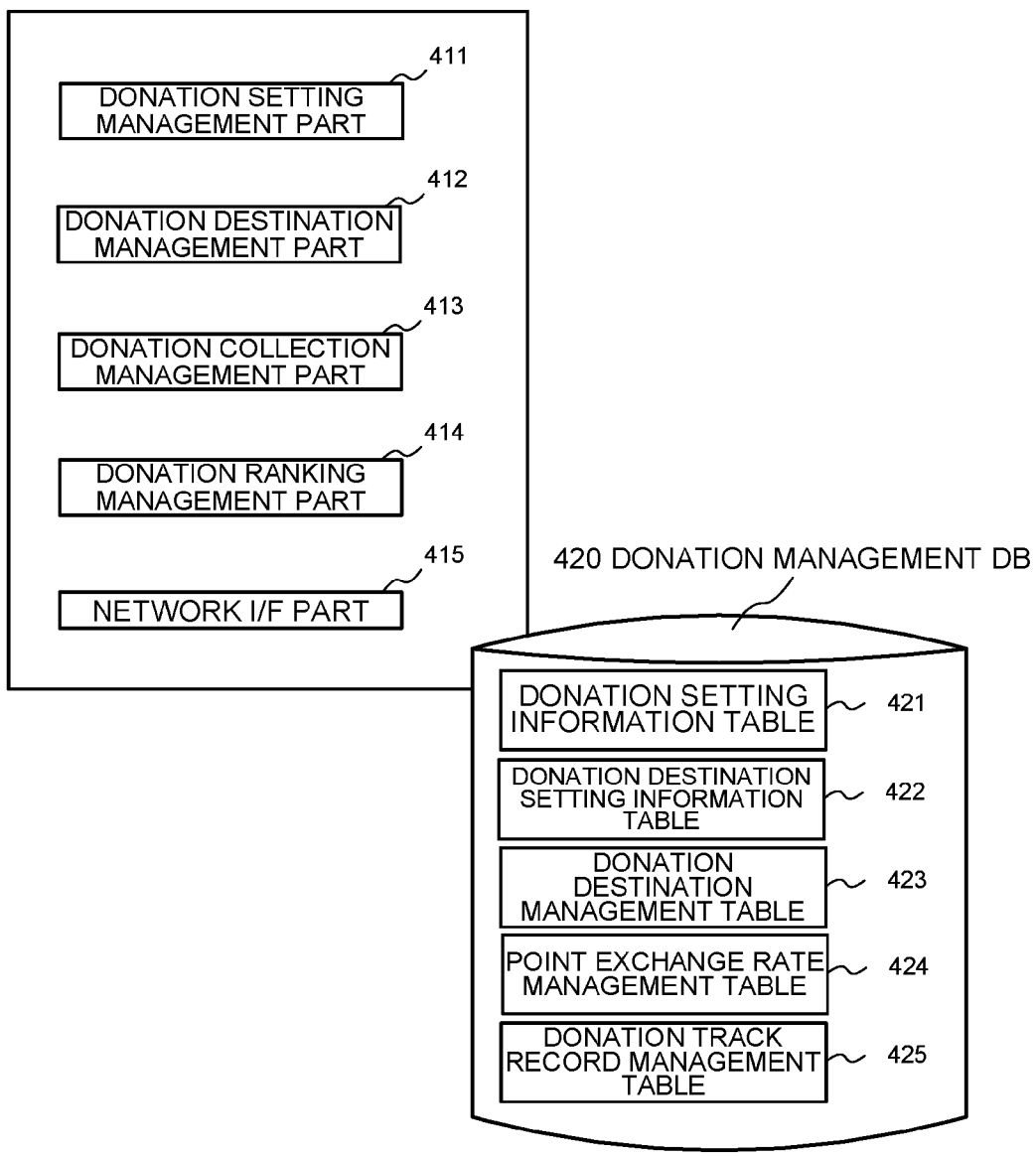
FIG. 28 is a functional block diagram of the donation management server according to the one embodiment of the present invention.

As shown in FIG. 28, the donation management server 40 includes a donation setting management part 411, a donation destination management part 412, a donation collection management part 413, a donation ranking management part 414, and a network I/F part 415. In addition, the donation management server 40 includes a donation management DB 420, and a donation setting information table 421, a donation destination setting information table 422, a donation destination management table 423, a point exchange rate management table 424, and a donation track record management table 425 are stored therein.

The donation setting management part 411, when having received donation setting information inputted by a user from the kiosk terminal 2000, each slot machine 1010, or the like (via the hall management server 10), stores said donation setting information in the donation setting information table 421. In addition, at this time, information pertinent to specifying of a donation destination is stored in the donation destination setting information table 422.

The donation destination management part 412, when on the kiosk terminal 2000, each slot machine 1010, or the like, donation setting information is inputted by a user or a donation is made manually by a user, obtains information of a donation destination from the donation destination management table 423 so as to allow the donation destination to be selected from a list of donation destinations and edits display data so as to allow the information to be displayed on the kiosk terminal 2000, each slot machine 1010, or the like in the form of a drop-down list or the like.

The donation collection management part 413, based on the donation setting information table 421 and the donation destination setting information table 422, automatically collects a donation from a card balance or a payout of a user at timing of cashing-out or timing of payout. When a donation is made by using user points, the donation collection management part 413 references the point exchange rate management table 424 which manages an exchange rate between points and a donation amount. In addition, when a donation has been made, donation contents are stored in the donation track record management table 425. It is to be noted that the donation collection management part 413 stores also contents of a donation manually made by a user in the donation track record management table 425.

The donation collection management part 413, in a case where a setting of a donation by a user is a setting in which a fraction is donated, when there is a fraction in a card balance of a user card, automatically makes a donation. It is to be noted that although the "fraction" is a money amount which is less than a minimum unit of game media required to play one game on a slot machine 1010 as described above, in the present embodiment, a fraction on a gaming machine on which a player (user) is playing games can be interpreted as the "fraction in the game system 1, or a minimum unit of game media, which is the smallest minimum unit among minimum units of game media required to play games on gaming machines in a game system where a player (user) is playing games, can also be interpreted as the "fraction". Although in a case of the former "fraction", it is likely to allow a game to be played on other gaming machine, in a case of the latter "fraction", even one game cannot be played on any of the gaming machines in that game facility.

In addition, in the game system 1 according to the present embodiment, for the definition of the "fraction" (for example, whether the former or the latter described above is set as the fraction), a configuration can also be arranged such that a game facility or a user previously sets the fraction.

When the above-described donation of the fraction is made, even in a case where by subtracting a fraction from a card balance of a user card, a value of the card balance becomes zero or even in a case where by performing the above-mentioned subtraction, the value thereof does not become zero, the donation collection management part 413 is operable to make said donation. When the value of the card balance has become zero, the donation collection management part 413 is operable to control the user card to be ejected from a card unit 1741. The game system 1 performs the above-described control, whereby it can be avoided that a user card is left unremoved from the card unit 1741 for a long period of time and as a result, another user can use a slot machine 1010 at once. In addition, when the value of the card balance has become zero, the game system 1 is also operable to perform control such that that user card is taken into a card stacker 1742 of the card unit 1741.

The donation ranking management part 414 references the donation track record management table 425, totalizes donation amounts in a predetermined period of time for each user, and edits display data to display donation ranking (user ranking). The donation ranking is displayed on the kiosk terminal 2000, a slot machine 1010, or the like.

The network I/F part 415 controls an interface 406 to perform data transmission and reception with other apparatuses.

[Configuration of Each Table]

Next, with reference to FIGS. 29A, B to FIG. 34, configurations of respective tables used in a game system 1 according to the present embodiment will be described.

In FIG. 29A, an example of a card management table 121 for managing information pertinent to user cards is shown. The card management table 121 is, as described above, stored in a hall management DB 120 of a hall management server 10. In the card management table 121, for each identification ID of a user card associated with a user, respective items of a "game facility code" for identifying a game facility, a "card balance" indicating a money amount which the user holds on a user card, "points" provided for the user, "points (for today)" indicating points obtained today among the points provided for the user, a "coupon management number" for managing a coupon provided for the user, and a "rank" indicating a rank of the user are stored.

As the coupon, coupons of individual shops and restaurants are included, and a plurality of coupons are associated with one user card. In the present embodiment, in the card management table 121, coupon management numbers for managing the plurality of coupons for each user are stored, the plurality of coupons corresponding to the coupon management numbers are individually managed by a coupon management DB (not shown).

In FIG. 29B, an example of a game history management table 122 in which game histories of users are stored is shown. The game history management table 122 is, as described above, stored in the hall management DB 120 of the hall management server 10. In the game history management table 122, for each identification ID of a user card associated with a user and each machine ID, respective items of "start date and time" indicating date and time on and at which the user has started a game (for example, the user initially has pressed a spin button in a series of games), "termination date and time" indicating date and time on and at which the user has terminated the games (for example, the user has pressed a CASHOUT button 1038), "gaming time" indicating a period of time for which said games are played, a "total of Bets" indicating a Bet money amount, "Winloss" indicating a difference between the Bet money amount and a payout money amount, and "Bet/Game" indicating a Bet money amount per game are stored.

Here, the Winloss is, for example, a value obtained by subtracting a payout money amount (in other words, the so-called OUT money amount) of a slot machine 1010 from an investment money amount (in other words, the so-called IN money amount) of a user (player). In addition thereto, in the game history management table 122 shown in FIG. 29B, various values and indices indicating the game histories of users can be stored.

In FIG. 30A, an example of a user information table 321 in which attribute information of users is stored is shown. The user information table 321 is, as described above, stored in a user management DB 320 of a user management server 30. In the user information table 321, for each identification ID of a user card associated with a user, respective items of a "name" of the user, a "nickname" of the user, "sex" of the user, "date of birth" of the user, and a "Pincode" indicating a log-in password are stored.

In FIG. 30B, an example of a member information table 322 in which member information of users is stored is shown. The member information table 322 is, as described above, stored in the user management DB 320 of the user management server 30. In the member information table 322, for each identification ID of a user card associated with a user, respective items of "nationality" of the user, a "zip code" of the user, an "address" of the user, a "phone number" of the user, and an "e-mail address" of the user are stored.

In FIG. 31, an example of a friend information table 323 in which information of friends who have been registered by users is shown. The friend information table 323 is, as described above, stored in the user management DB 320 of the user management server 30. In the friend information table 323, one piece or a plurality of pieces of information pertinent to each of the friends is or are registered so as to be associated with an identification ID of a user card associated with each user. As the information pertinent to each of the friends, respective items of a "friend ID" which is an identification ID of a user card of each of the friends and "block" indicating whether or not accessing (for example, notification (reception and transmission) of donation information or the like and a phone call using VoIP) from each of the friends is blocked are stored.

In FIG. 32A, an example of a donation setting information table 421 in which pieces of donation setting information registered by users are stored is shown. The donation setting information table 421 is, as described above, stored in a donation management DB 420 of the donation management server 40. In the donation setting information table 421, for each identification ID of a user card associated with a user, respective items of an "automatic donation" indicating whether or not collection of a donation is automatically made, "ranking display" indicating how to display a user when donation ranking is displayed, a "fraction donation" indicating whether or not in the automatic donation, a fraction is donated, "donation amount specifying" indicating whether or not a donation amount is specified or specifying contents, a "conditional donation" indicating conditional donation contents in the automatic donation, and "donation notification" indicating whether or not donation notification from each of the friends who have been set as the friends (notification of donation contents of each of the friends) is received are stored.

In addition, here, in the "conditional donation", respective items of a "base amount", a "target" to be donated, an "amount/percentage", and "collection timing" are included. The act of the conditional donation is set such that when a Winloss money amount in the past 100 games exceeds the base amount, an amount or a percentage of the target (for example, a card balance, points, a payout, or the like) is automatically donated at specified timing (for example, timing of the occurrence of a payout or timing of cashing-out).

In FIG. 32B, an example of a donation destination setting information table 422 for managing information pertinent to donation destinations for users is shown. The donation destination setting information table 422 is, as described above, stored in the donation management DB 420 of the donation management server 40. In the donation destination setting information table 422, for each identification ID of a user card associated with a user, respective items of a "donation destination specifying pattern" indicating a manner in which a donation destination is specified by a user; a "donation destination" indicating a previously set donation destination when the "donation destination specifying pattern" is specified as "previous"; and a "donation destination selection condition management number" for referencing a selection condition of a donation destination when the "donation destination" is specified as "automatic selection" are stored.

Here, the "donation destination selection condition management number" is stored in a donation destination selection condition management DB (not shown). In the donation destination selection condition management DB, for each donation destination selection condition management number, the setting is made such that on what kind of a condition, what kind of donation destination is selected. For example, stored is a setting made such that when a payout money amount or a calculated donation money amount is greater than or equal to a predetermined money amount, a donation destination is specified as a "A A donation", and when the payout money amount or the calculated donation money amount is not greater than or equal to a predetermined money amount, a donation destination is specified as a "D D fund".

In FIG. 33A, an example of a donation destination management table 423 for showing choices of donation destinations to a user is shown. The donation destination management table 423 is, as described above, stored in the donation management DB 420 of the donation management server 40. In the donation destination management table 423, information pertinent to respective donation destinations is stored, and respective items of a "category" of a donation destination, a "donation destination name" of a donation destination, and a "priority order" in a case where a donation destination is displayed are included.

In FIG. 33B, an example of a point exchange rate management table 424 to be referenced when a user makes a donation using user points is shown. The point exchange rate management table 424 is, as described above, stored in the donation management DB 420 of the donation management server 40. In the point exchange rate management table 424, respective items of a "target" indicating a target to be donated (for example, points during a normal time or points during a campaign), an "exchange rate" indicating a rate at which said points are exchanged for a donation money amount, and a "exchange unit" indicating a minimum unit of exchanged points are stored.

In FIG. 34, an example of a donation track record management table 425 in which donation track records of users are stored is shown. The donation track record management table 425 is, as described above, stored in the donation management DB 420 of the donation management server 40. In the donation track record management table 425, for each identification ID of a user card associated with a user, respective items of "donation collection date and time" indicating date and time on and at which a donation has been made, a "donation destination" indicating a donation destination, a "donation amount" indicating a donation amount (here, a money amount shown in a predetermined monetary unit, instead of a unit of points or a credit), a "donation type" indicating a manner in which a donation has been made, and a "donation operation type" indicating whether a donation has been made by automatic collection or manual operation are stored.

Here, as the item of the "donation type", for example, a "fraction" in a case where a fraction has been donated, a "payout" in a case where a predetermined percentage of a payout has been donated, "points" in a case where a predetermined percentage of points have been donated, or a "specified amount" in a case where an amount specified by a user has been donated is set.

[User Menu Screen and Inputting of User Information]

Next, with reference to FIG. 35 to FIGS. 42A, B, examples of user menu screens displayed in a game system 1 according to the present embodiment will be described.

Figure 35:
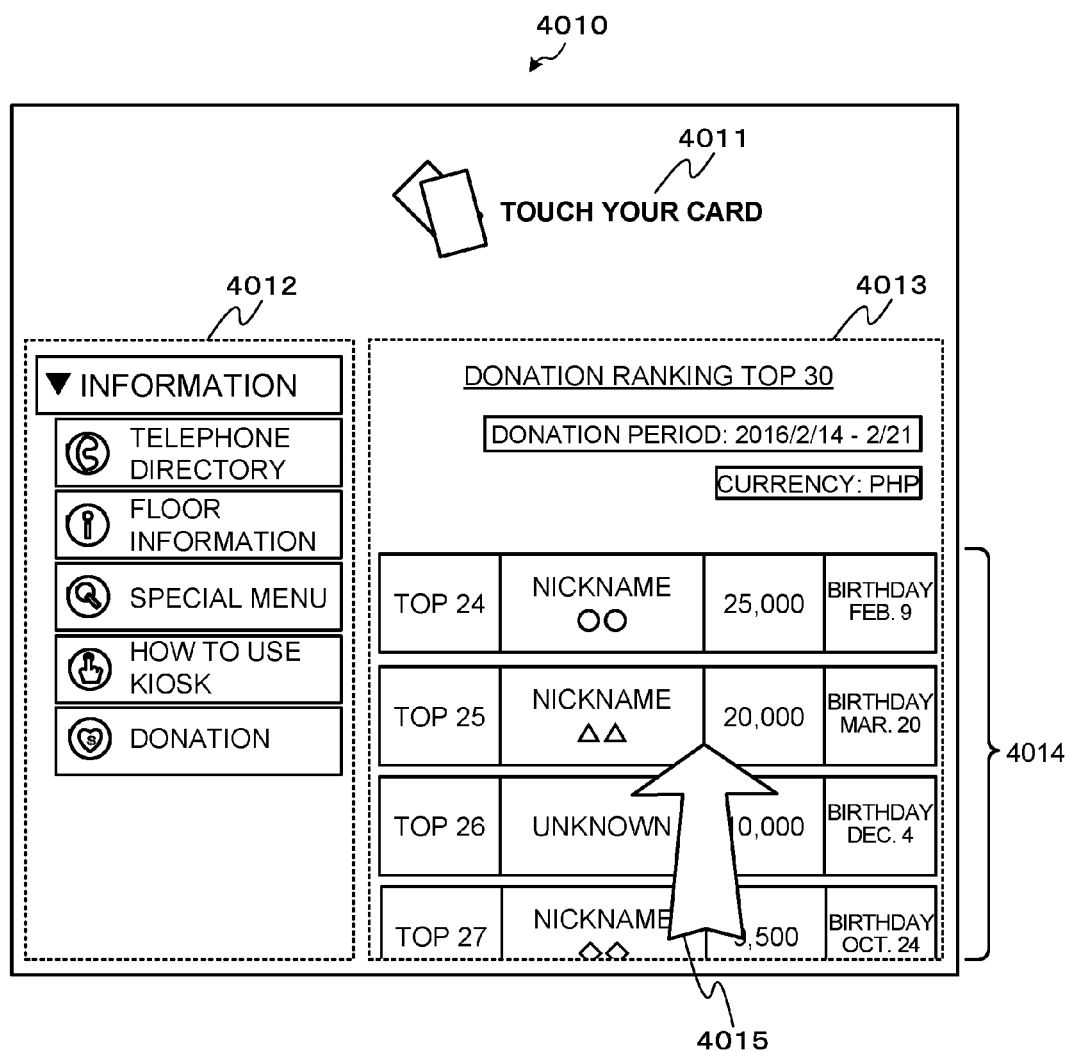
FIG. 35 is a diagram showing an example of a user menu screen in the game system according to the one embodiment of the present invention.

In FIG. 35, a user menu screen 4010 initially displayed on an LCD 2001 of a kiosk terminal 2000 is shown. On the user menu screen 4010, a guide display part 4011 including a guide text of "TOUCH YOUR CARD", a selection menu display part 4012 indicated by a display of "INFORMATION", and a donation ranking display part 4013 in which donation ranking TOP 30 are displayed are arranged.

On the selection menu display part 4012, as choices which a user can select, respective items of "Telephone directory", "Floor information", "Special menu", "How to use KIOSK", and "Donation" are displayed. In addition, on the donation ranking display part 4013, a plurality of ranking display rows 4014 are displayed, and these ranking display rows 4014 are displayed in a scrolling manner in a direction indicated by an arrow 4015, that is, from a lower side of the LCD 2001 toward an upper side thereof. As a result, nicknames, donation money amounts, and the like of TOP 1 to TOP 30 users in donation ranking are displayed in order on the donation ranking display part 4013.

Figure 36:
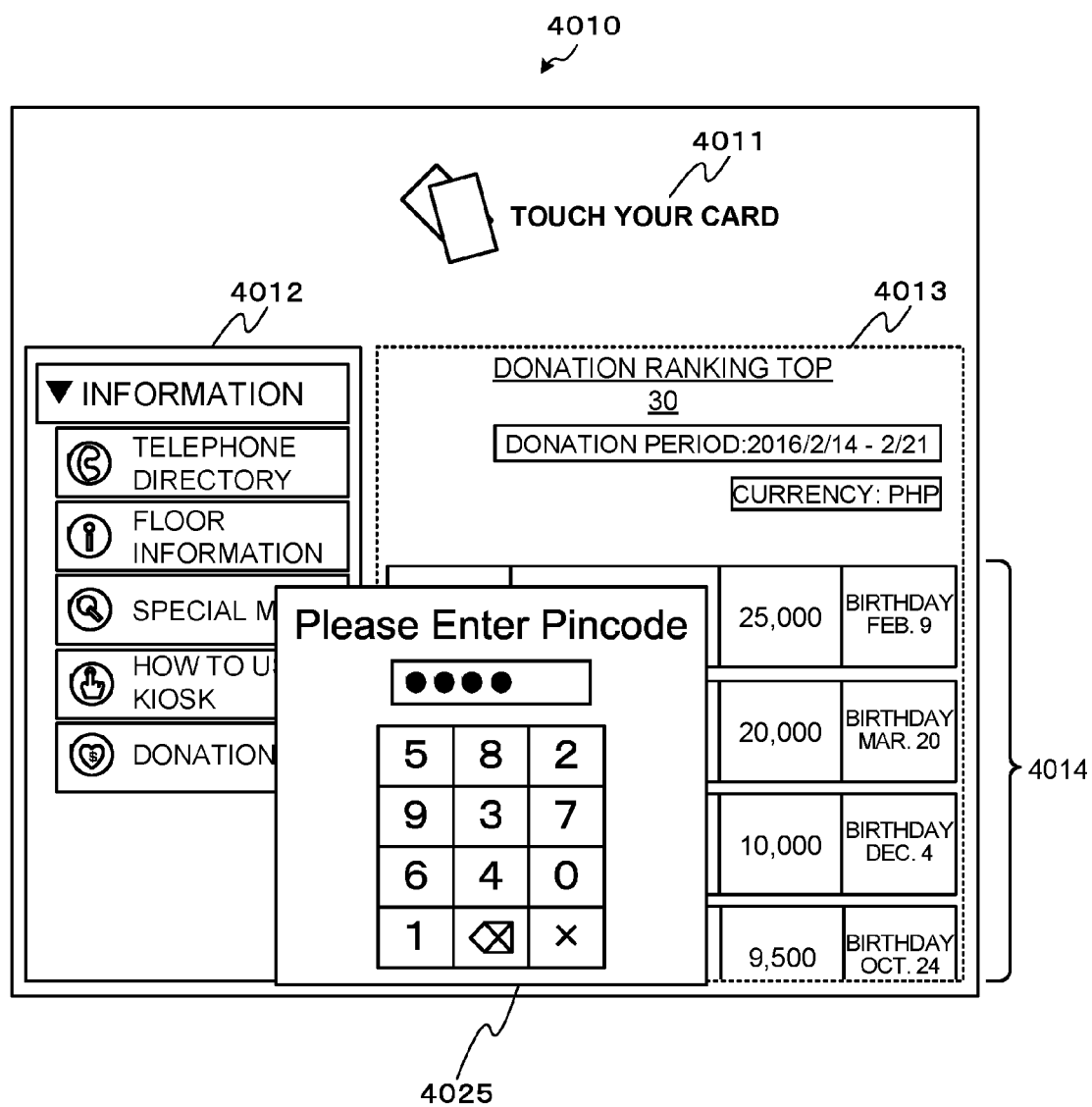
FIG. 36 is a diagram showing an example of a user menu screen in the game system according to the one embodiment of the present invention.

With the user menu screen 4010 shown in FIG. 35 being displayed on the LCD 2001 of the kiosk terminal 2000, when in accordance with guiding by the guide display part 4011, a user has touched a user card onto a touch unit 2004 of the kiosk terminal 2000, a display on the LCD 2001 shifts from the user menu screen 4010 shown in FIG. 35 to a user menu screen 4020 shown in FIG. 36.

On the user menu screen 4020 shown in FIG. 36, a display which is similar to that on the user menu screen 4010 in FIG. 35 is shown, and a guide display part 4021 corresponds to the guide display part 4011; a selection menu display part 4022 corresponds to the selection menu display part 4012; a donation ranking display part 4023 corresponds to the donation ranking display part 4013; and a ranking display rows 4024 corresponds to the ranking display rows 4014.

On the user menu screen 4020 shown in FIG. 36, further, a Pincode input part 4025 is displayed in a pop-up manner over the user menu screen 4020, and here, a user touches respective numeral display areas of the Pincode input part 4025 on the LCD 2001 configured as a touch panel, thereby inputting a Pincode which has been set on his or her user card.

Figure 37:
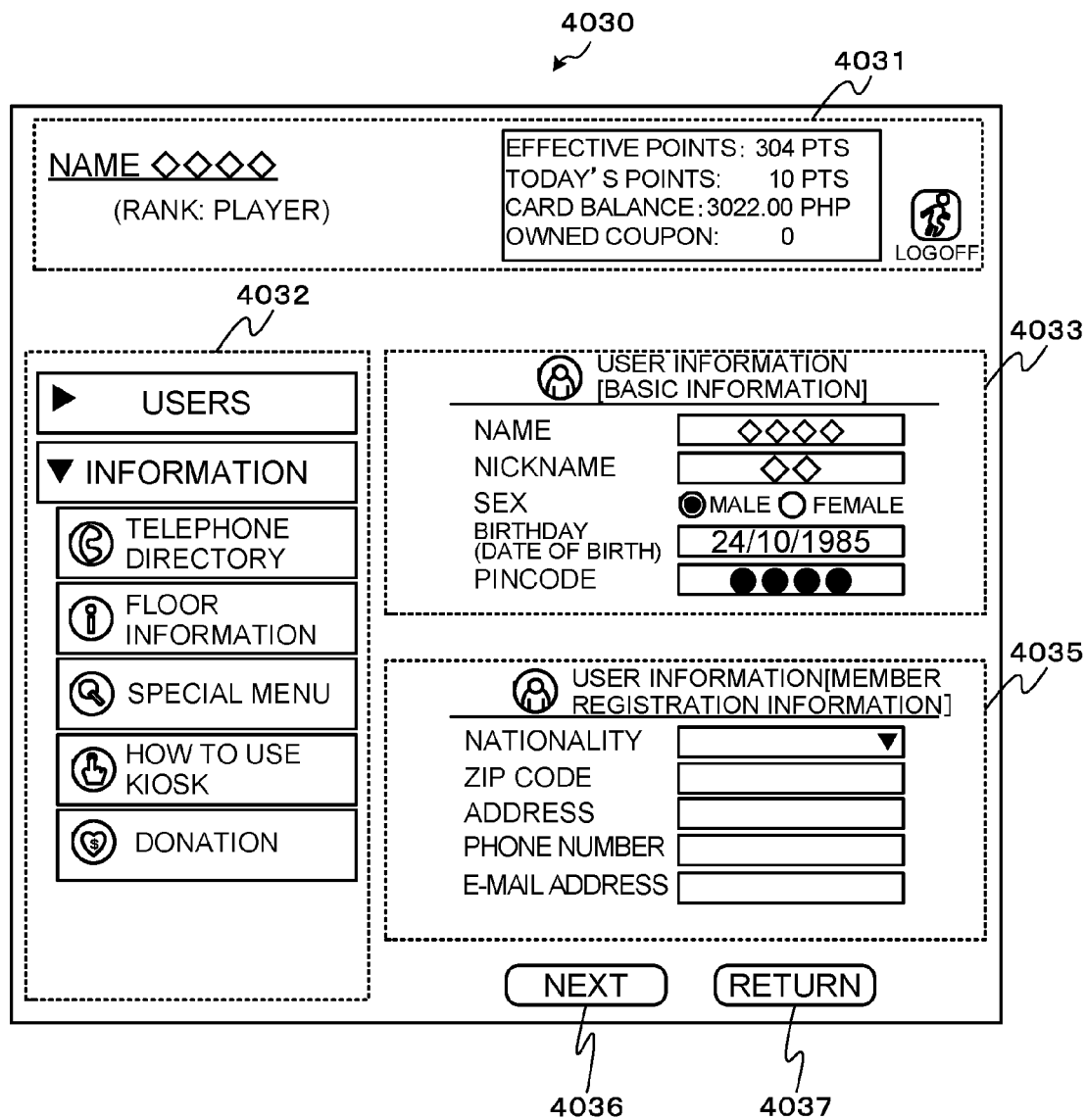
FIG. 37 is a diagram showing an example of a user information registration screen in the game system according to the one embodiment of the present invention.

Upon inputting the Pincode, the Pincode is transmitted to a user management server 30 and when said transmitted Pincode and a Pincode stored in a user information table 321 matches each other, the screen shifts to a user information input screen 4030 shown in FIG. 37. In a case where any Pincode has not yet been set such as a case where a user card is used for the first time and, when a user has touches the user card onto the touch unit 2004, the screen shifts to the user information input screen 4030 shown in FIG. 37.

In an uppermost part of the user information input screen 4030 shown in FIG. 37, a header display part 4031 on which a name (or a nickname) of a user who has been registered on a user card, card information, and a LOGOFF button are displayed is arranged. In addition, in a left part below the header display part 4031, a selection menu display part 4032 indicated by a display of "USERS" and a display of "INFORMATION" is arranged, and a state shown in FIG. 37 is a state in which the "USERS" is selected by touching or the like. In addition, with respect to the "INFORMATION", as on the user menu screen 4010 shown in FIG. 35, as choices which a user can select, the respective items of the "Telephone directory", the "Floor information", the "Special menu", the "How to use KIOSK", and the "Donation" are displayed.

In a right part below the header display part 4031, a basic information input part 4033 for inputting pieces of basic information among pieces of user information is arranged, and here, a user inputs a name, a nickname, sex, date of birth, and a Pincode into respective input columns. It is to be noted that although in a case where a user card is used for the first time, these input columns are blank, when a user card is used for the second time and thereafter, pieces of information which have been inputted are displayed in said input columns, and when a user changes these pieces of information, changed pieces of information are inputted.

Below the basic information input part 4033, further, a member registration information input part 4035 is arranged. When a user is going to conduct member registration, the user inputs pieces of information into respective input columns of the member registration information input part 4035. As the pieces of the member registration information, nationality, a zip code, an address, a phone number, an e-mail address, and the like are included.

It is to be noted that although in a case where a user card is used for the first time, these input columns are blank, when a user card is used for the second time and thereafter, pieces of information which have been inputted are displayed in said input columns, and when a user changes these pieces of information, changed pieces of information are inputted.

In the game system 1 according to the present embodiment, for example, in order to make automatic donation collection or to display donation ranking, it is only required to input at least the pieces of the basic information (or one part thereof) among the pieces of the user information. However, a user inputs the pieces of the member registration information and thereby conduct the member registration, thus allowing the user to receive more fulfilling service from a game facility or the like.

Figure 38:
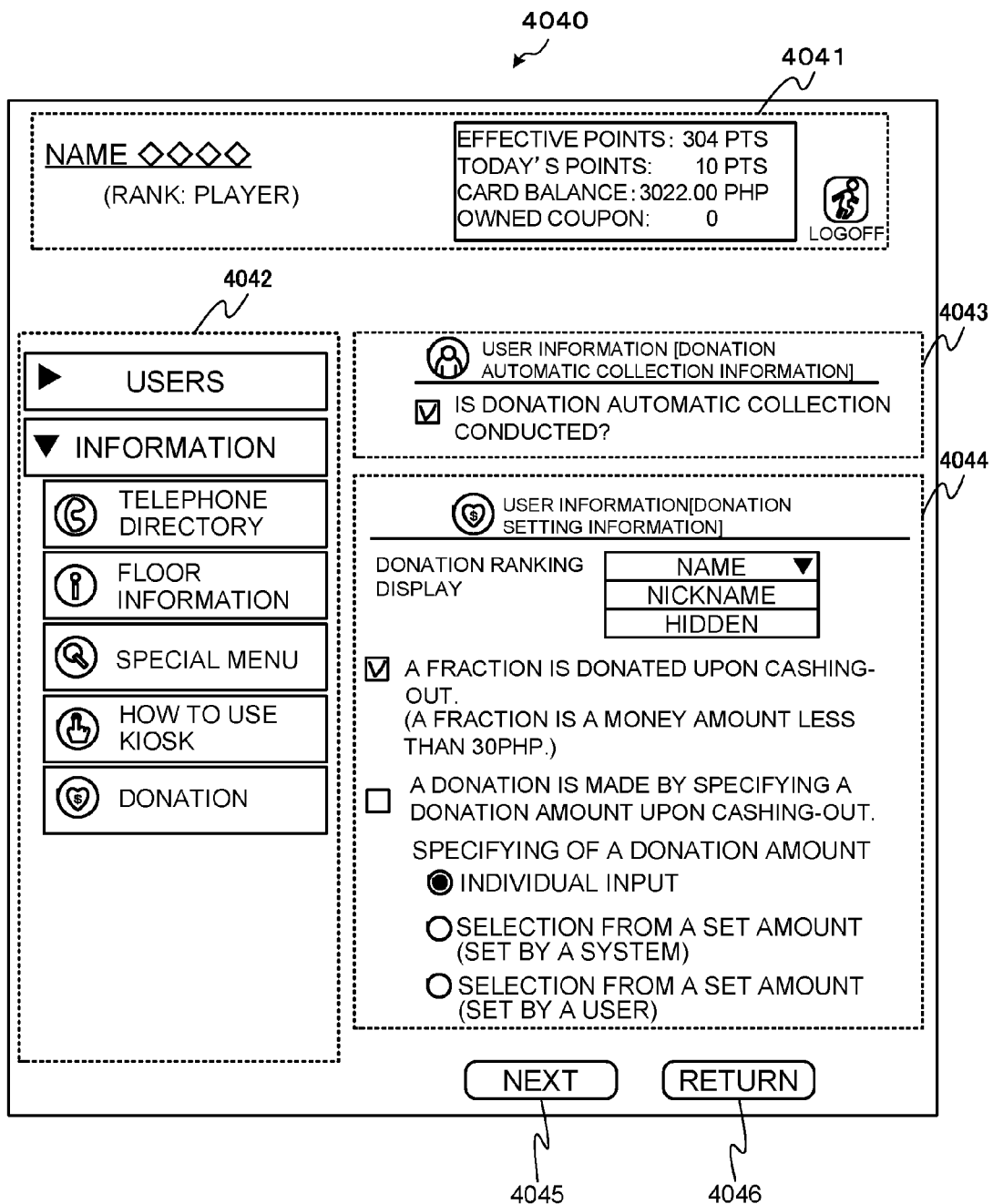
FIG. 38 is a diagram showing an example of a user information registration screen in the game system according to the one embodiment of the present invention.

Here, when a next button 4036 is touched by a user, the screen shifts to a user information input screen 4040 shown in FIG. 38. When a return button 4037 is touched by a user, the screen returns to the user menu screen 4010 shown in FIG. 35.

In an uppermost part of the user information input screen 4040 shown in FIG. 38, a header display part 4041 on which the same pieces of information as those displayed on the header display part 4031 displayed in the uppermost part of the user information input screen 4030 shown in FIG. 37 are displayed is arranged. In a left part below the header display part 4041, a selection menu display part 4042 indicated by a display of "USERS" and a display of "INFORMATION" is arranged, and this state is the same state as on the selection menu display part 4032 shown in FIG. 37. The state in FIG. 38 is, as in FIG. 37, a state in which the "USERS" is selected by touching or the like.

In a right part below the header display part 4041, a donation automatic collection information input part 4043 for inputting pieces of donation automatic collection information among the pieces of user information is arranged, and here, when a user checks a checkbox corresponding to a query text "Is donation automatic collection conducted?" by touching or the like, below the donation automatic collection information input part 4043, a donation setting information input part 4044 for selecting and inputting settings for the automatic collection of a donation is displayed.

On the donation setting information input part 4044, what is displayed as a name when the donation ranking is displayed can be specified from a pull-down menu. In an example shown in FIG. 38, selection can be made from the name, the nickname, which are inputted as the pieces of the basic information of the user information, and the hidden, and when the "hidden" is selected, setting can be made such that the name and the nickname are not displayed in the donation ranking (for example, " " is displayed).

Further, on the donation setting information input part 4044, a checkbox for specifying whether or not a fraction is donated upon cashing-out is arranged. As is made clear in the example shown in FIG. 38 by displaying "A fraction is a money amount less than 30 PHP.", this is because the fraction" is set based on a criterion that the fraction is the smallest fraction (a minimum unit of game media required to play one game) among fractions on gaming machines in a game facility. However, in the present embodiment, based on other various criteria, the "fraction" can be set. In addition, although with respect to this checkbox, it is indicated in a fixed manner that upon cashing-out, a fraction is donated, it may be arranged that selection can be made by using the pull-down menu so as to allow a donation to be made at timing other than the timing of cashing-out, for example, at timing of the occurrence of a payout or the like, On the donation setting information input part 4044, further, a checkbox specifying whether or not a donation is made by specifying a donation amount upon cashing-out is arranged, and radio buttons for selecting one of patterns for specifying a donation amount (donation amount specifying patterns) are arranged. In the example shown in FIG. 38, one of the three patterns for specifying a donation amount, which are "individual input", "selection from a set amount (set by the system)", and "selection from a set amount (set by a user)", is selected.

Upon selecting the "individual input", a user specifies the donation amount by touching any of numerical values in a numerical value specifying window displayed in a pop-up manner. For the "selection from a set amount (set by the system)", variations of the donation amount such as 10, 20, and 30 (PHP) are previously stored in a predetermined table (not shown) by the system, and the selection can be made therefrom by using a pull-down menu. Similarly, for the "selection from a set amount (set by a user)", a user previously sets variations of the donation amount such as 10, 20, and 30 (PHP) and stores the variations in a predetermined table (not shown), and the selection can be made therefrom by using a pull-down menu.

In a lowermost part of the user information input screen 4040, a next button 4045 and a return button 4046 are arranged. When the next button 4045 is touched by a user, the screen shifts to a user information input screen 4050 shown in FIG. 39, thereby allowing settings related to the donation automatic collection to be further selected and inputted. When the return button 4046 is touched by a user, the screen returns to the user information input screen 4030 shown in FIG. 37.

Figure 39:
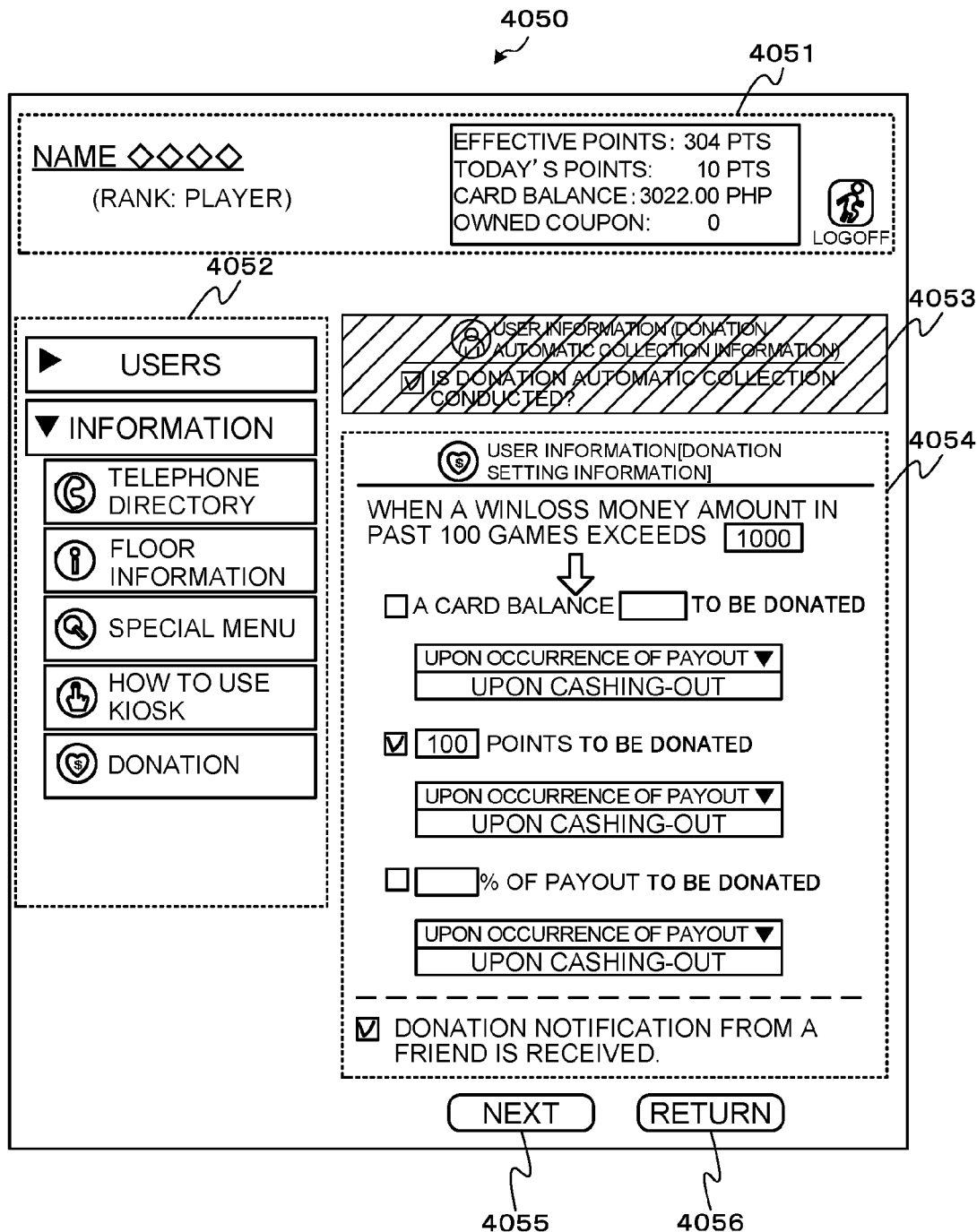
FIG. 39 is a diagram showing an example of a user information registration screen in the game system according to the one embodiment of the present invention.

On the user information input screen 4050 shown in FIG. 39, a display which is similar to that on the user information input screen 4040 shown in FIG. 38 is shown, a header display part 4051 corresponds to the header display part 4041; a selection menu display part 4052 corresponds to the selection menu display part 4042; a donation automatic collection information input part 4053 corresponds to the donation automatic collection information input part 4043; and a donation setting information input part 4054 correspond to the donation setting information input part 4044. However, the donation automatic collection information input part 4053 is displayed in a gray-out manner, thereby not allowing a checkbox to be selected, and on the donation setting information input part 4054, a display for specifying further automatic donation patterns is shown.

In other words, on the donation setting information input part 4054, when a Winloss money amount in the past 100 games exceeds a predetermined money amount, a donation is made through specifying any of the below-described patterns by checking a corresponding checkbox.

A first choice is to donate a predetermined amount in a card balance stored on a user card upon the occurrence of a payout or upon cashing-out. A user can directly specify the predetermined amount, here, by touching any of numerical values, for example, in a numerical value specifying window displayed in a pop-up manner. In addition, the timing of the donation (upon the occurrence of a payout or upon cashing-out) is, as shown in FIG. 39, is selectable by using a pull-down menu.

A second choice is to donate a predetermined number of points among user points stored on a user card upon the occurrence of points or upon cashing-out. A user can directly specify the predetermined number, here, by touching any of numerical values, for example, in a numerical value specifying window displayed in a pop-up manner. In addition, timing of the donation (upon the occurrence of points or upon cashing-out) is, as shown in FIG. 39, can be selected by using a pull-down menu. It is to be noted that although in this example, the timing of the donation is selected from upon the occurrence of points and upon cashing-out, as in the first choice, the timing of the donation can also be selected from upon the occurrence of a payout and upon cashing-out. In addition, the timing of the donation can also be selected from three or more patterns, which include upon the occurrence of a payout, upon the occurrence of points, and upon cashing-out.

A third choice is to donate a predetermined percentage (%) of a payout obtained by playing games upon the occurrence of a payout or upon cashing-out. A user can directly specify the predetermined percentage in a unit of %, here, by touching any of numerical values, for example, in a numerical value specifying window displayed in a pop-up manner. In addition, the timing of the donation (upon the occurrence of a payout or upon cashing-out), as shown in FIG. 39, can also be selected by using a pull-down menu.

In addition, in a setting where a donation on a predetermined condition is made when the Winloss money amount in the past 100 games exceeds the predetermined money amount, a checkbox for specifying whether or not donation notification from a friend is received is arranged. By checking this checkbox, when a friend has made a donation, while a user is playing games on a slot machine 1010, a donation destination to which the friend has made the donation and an amount of the donation which the friend has made are displayed on an LCD 1719 of a PTS terminal 1700 of the slot machine 1010. A user can also set the above-described specifying of the donation setting for each friend as a transmission source.

In a lowermost part of the user information input screen 4050, a next button 4055 and a return button 4056 are arranged. When the next button 4055 is touched by a user, the screen shifts to a user information input screen 4060 shown in FIG. 40, and when the return button 4056 is touched by a user, the screen returns to the user information input screen 4040 shown in FIG. 38.

Figure 40:
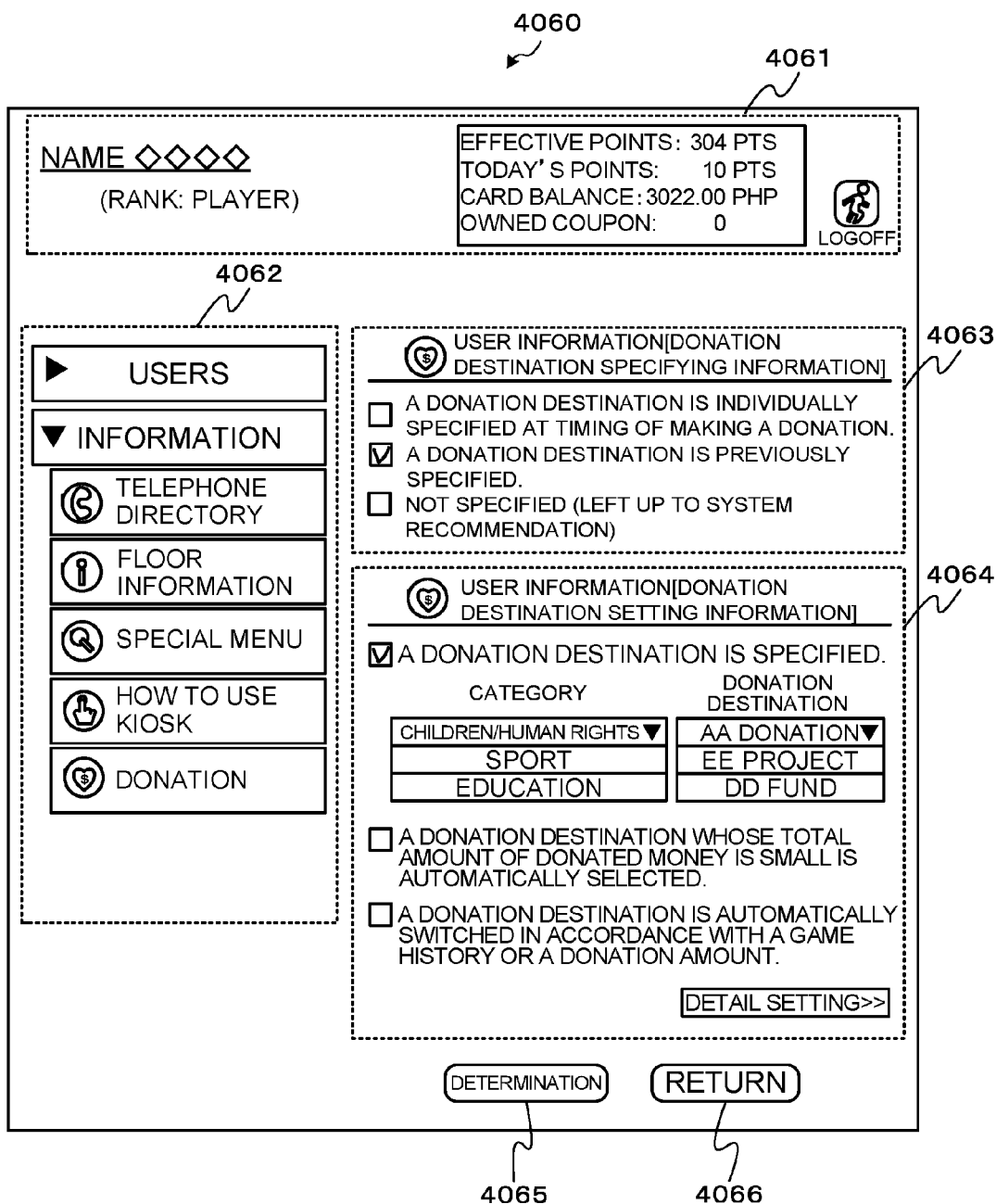
FIG. 40 is a diagram showing an example of a user information registration screen in the game system according to the one embodiment of the present invention.

On the user information input screen 4060 shown in FIG. 40, a display which is similar to that on each of the user information input screen 4040 shown in FIG. 38 and the user information input screen 4050 shown in FIG. 39 is shown. A header display part 4061 corresponds to the header display part 4051; and a selection menu display part 4062 corresponds to the selection menu display part 4052. Here, in a right part below the header display part 4061, a donation destination specifying information input part 4063 is arranged. A checkbox for specifying whether or not a donation destination is individually specified by a user at timing when a donation is made; a checkbox for specifying whether or not a donation destination is previously specified; and a checkbox for specifying whether a donation destination is not specified (in other words, the matter on whether or not a donation destination is specified is left up to recommendation by the system) are arranged.

Further, in a part below the donation destination specifying information input part 4063, a donation destination setting information input part 4064 is arranged. On the donation destination setting information input part 4064, a checkbox for specifying whether or not a donation destination is set is arranged. Here, as shown in FIG. 40, for the setting of a donation destination, a category and a name of a donation destination can be selected by using pull-down menus, respectively.

In addition, on the donation destination setting information input part 4064, a checkbox for specifying whether or not a donation destination whose total amount of donated money in a predetermined period of time is small is automatically selected is arranged. Further, a checkbox for specifying whether or not a donation destination is automatically switched in accordance with a game history or a donation amount of a user is arranged. Here, by touching a detail setting button shown in FIG. 40, a detailed screen for defining that in a case of what game history (or a donation amount), which donation destination is specified is displayed, and here, the description thereof is omitted.

In a lowermost part of the user information input screen 4060, a determination button 4065 and a return button 4066 are arranged. When the determination button 4065 is touched by a user, the pieces of user information specified on the user information input screens (4030 to 4060) shown in FIG. 37 to FIG. 40 are transmitted via a hall management server 10 to the user management server 30 and a donation management server 40. The pieces of user information are stored in the user information table 321, the member information table 322, the donation setting information table 421, the donation destination setting information table 422, and the like there. In accordance with the settings stored as mentioned above, the pieces of user information are managed, and further, the donation collection from a user is automatically conducted.

For example, when the determination button 4065 is touched by a user, the basic information inputted in the input columns of the basic information input part 4033 of the user information input screen 4030 shown in FIG. 37 is transmitted to the user management server 30. An identification ID of a user card and the transmitted basic information are associated with each other to be added to the user information table 321. In a case where a piece or pieces of the basic information is or are changed to be inputted, the user information table 321 is updated so as to allow only the changed piece or pieces of the basic information to be changed therein.

In addition, at this time, the pieces of the member registration information inputted in the input columns of the member registration information input part 4035 of the user information input screen 4030 shown in FIG. 37 is transmitted to the user management server 30. An identification ID of a user card and the transmitted member registration information are associated with each other to be added to the member information table 322. In a case where a piece or pieces of the member registration information is or are changed to be inputted, the member information table 322 is updated so as to allow only the changed piece or pieces of the member registration information to be changed therein.

Further, the pieces of user information related to the donation specified on the user information input screens (4040 to 4060) shown in FIG. 38 to FIG. 40 are transmitted via the hall management server 10 to the donation management server 40. The pieces of user information related to said donation are stored in the donation setting information table 421, the donation destination setting information table 422, and the like.

For example, in the donation setting information table 421 shown in FIG. 32A, with respect to a user having an identification ID "1", "1" is shown in a row of a column of an automatic donation; a "nickname" is shown in a row of a column of ranking display; and "1" is shown in a row of a column of a fraction donation. These are shown because the checkbox for conducting the automatic collection is checked on the donation automatic collection information input part 4043 shown in FIG. 38; a "nickname" is selected in the donation ranking display of the donation setting information input part 4044 shown therein; and further, the checkbox for specifying whether or not a fraction is donated upon cashing-out is checked on the donation setting information input part 4044 shown therein.

In addition, in the donation setting information table 421 shown in FIG. 32A, with respect to a user having an identification ID "2", "0" is shown in a row of the column of the automatic donation. This is shown because the checkbox for conducting the automatic collection is not checked on the donation automatic collection information input part 4043 shown in FIG. 38, and for this user, the automatic donation collection is not conducted.

In addition, in the donation setting information table 421 shown in FIG. 32A, with respect to a user having an identification ID "3", "1" is shown in a row of the column of the automatic donation; "hidden" is shown in a row of the column of the ranking display; "1" is shown in a row of the column of the fraction donation; and respective pieces of information are shown rows of a column of a conditional donation ("1000" is shown in the row of a column of a base amount; "points" are shown in the row of a column of a target; "100" is shown in the row of a column of amount/percentage; and "C-out" is shown in the row of a column of collection timing). These are shown because the checkbox for conducting the automatic collection is checked on the donation automatic collection information input part 4043 shown in FIG. 38; the "hidden" is selected in the donation ranking display of the donation setting information input part 4044 shown therein; further, the checkbox for specifying whether or not a fraction is donated upon cashing-out is checked on the donation setting information input part 4044 shown in FIG. 38; further, the second choice is selected on the donation setting information input part 4054 shown in FIG. 39 (in other words, the predetermined number of points among user points stored on a user card are donated upon the occurrence of a payout or upon cashing-out); "100" as the predetermined number is inputted as the points to be donated among the user points; and as the timing of donation, upon cashing-out is selected (It is to be noted that as a predetermined money amount based on the Winloss money amount, "1000" is inputted).

In addition, on the donation destination setting information table 422 shown in FIG. 32B, with respect to a user having an identification ID "3", "previous" is shown in a row of a column of a donation destination specifying pattern; and "A A donation" is shown in a row of a column of a donation destination. These are shown because the checkbox for specifying whether or not a donation destination is previously specified is checked on the donation destination specifying information input part 4063 of the user information input screen 4060 shown in FIG. 40; and "A A donation" as the donation destination is specified on the donation destination setting information input part 4064 thereof.

In addition, on the donation setting information table 421 shown in FIG. 32A, with respect to a user having an identification ID "7", "1" is shown in a row of the column of the automatic donation; the "hidden" is shown in a row of the column of the ranking display; "0" is shown in a row of the column of the fraction donation; and "1023" is shown in a row of the column of donation amount specifying. These are shown because the checkbox for conducting the automatic collection is checked on the donation automatic collection information input part 4043 shown in FIG. 38; the "hidden" is selected in the donation ranking display of the donation setting information input part 4044; further, the checkbox for specifying whether or not a fraction is donated upon cashing-out is not checked on the donation setting information input part 4044 shown in FIG. 38; further, the checkbox for specifying whether or not a donation is made upon cashing-out by specifying a donation amount is checked on the donation setting information input part 4044 shown in FIG. 38; and for specifying the donation amount, "selection from a set amount (set by a user)" is selected.

When a user specifies the donation amount, upon selecting the "selection from a set amount (set by a user)", a management number "1023" for identifying a variation among variations of a donation amount set by that user is set in the row of the column of donation amount specifying in the donation setting information table 421. When the user specifies the donation amount upon cashing-out, a predetermined table (not shown) is referenced based on this management number and the variation of the donation amount set by the user is displayed.

In addition, on the donation destination setting information table 422 shown in FIG. 32B, with respect to the user having the identification ID "7", the "previous" is shown in a row of the column of the donation destination specifying pattern; "automatic selection 2" is shown in a row of the column of the donation destination; and "233587" is shown in a row of a column of a donation destination selection condition management number. These are shown because the checkbox for specifying whether or not a donation destination is previously specified is checked on the donation destination specifying information input part 4063 of the user information input screen 4060 shown in FIG. 40; and the checkbox for specifying whether or not a donation destination is automatically switched in accordance with a game history or a donation amount of a user is checked on the donation destination setting information input part 4064 shown therein. Here, the donation destination selection condition management number "233587" is a number associated with settings related to on what condition (for example, a game history or a donation amount constitutes predetermined contents), which donation destination is specified, and by referencing this number in a donation destination selection condition management DB (not shown), said settings can be obtained.

As described above, when the determination button 4065 on the user information input screen 4060 shown in FIG. 40 is touched by a user, the pieces of user information specified on the user information input screens (4030 to 4060) shown in FIG. 37 to FIG. 40 are reflected in the respective tables. When each of the tables is updated, a message indicating that the updating is completed is displayed on the user information input screen 4060, and thereafter, the screen returns to, for example, the user menu screen 4010 shown in FIG. 35.

When the return button 4066 on the user information input screen 4060 shown in FIG. 40 is touched, the screen returns to the user information input screen 4050 shown in FIG. 39.

FIG. 35 to FIG. 40 show the examples displayed on the LCD 2001 of the kiosk terminal 2000, which the user menu screens and the user information input screen display. These screens can also be displayed on the LCD 1719 of the PTS terminal 1700 incorporated into the slot machine 1010. In this case, since a display area of the LCD 1719 is small and horizontally long, as compared with the LCD 2001, layouts of the user menu screens and the user information input screen are changed according to the LCD 2001.

Figure 41A:
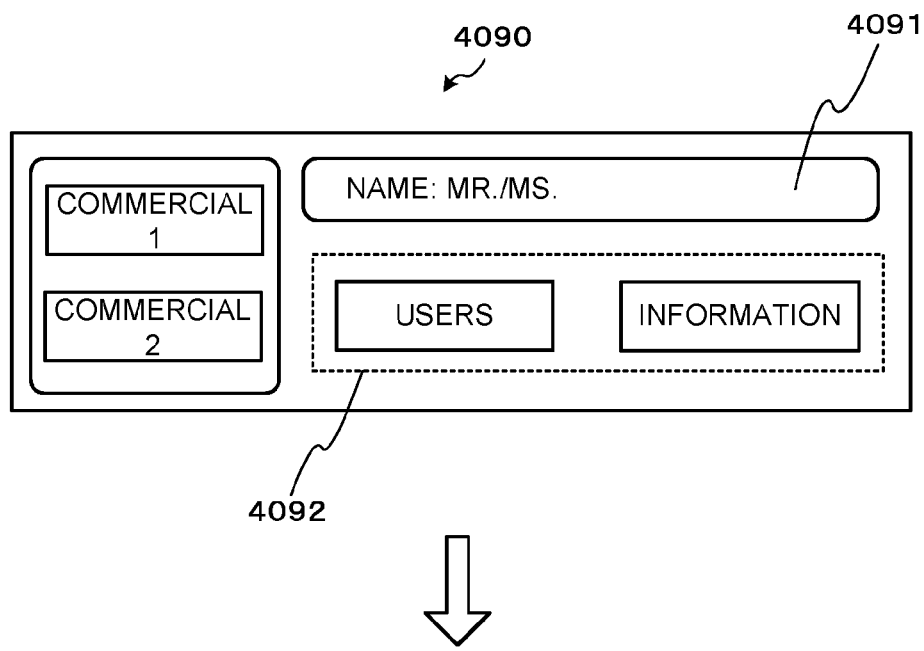
FIGS. 41A and 41B are diagrams showing an example in a case where a user information registration screen is displayed on the PTS terminal according to the one embodiment of the present invention.

In FIG. 41A, a user menu screen 4090 displayed on the LCD 1719 of the PTS terminal 1700 is shown. The user menu screen 4090 is a screen displayed when a user inserts a user card, which the user uses for the first time (in order to play games on the slot machine 1010), into a card unit 1741. In addition thereto, this user menu screen 4090 may be displayed when a user touches a user card, which the user uses for the first time (in order to input the user information), onto a touch unit 1745.

In an upper part on a right side of the user menu screen 4090 shown in FIG. 41A, a header display part 4091 for displaying a name of a user is arranged. Below the header display part 4091, a selection menu display part 4092 which includes displays of "USERS" and "INFORMATION" is arranged. Here, when a user touches the display of "USERS", the screen displayed on the LCD 1719 of the PTS terminal 1700 shifts to a user information input screen 4100 shown in FIG. 41B.

Figure 41B:
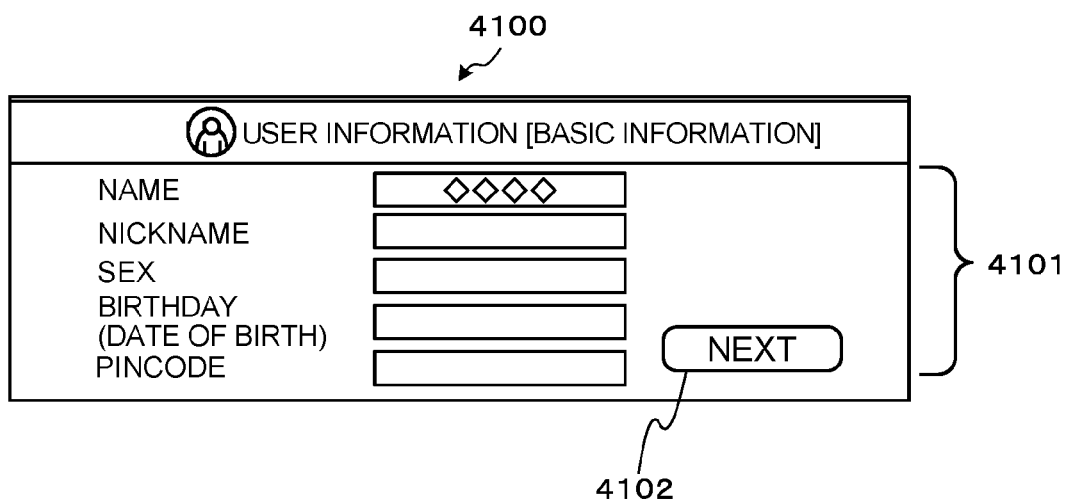

On the user information input screen 4100 shown in FIG. 41B, a basic information input part 4101 for inputting the pieces of basic information among the pieces of user information is arranged. A user inputs the pieces of basic information in respective entry fields of a name, a nickname, sex, date of birth, and a Pincode here. The display contents on the basic information input part 4101 correspond to the display contents on the basic information input part 4033 of the user information input screen 4030 shown in FIG. 37.

In a lowermost part of the user information input screen 4100, a next button 4102 is arranged. When the next button 4102 is touched by a user, the screen on the LCD 1719 of the PTS terminal 1700 shifts to a user information input screen 4110 shown in FIG. 42A.

Figure 42A:
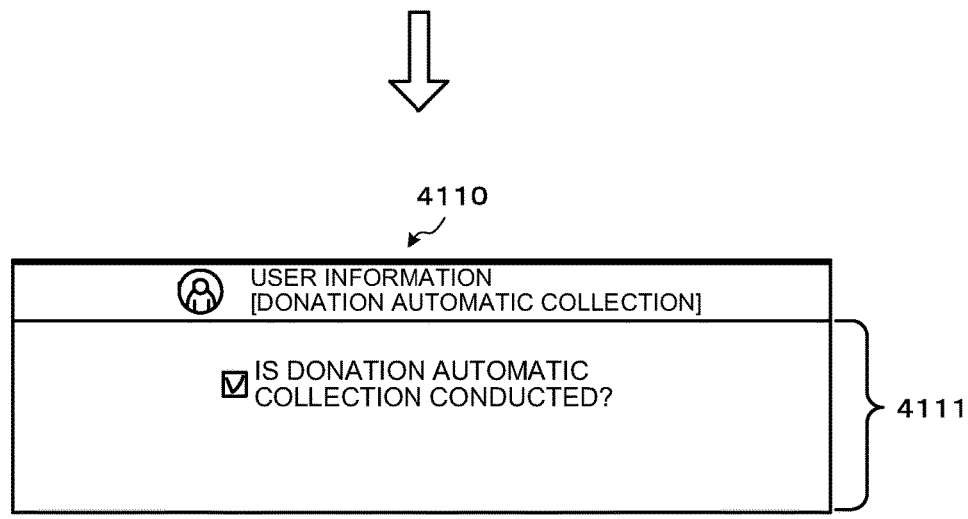
FIGS. 42A and 42B are diagrams showing an example in a case where a user information registration screen is displayed on the PTS terminal according to the one embodiment of the present invention.

On the user information input screen 4110 shown in FIG. 42A, a donation automatic collection information input part 4111 for inputting the pieces of donation automatic collection information among the pieces of user information is arranged. The display contents on the donation automatic collection information input part 4111 correspond to the display contents on the donation automatic collection information input part 4043 of the user information input screen 4040 shown in FIG. 38.

Figure 42B:
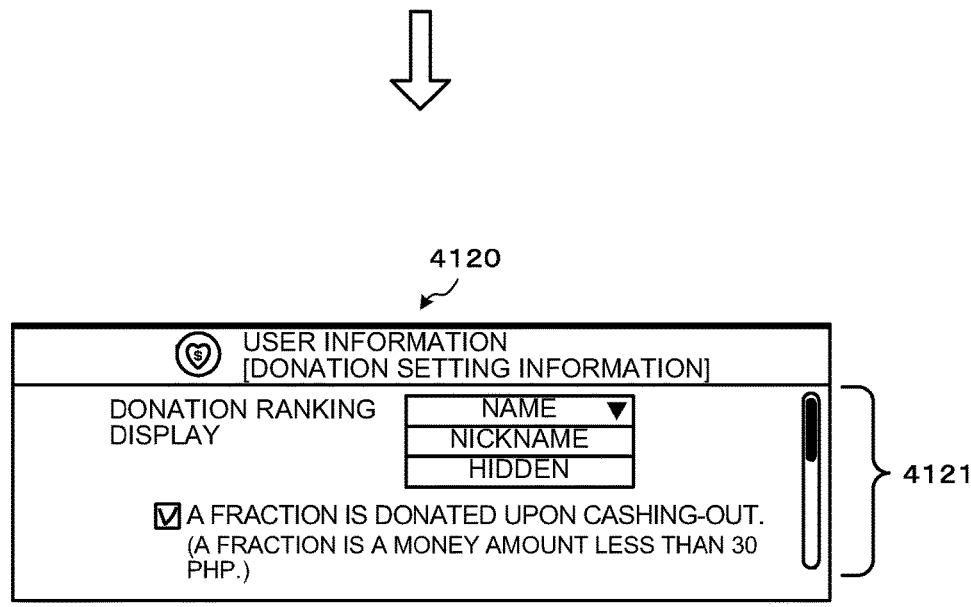

When a user checks a checkbox of a query text "Is donation automatic collection is conducted?" by touching or the like, the screen on the LCD 1719 of the PTS terminal 1700 shifts to a user information input screen 4120 shown in FIG. 42B.

On the user information input screen 4120 shown in FIG. 42B, a donation setting information input part 4121 for selecting and inputting settings related to the automatic collection for a donation is arranged. The display contents on the donation setting information input part 4121 correspond to the display contents on the donation setting information input part 4044 of the user information input screen 4040 shown in FIG. 38. On the donation setting information input part 4121, as on the donation setting information input part 4044, although the settings related to the automatic collection for a donation can be made by displaying a plurality of checkboxes, in FIG. 42B, one part of the display contents is displayed, and a scroll bar provided on a right side of the donation setting information input part 4121 enables the respective checkboxes to be displayed.

Thereafter, display contents which are substantially the same display contents shown in FIG. 35 to FIG. 40 are displayed on the LCD 1719 of the PTS terminal 1700. Thus, a user can perform the same operations as those described with reference to FIG. 35 to FIG. 40 on the LCD 1719 of the PTS terminal 1700. Finally, when a determination button (not shown) displayed on the user information input screen is touched, as in the case where the determination button 4065 on the user information input screen 4060 shown in FIG. 40 is touched, the pieces of user information specified by a user are transmitted via the hall management server 10 to the user management server 30 and the donation management server 40 and are stored in the user information table 321, the member information table 322, the donation setting information table 421, the donation destination setting information table 422, and the like.

As described above, displaying and operating of the user menu screens and the user information input screen are enabled on not only the kiosk terminal 2000 but also the PTS terminal 1700, and further enabled on other terminal such as a signage 3000. In addition, other screen such as the donation ranking display screen can be displayed on not only the kiosk terminal 2000 but also the PTS terminal 1700 and the signage 3000.

[Flow of User Information Registration]

Figure 43:
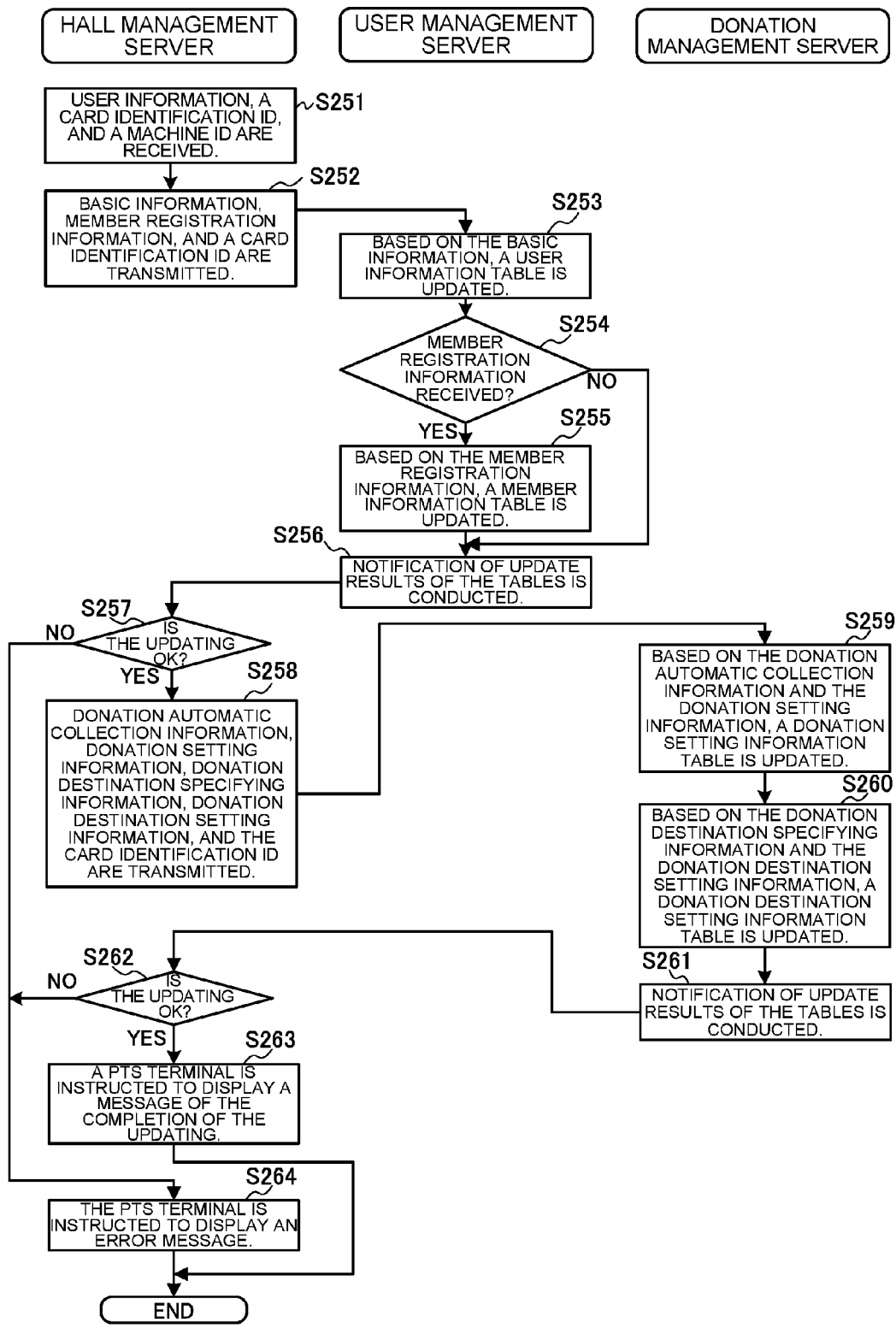
FIG. 43 is a flowchart showing processing in which user information is registered in the game system according to the one embodiment of the present invention.

Next, with reference to FIG. 43, a flow of user information registration conducted when a determination button 4065 on a user information input screen 4060 shown in FIG. 40 is touched by a user (or when a determination button on a user information input screen displayed on an LCD 1719 of a PTS terminal 1700 is touched by a user) will be described. FIG. 43 is a flowchart showing processes performed on a hall management server 10, a user management server 30, and a donation management server 40 respectively in time series.

For example, when the determination button 4065 on the user information input screen 4060 shown in FIG. 40 is touched by a user, the hall management server 10 receives, from a kiosk terminal 2000 or the like, user information, a card identification ID, and a machine ID of said kiosk terminal 2000 or the like (step S251). Thereafter, the hall management server 10 transmits basic information included in the user information and member registration information to the user management server 30 together with the card identification ID (step S252).

Here, the basic information is information inputted on a basic information input part 4033 of a user information input screen 4030 shown in FIG. 37, and the member registration information is information inputted on a member registration information input part 4035 of the user information input screen 4030 shown in FIG. 37.

At step S253, based on the basic information received from the hall management server 10, the user management server 30 updates a user information table 321. Here, it is determined whether or not the member registration information has been received from the hall management server 10 (step S254), and when the member registration information has been received therefrom (YES at step S254), it is determined that a user has conducted member registration (or has changed the member registration), and based on the member registration information, the user management server 30 updates a member information table 322 (step S255).

When the member registration information has not been received from the hall management server 10 (NO at step S254) and after step S256, update results of the user information table 321 and the member information table 322 are transmitted to the hall management server 10 (step S256).

When receiving the update results of the tables from the user management server 30, the hall management server 10 checks whether or not the updating is normally made (step S257). When normally made (YES at step S257), the hall management server 10 transmits donation automatic collection information, donation setting information, donation destination specifying information, and donation destination setting information which are included in the user information to the donation management server 40 together with the card identification ID (step S258).

Here, the donation automatic collection information is information inputted on a donation automatic collection information input part 4043 of a user information input screen 4040 shown in FIG. 38. The donation setting information is information inputted on a donation setting information input part 4044 of the user information input screen 4040 shown in FIG. 38 and a donation setting information input part 4054 of a user information input screen 4050 shown in FIG. 39. In addition, the donation destination specifying information is information inputted on a donation destination specifying information input part 4063 of a user information input screen 4060 shown in FIG. 39. The donation destination setting information is information inputted on a donation destination setting information input part 4064 of the user information input screen 4060 shown in FIG. 39.

At step S259, based on the donation automatic collection information and the donation setting information which have been received from the hall management server 10, the donation management server 40 updates a donation setting information table 421. Further, at step S260, based on the donation destination specifying information and the donation destination setting information which have been received from the hall management server 10, the donation management server 40 updates a donation destination setting information table 422.

Next, the donation management server 40 transmits update results of the donation setting information table 421 and the donation destination setting information table 422 to the hall management server 10 (step S261).

When receiving the update results of the tables from the donation management server 40, the hall management server 10 checks whether or not the updating is normally made (step S262). When normally made (YES at step S262), the hall management server 10 specifies the machine ID, instructs the kiosk terminal 200 or the like to display a message of the completion of the updating (step S263), and finishes the processing.

When the update results of the tables on the user management server 30 are not normal (NO at step S257) and the update results of the tables on the donation management server 40 are not normal (NO at step S262), the hall management server 10 specifies the machine ID, instructs the targeted kiosk terminal 200 or the like to display an error message (step S264), and finishes the processing.

It is to be noted that although in the game system 1 according to the present embodiment, the member registration information inputted on the member registration information input part 4035 of the user information input screen 4030 shown in FIG. 37 is present, the member registration for that user is conducted and the information of that user is stored in the member information table 322, a member registration screen may be separately displayed on a kiosk terminal 200 or the like, and registration processing may be conducted, separately from the processing for the basic information, the donation setting information, and the like of a user.

[Screen Display Upon Donation Collection]

Next, with reference to FIGS. 44A, B to 46A, B, display patterns on a screen displayed when a donation is automatically collected through the above-described settings on a user information (a screen displayed on an LCD 1719 of a PTS terminal 1700 will be described.

Figure 44A:
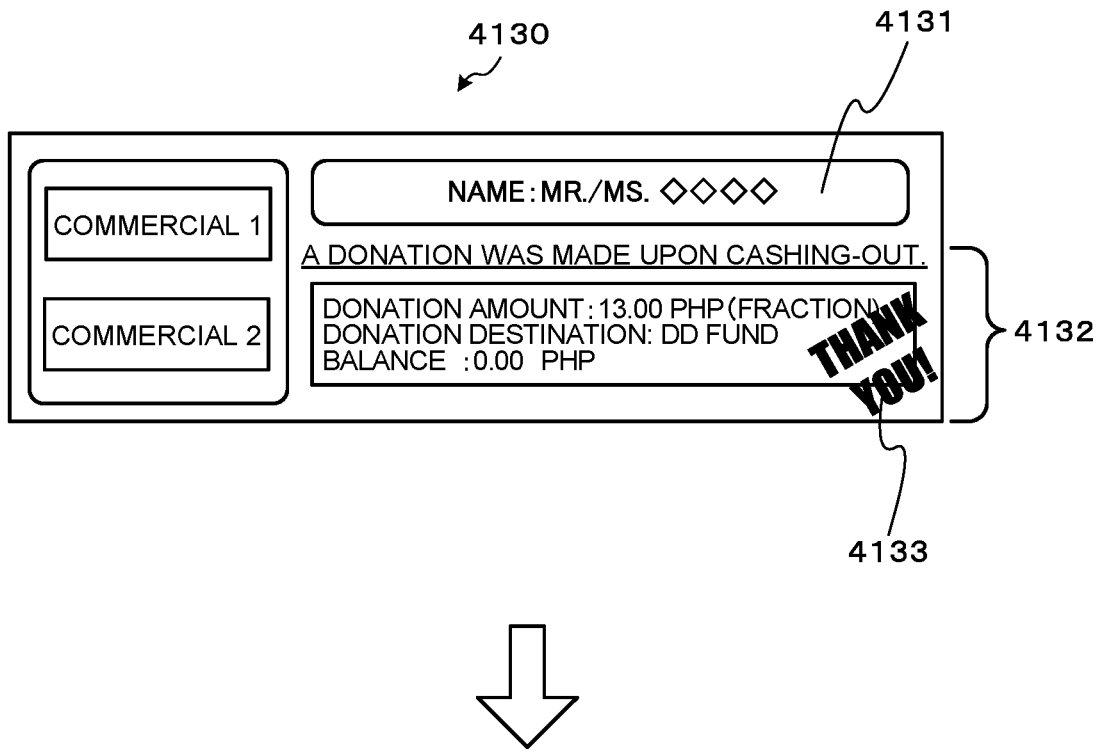
FIGS. 44A and 44B are diagrams showing an example of a screen displayed on the PTS terminal according to the one embodiment of the present invention when a donation has been made.

FIG. 44A shows a view in which when a CASHOUT button 1038 is pressed after a user has played games on a slot machine 1010 and a donation is automatically collected, displaying related to said donation collection is conducted.

In this case, the user has checked a checkbox for conducting automatic collection on a donation automatic collection information input part 4043 of a user information input screen 4040 shown in FIG. 38 and has checked a checkbox for specifying whether or not a fraction is donated upon cashing-out on a donation setting information input part 4044 of the user information input screen 4040. Further, the user has checked a checkbox for specifying whether or not a donation destination is previously specified on a donation destination specifying information input part 4063 of a user information input screen 4060 shown in FIG. 40 and has specified a "D D fund" as the donation destination on a donation destination setting information input part 4064 thereof.

A donation collection display screen 4130 shown in FIG. 44A is displayed, shifting from a user menu screen 4090 shown in FIG. 41A. As on the user menu screen 4090, in an upper part thereof, a header display part 4131 for displaying a name of a user is arranged. Below the header display part 4131, a donation collection display part 4132 is arranged.

In addition, in a part above the donation collection display part 4132, a message "a donation has been made upon cashing-out." is displayed, and therebelow, contents of the donation are displayed. In an example shown in FIG. 44A, it is shown that a donation amount is 13.00 PHP of a fraction; a donation destination is the "D D fund"; and a card balance is 0.00 PHP. Further, a character icon 4133 of "THANK YOU!" is displayed so as to overlap on the donation collection display part 4132.

Through the above-described displaying on the donation collection display part 4132, the user can confirm that the donation amount specified by the user has been donated to the donation destination specified by the user at the timing specified by the user.

Figure 44B:
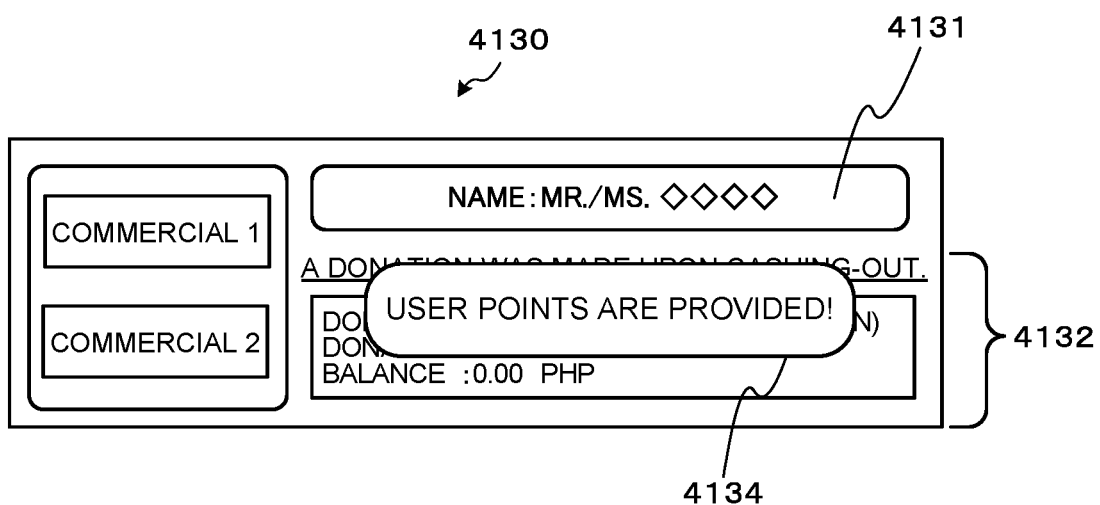

Thereafter, after a predetermined lapse of time or by a predetermined operation on the PTS terminal 1700 or the like by a user, the donation collection display screen 4130 shown in FIG. 44A shifts to a donation collection display screen 4130 shown in FIG. 44B. On the donation collection display screen 4130 shown in FIG. 44B, the same header display part 4131 and donation collection display part 4132 as on the donation collection display screen 4130 shown in FIG. 44A are displayed, and on these display parts, a pop-up text 4134 of "User points have been provided!" indicating that the user points are added in accordance with the donation made this time is displayed.

As described above, in a game system 1 according to the present embodiment, user points can be automatically provided as a result of the donation made by a user. A user can confirm by the above-mentioned pop-up text 4134 that the points are actually provided. The user points are stored in a card management table 121 which a hall management server 10 manages so as to be associated with a user card and are displayed on, for example, the header display part 4031 of the user information input screen 4040 shown in FIG. 38.

Figure 45A:
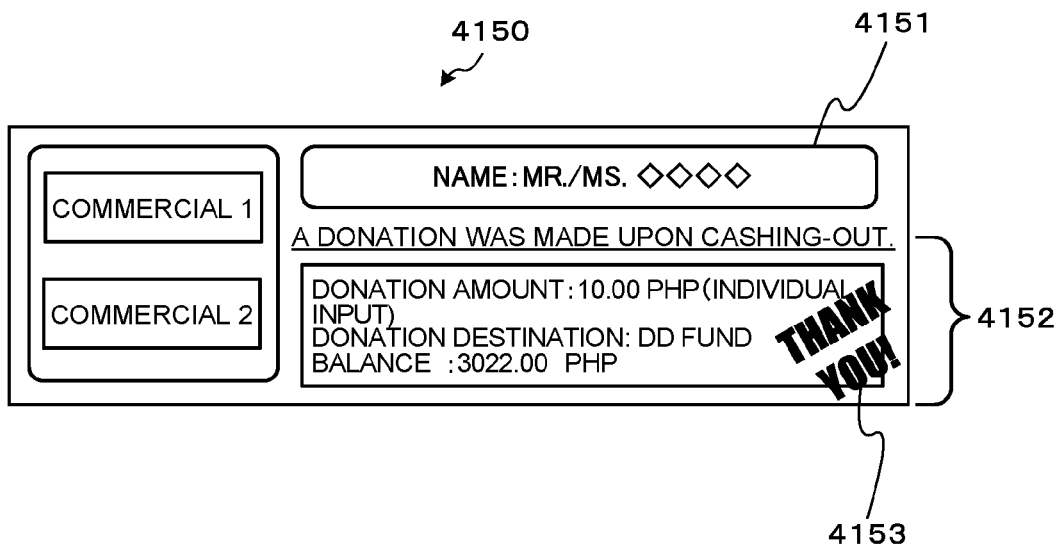
FIGS. 45A and 45B are diagrams showing examples of screens displayed on the PTS terminal according to the one embodiment of the present invention when a donation has been made.

FIG. 45A shows another example of displaying related to the donation collection. FIG. 45A shows a view in which when the CASHOUT button 1038 is pressed after a user has played games on the slot machine 1010 and a donation is automatically collected, displaying related to said donation collection is conducted. In this case, the user checks the checkbox for conducting automatic collection on the donation automatic collection information input part 4043 of the user information input screen 4040 shown in FIG. 38, checks a checkbox for specifying whether or not a donation is made by specifying a donation amount upon cashing-out on the donation setting information input part 4044 of the user information input screen 4040, and specifies individual input for the specifying of the donation amount. Further, the user checks the checkbox for specifying whether or not a donation destination is previously specified on the donation destination specifying information input part 4063 of the user information input screen 4060 shown in FIG. 40 and specifies a "D D fund" as the donation destination on the donation destination setting information input part 4064 thereof.

A donation collection display screen 4150 shown in FIG. 45A is displayed, shifting from the user menu screen 4090 shown in FIG. 41A. As on the user menu screen 4090, in an upper part thereof, a header display part 4151 for displaying a name of a user is arranged. Below the header display part 4151, a donation collection display part 4152 is arranged.

In addition, in a part above the donation collection display part 4152, the message "a donation has been made upon cashing-out" is displayed, and therebelow, contents of the donation are displayed. In an example shown in FIG. 45A, it is shown that the donation amount individually specified by the user is 10.00 PHP (although the description of the detail is omitted, a numerical value specifying window for inputting a donation amount is separately displayed in a pop-up manner and a user specifies the donation amount by touching any of numerical values there); a donation destination is the "D D fund"; and a card balance is 3022.00 PHP. Further, a character icon 4153 of "THANK YOU!" is displayed so as to overlap on the donation collection display part 4152.

Through the above-described displaying on the donation collection display part 4152, the user can confirm that the donation amount specified by the user has been donated to the donation destination specified by the user at the timing specified by the user.

Figure 45B:
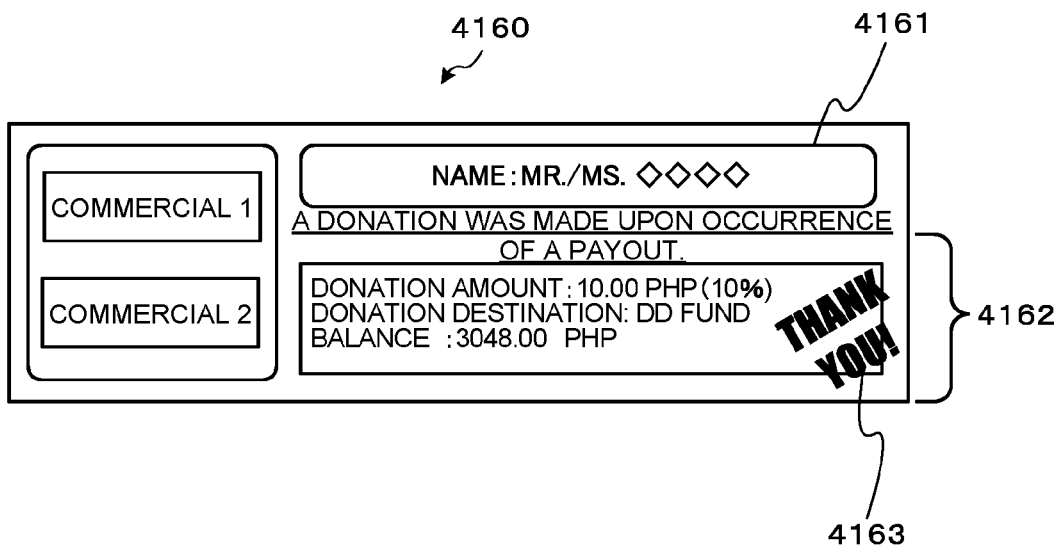

FIG. 45B shows further another example of displaying related to the donation collection. FIG. 45B shows a view in which when the CASHOUT button 1038 is pressed after a user has played games on the slot machine 1010 and a donation is automatically collected, displaying related to said donation collection is conducted. In this case, the user checks the checkbox for conducting automatic collection on the donation automatic collection information input part 4043 of the user information input screen 4040 shown in FIG. 38 and makes the setting in which when a Winloss money amount exceeds a predetermined money amount, 10% of a payout is donated (upon the occurrence of a payout) on a donation setting information input part 4054 of a user information input screen 4050 shown in FIG. 39. Further, the user checks the checkbox for specifying whether or not a donation destination is previously specified on the donation destination specifying information input part 4063 of the user information input screen 4060 shown in FIG. 40 and specifies the "D D fund" as the donation destination on the donation destination setting information input part 4064 thereof.

A donation collection display screen 4160 shown in FIG. 45B is displayed, shifting from the user menu screen 4090 shown in FIG. 41A. As on the user menu screen 4090, in an upper part thereof, a header display part 4161 for displaying a name of a user is arranged. Below the header display part 4161, a donation collection display part 4162 is arranged.

In addition, in a part above the donation collection display part 4162, a message "a donation has been made upon the occurrence of a payout." is displayed, and therebelow, contents of the donation are displayed. In an example shown in FIG. 45B, it is shown that the donation amount is 10% of a payout; a donation destination is the "D D fund"; and a card balance is 3048.00 PHP. Further, a character icon 4163 of "THANK YOU!" is displayed so as to overlap on the donation collection display part 4162.

Through the above-described displaying on the donation collection display part 4162, the user can confirm that the donation amount specified by the user as 10% of a payout has been donated to the donation destination specified by the user at the timing specified by the user.

It is to be noted that in the game system 1 according to the present embodiment, a donation can be made from a card balance and a payout and in addition thereto, a donation can be made by using user points associated with a user card. The user points are converted to a donation amount based on an exchange rate stored in a point exchange rate management table 424 managed by a donation management server 40. In addition, depending on a period such as a normal time and a campaign time, the exchange rate can be changed.

Figure 46A:
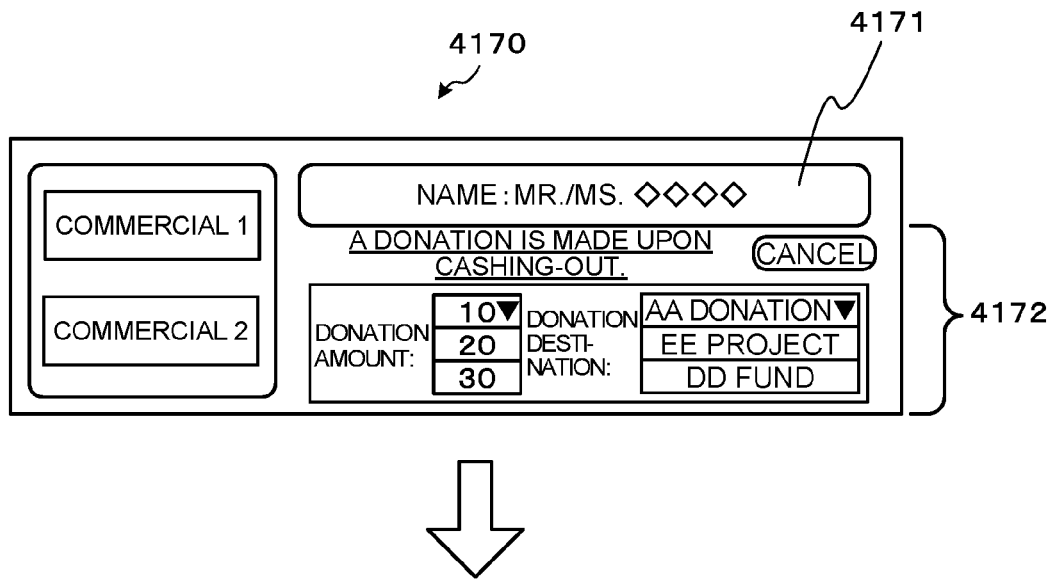
FIGS. 46A and 46B are diagrams showing an example of a screen displayed on the PTS terminal according to the one embodiment of the present invention when a donation is specified and an example of a screen displayed when the donation has been made.

FIG. 46A shows still another example of displaying related to the donation collection. FIG. 46A shows a view in which when the CASHOUT button 1038 is pressed after a user has played games on the slot machine 1010 and a donation is automatically collected, displaying related to said donation collection is conducted. In this case, the user checks the checkbox for conducting automatic collection on the donation automatic collection information input part 4043 of the user information input screen 4040 shown in FIG. 38, checks a checkbox for specifying whether or not a donation is made by specifying a donation amount upon cashing-out on the donation setting information input part 4044 of the user information input screen 4040, and specifies selection from a set amount (set by the system) for specifying the donation amount. Further, the user checks a checkbox for specifying whether or not a donation destination is individually specified at timing of making the donation on the donation destination specifying information input part 4063 of the user information input screen 4060 shown in FIG. 40.

A donation collection display screen 4170 shown in FIG. 46A is displayed, shifting from the user menu screen 4090 shown in FIG. 41A. As on the user menu screen 4090, in an upper part thereof, a header display part 4171 for displaying a name of a user is arranged. Below the header display part 4171, a donation collection display part 4172 is arranged.

In addition, in a part above the donation collection display part 4172, a message "a donation is to be made upon cashing-out" is displayed, and therebelow, a donation specifying screen is displayed. In an example shown in FIG. 46A, a pull-down menu which allows a user to select a donation amount set by the system from among 10, 20, and 30 (PHP) is displayed and a pull-down menu which allows a user to select a donation destination from among a "A A donation", a "E E project", and a "D D fund" so as to allow a user to individually specify a donation destination at timing of making a donation is displayed.

Through the above-described displaying on the donation collection display part 4172, according to the circumstances, a user can select a donation amount and a donation destination by himself or herself. In addition, in a part above the donation collection display part 4172, a CANCEL button is also displayed, and here, it can be arranged that said donation is not made by touching the CANCEL button.

Figure 46B:
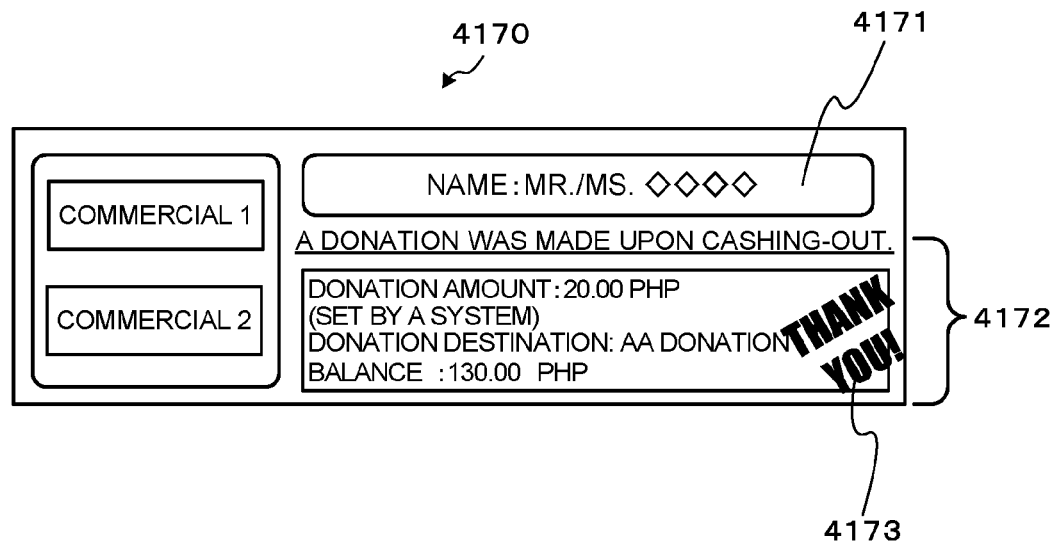

Thereafter, when a user has selected the donation amount and the donation destination from the pull-down menus, the donation collection display screen 4170 shown in FIG. 46A shifts to a donation collection display screen 4170 shown in FIG. 46B. On the donation collection display screen 4170 shown in FIG. 46B, although the same header display part 4171 on the donation collection display screen 4170 shown in FIG. 46A is displayed, display contents on the donation collection display part 4172 are changed. In other words, in a part above the donation collection display part 4172, a message "A donation has been made upon cashing-out" is displayed and therebelow, donation contents are displayed. In an example shown in FIG. 46B, it is shown that the donation amount selected by the user from among the donation amounts set by the system is 20.00 PHP; the donation destination select by the user is "A A donation"; and a card balance is 130.00 PHP. Further, a character icon 4173 of "THANK YOU!" is displayed so as to overlap on the donation collection display part 4172.

Through the above-described displaying on the donation collection display part 4172, the user can confirm that the donation has been made based on the donation amount and the donation destination selected by the user upon cashing-out.

In addition, although in the example shown in FIGS. 46A and 46B the configuration is arranged such that a user selects a donation amount and a donation destination upon cashing-out, a configuration may be arranged such that either one of the donation amount or the donation destination is fixed through the donation setting made by a user and the other is selected. In addition, a configuration may be arranged such that the donation amount and the donation destination are set in a fixed manner through the donation setting made by a user and a user selects whether or not a donation is made upon cashing-out based on the contents set as mentioned above.

[Flow of Game History Management and Donation Automatic Collection]

Figure 47:
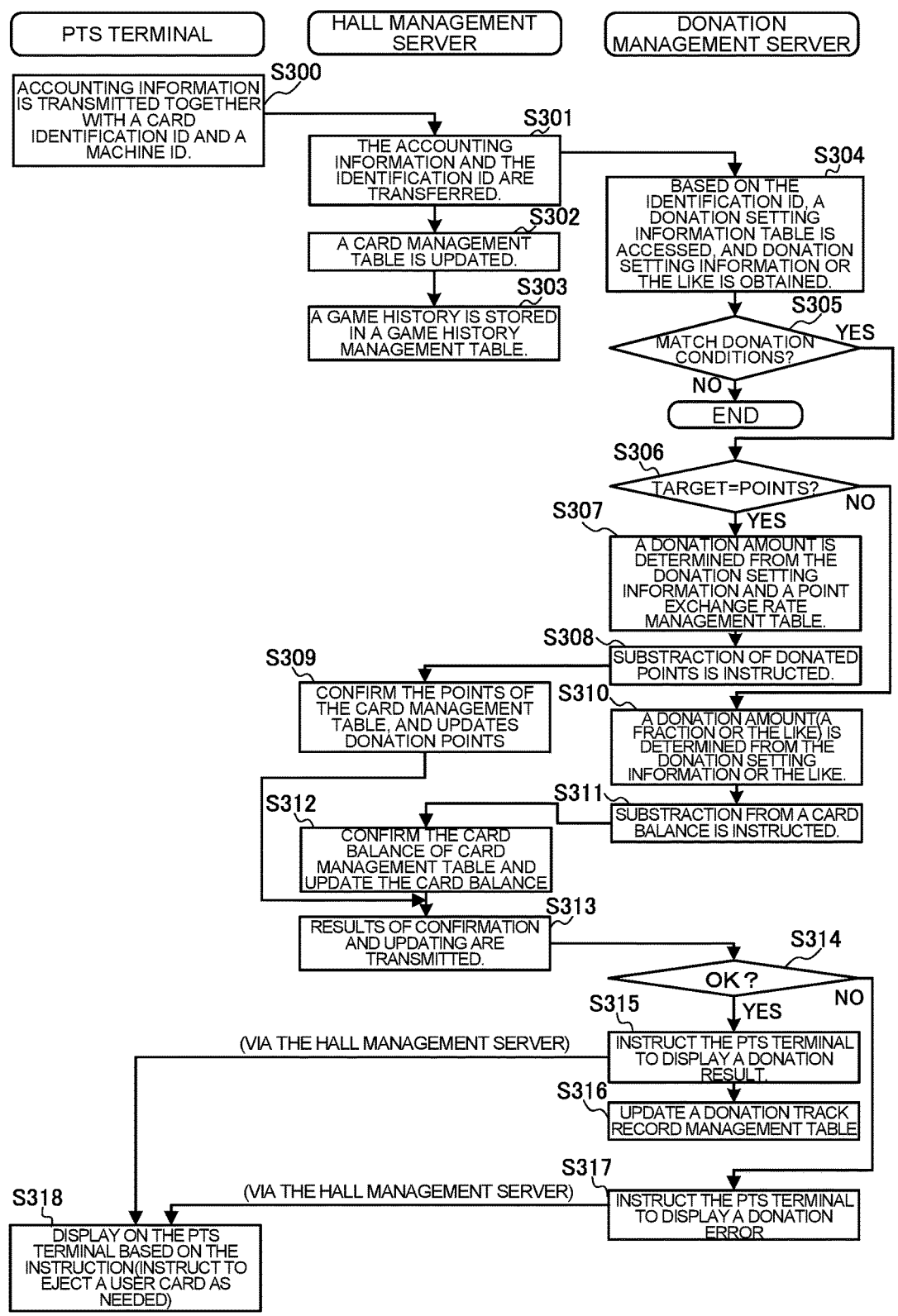
FIG. 47 is a flowchart showing an example of processing in which donation automatic collection is conducted in accordance with predetermined conditions in the game system according to the one embodiment of the present invention.

Next, with reference to FIG. 47, processing for game history management and for conducting donation automatic collection in accordance with specifying made by a user in a game system 1 according to the present embodiment will be described. FIG. 47 is a flowchart showing processes performed on a PTS terminal 1700, a hall management server 10, and a donation management server 40 respectively in time series.

First, at step S300, the PTS terminal 1700 receives game information from a gaming machine (slot machine 1010) and transmits information based on this game information, an identification ID of a user card inserted by a user into a card unit 1741 of the PTS terminal 1700, and a machine ID of said slot machine 1010 to the hall management server 10.

Here, the game information includes, for example, a Bet number per game, a payout number per game, user operation information (cashing-out operation, game start date and time, and game termination date and time), and the like. The PTS terminal 1700 converts the Bet number and the payout number from a credit unit to a predetermined monetary unit (for example, PHP), thereby obtaining a Bet money amount and a payout money amount, organizes these pieces of data, the operation information, and the like as accounting information, and transmits the accounting information together with the above-mentioned identification ID and machine ID to the hall management server 10.

Timing at which the accounting information or the like is transmitted to the hall management server 10 is basically timing at which contents of the accounting information have changed. For example, at timing when a game is started, timing at which a payout is awarded, timing at which cashing-out is conducted, or the like, the transmission to the hall management server 10 is conducted.

Upon receiving the accounting information, the identification ID, and the machine ID from the PTS terminal 1700, the hall management server 10 transmits at least one part of the accounting information and the identification ID to the donation management server 40 (step S301). In addition, based on the accounting information and the identification ID received from the PTS terminal, the hall management server 10 grasps a card balance of a user card of a user corresponding to the identification ID and updates a card management table 121 (step S302). Further, based on the accounting information, the identification ID, and the machine ID received from the PTS terminal, the hall management server 10 grasps a game history of the user corresponding to the identification ID and stores the game history in a game history management table 122 (step S303).

Upon receiving the accounting information and the identification ID from the hall management server 10, based on the identification ID, the donation management server 40 obtains donation automatic collection information and donation setting information from a donation setting information table (step S304). Here, it is determined whether or not contents of the accounting information match donation conditions indicated by the donation setting information (step S305), and when the contents of the accounting information do not match the donation conditions, the processing is finished (NO at step S305).

When the contents of the accounting information match the donation conditions indicated by the donation setting information (YES at step S305), it is determined whether or not a target to be donated is points (step S306). Whether or not the target to be donated is the points can be determined, for example, by checking whether or not "points" are shown as an item of the "target" in a row of a column of a conditional donation in a donation setting information table 421 shown in FIGS. 32A and 32B.

When the target to be donated is points (YES at step S306), at step S307, a donation amount is determined from the donation setting information and a point exchange rate management table 424, and at step S308, the hall management server 10 is instructed to subtract donated points. When the hall management server 10 has received this instruction of the subtraction of the donation points from the donation management server 40, the hall management server 10 confirms that there are points and thereafter, in accordance with this instruction, subtracts the donated points from "points" shown in a row of a column of "points" in the card management table 121 (step S309).

On the other hand, when the target to be donated is not points (NO at step S306), at step S310, a donation amount is determined from the donation setting information and the operation information. For example, in a case where in the donation setting information, the setting in which a fraction is donated upon cashing-out is made, when the donation is processed at timing of cashing-out and a fraction is present in a card balance of a user corresponding to the identification ID (here, the card management table 121 on the hall management server 10 is referenced), the fraction is determined as the donation amount.

In addition, for example, in a case where in the donation setting information, the setting in which 100 PHP is donated from a card balance upon the occurrence of a payout is made, when the donation is processed at timing of the occurrence of a payout and a balance which is greater than or equal to 100 is present in the card balance of the user corresponding to the identification ID (here, the card management table 121 on the hall management server 10 is referenced), the 100 PHP is determined as the donation amount.

Next, at step S311, the donation management server 40 instructs the hall management server 10 to perform the subtraction from the card balance. When the hall management server 10 has received this instruction of the subtraction from the card balance from the donation management server 40, the hall management server 10 confirms that there is the above-mentioned balance in the card balance and thereafter, in accordance with this instruction, subtracts the donation amount from a card balance shown in a row of a column of "card balance" in the card management table 121 (step S312).

After the hall management server 10 has confirmed and updated the card management table 121 (step S309 and step S312), at step S313, the hall management server 10 transmits a result of confirmation and updating of the card management table 121 to the donation management server 40.

The donation management server 40 determines whether or not the result of confirmation and updating of the card management table 121 received from the hall management server 10 is normal (step S314). When the result thereof is normal (YES at step S314), the donation management server 40 instructs the PTS terminal 1700 to display a donation result (step S315) and thereafter, stores donation contents in a donation track record management table 425 (step S316).

When the result of confirmation and updating of the card management table 121 is not normal (NO at step S314), the donation management server 40 instructs the PTS terminal 1700 to display a donation error (step S317).

When the PTS terminal 1700 has received the instruction to display the donation result via the hall management server 10 from the donation management server 40, based on the instruction, the PTS terminal 1700 controls the displaying on an LCD 1719 thereof (step S318). In addition, when the hall management server 10 has updated a card balance (step S312), in a case where the card balance is zero, it is made possible to instruct the PTS terminal 1700 to eject a user card from the card unit 1741 (in addition, in this case, it is also made possible to take in a user card to the card unit 1741).

As to the control of displaying on the LCD 1719 of the PTS terminal 1700, for example, when the PTS terminal 1700 has received the instruction to display the donation result from the donation management server 40, based on the instruction, predetermined screens and messages are displayed on the LCD 1719 of the PTS terminal 1700. For example, the screens and the messages shown in FIGS. 44A,B to 46A,B are displayed.

In addition, when the PTS terminal 1700 has received the instruction to display the donation error from the donation management server 40, based on the instruction, a predetermined error message or the like is displayed on the LCD 1719 of the PTS terminal 1700.

In an example shown in FIG. 47, a basic flow of the donation automatic collection based on the donation settings which a user has made is shown. For example, as in the specifying on the donation setting information input part 4044 shown in FIG. 38 and the donation destination specifying information input part 4063 shown in FIG. 40, there may be a case where processing for a dialogue with a user is required upon the collection of a donation (for example, on the donation collection display screen 4170 shown in FIG. 46A). Here, however, the description of such a case is omitted.

In addition, in the example shown in FIG. 47, in accordance with the donation settings made by a user, the donation management server 40 updates only data in the donation track record management table 425. Further, transfer data for transferring a money amount donated in a predetermined period of time to a bank account of a donation destination (for example, from a bank account managed by a game facility) may be transmitted to Data Telecommunication System of All Banks in Japan or the like, thereby realizing an automatic transfer. In addition, based on the donation track record management table 425, money amounts donated in a predetermined period of time may be totalized for each bank account of a donation destination, and the totalized money amounts are displayed and printed out, and based on said totalized table, a person in charge may manually perform transfer work.

It is to be noted that although in the example shown in FIG. 47, the subtraction from a card balance or points in the card management table 121 is performed in accordance with the donation settings made by a user, for example, processing may be performed by initially determining a donation amount for a donation made upon the occurrence of a payout or the like, and based on a value obtained after performing the donation collection and the subtraction, the card management table 121 may be updated.

[Implementation of Donation Manually Made by User]

Figure 48:
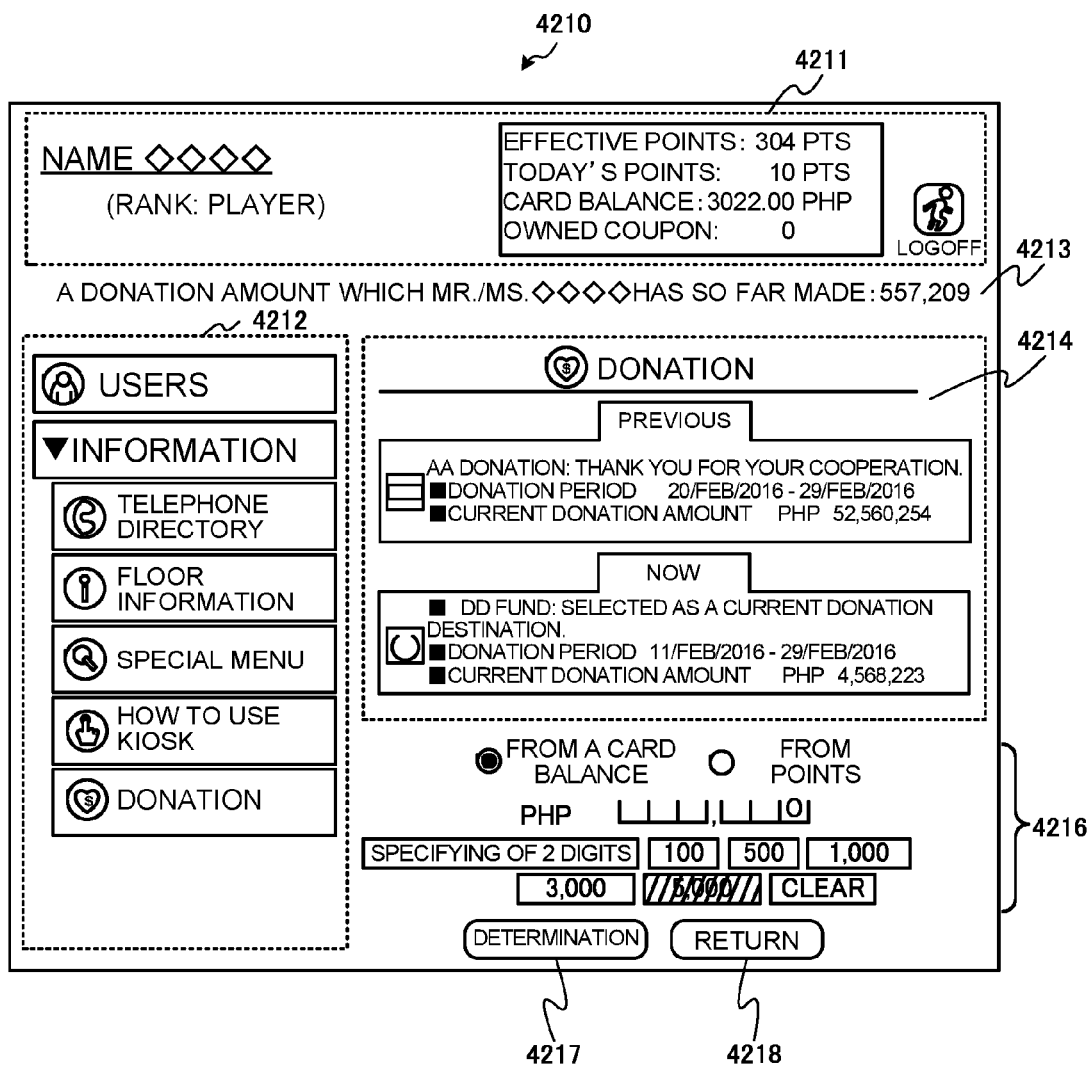
FIG. 48 is a diagram showing an example of a screen for accepting a donation made through a user operation in the game system according to the one embodiment of the present invention.
Figure 49:
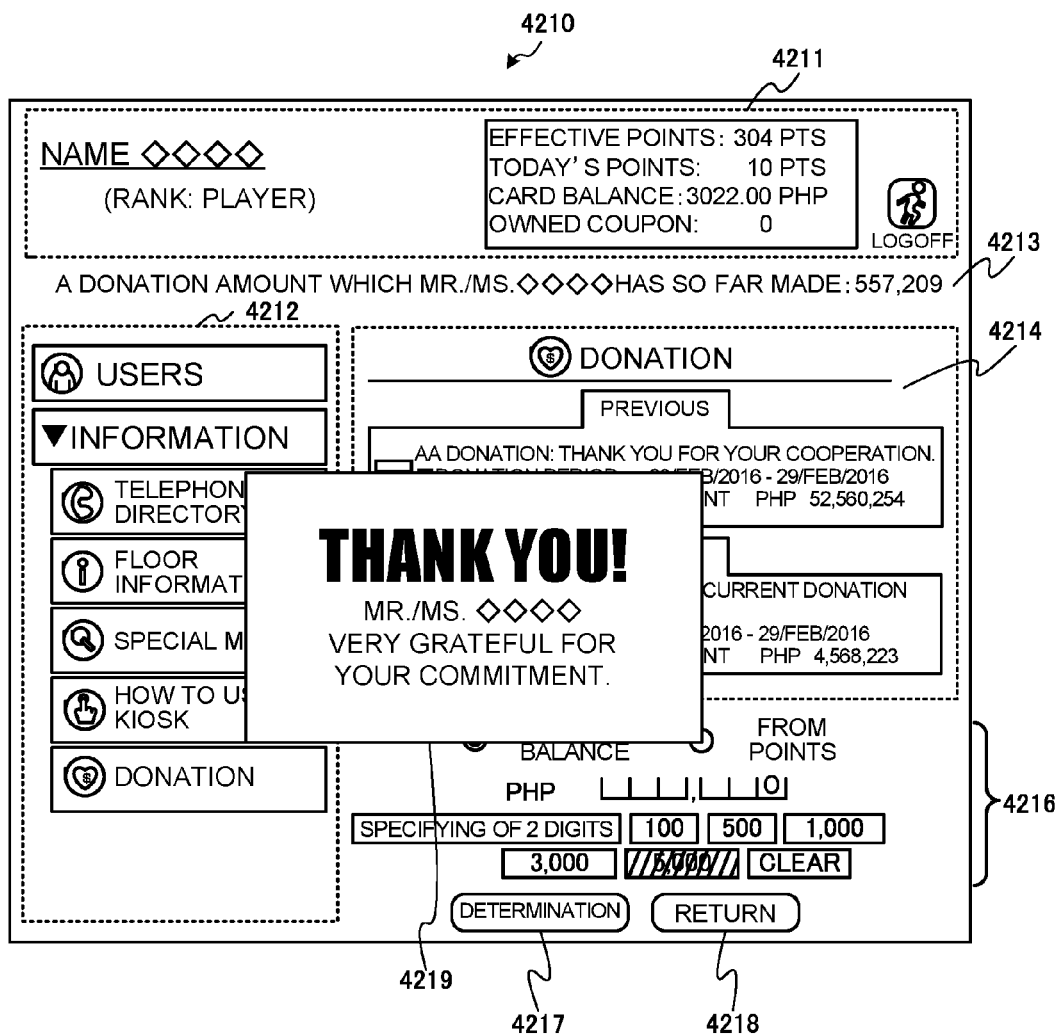
FIG. 49 is a diagram showing an example of a screen for accepting the donation made through the user operation in the game system according to the one embodiment of the present invention.

In a game system 1 according to the present embodiment, without reference to the above-described previous donation settings, a user can directly make manually a donation to a desired donation destination. With reference to FIG. 48 and FIG. 49, a donation instruction screen manually operated by a user will be described. Although the donation instruction screen exemplified here is displayed on an LCD 2001 of a kiosk terminal 2000, the donation instruction screen may be displayed on an LCD 1719 of a PTS terminal 1700 or an LCD 3003 of a signage 3000.

In FIG. 48, a donation instruction screen 4210 on which a user instructs a donation is shown. The donation instruction screen 4210 is a screen displayed after a user has logged in by inputting a Pincode on a user menu screen 4020 shown in FIG. 36.

In an uppermost part of the donation instruction screen 4210 shown in FIG. 48, a header display part 4211 on which a name (or a nickname) of a user registered on a user card, card information, and a LOGOFF button are displayed is arranged. In addition, in a left part below the header display part 4211, a selection menu display part 4212 which includes displays of "USERS" and "INFORMATION" is arranged. With respect to the "INFORMATION", as on a user menu screen 4010 shown in FIG. 35, as choices which a user can select, respective items of "Telephone directory", "Floor information", "Special menu", "How to use KIOSK", and "Donation" are displayed.

On the donation instruction screen 4210 shown in FIG. 48, a state in which the "Donation", which is one of the choices in the "INFORMATION", is selected by touching or the like is shown. By touching the "Donation", on an accumulated total donation money amount display part 4213, a donation amount which a user has so far made is displayed, and on a donation destination display part 4214, a plurality of donation destination candidates are displayed. For one of the donation destination candidates shown in an upper row, a tab of "PREVIOUS" is displayed, and for another of the donation destination candidates shown in a lower row, a tab of "NOW" is displayed. A user can switch a donation destination to a desired donation destination by performing touching, swiping, or the like on the donation destination display part 4214. For the donation destination candidate currently selected as a target for a donation, as described above, the tab of "NOW" is displayed.

Below the donation destination display part 4214, a donation instruction part 4216 is arranged, and thereon, radio buttons for selecting whether a donation is made from a card balance or points, a donation money amount display part on which a selected donation money amount is displayed, a plurality of buttons for specifying a donation money amount are arranged. Below the donation instruction part 4216, further, a determination button 4217 and a return button 4218 are arranged.

Here, a user selects one of the radio buttons to make a donation from a card balance; touches a button on which "100" is displayed to make a donation of 100 PHP; and thereafter, touches the determination button 4217, whereby 100 PHP is withdrawn from a card balance stored on a user card of the user and is donated to a selected donation destination (in this example, the donation destination indicated by the tab of "NOW").

When a user has selected another of the radio buttons to make a donation from points, an exchange rate between points and a currency is referenced (for example, a point exchange rate management table 424 is referenced), and after the points have been converted to the currency, the donation is made.

When the return button 4218 is touched, for example, the screen shifts to a user menu screen 4020 shown in FIG. 36.

When the determination button 4217 is touched by a user, the donation is executed and the screen shifts to a donation instruction screen 4210 shown in FIG. 49. Although on the donation instruction screen 4210 shown in FIG. 49, a header display part 4211, a selection menu display part 4212, an accumulated total donation money amount display part 4213, a donation destination display part 4214, a donation instruction part 4216, a determination button 4217, and a return button 4218 are the same as those on the donation instruction screen 4210 shown in FIG. 48, as a response to the execution of the donation, a window 4219 of "THANK YOU!" is displayed so as to overlap on the donation instruction screen 4210.

[Outline of User Points and Ranks]

Next, with reference to FIG. 50, an outline of user points managed in a game system 1 according to the present embodiment and user ranks will be described.

The user points are points awarded to gaming and other actions conducted by a user and are managed so as to be associated with a user card. In addition, in the game system 1, a plurality of ranks with respect to users are provided, based on points which users have and other criteria, user ranking is made. In accordance with respective user ranks, a game facility or the game system 1 according to the present embodiment can provide various differences in treatment of said users. For example, the higher a rank of a user is, the more expensive a coupon to be issued is. It is to be noted that user ranking for which only users who have made member registration are targeted can also be made.

Figure 50:
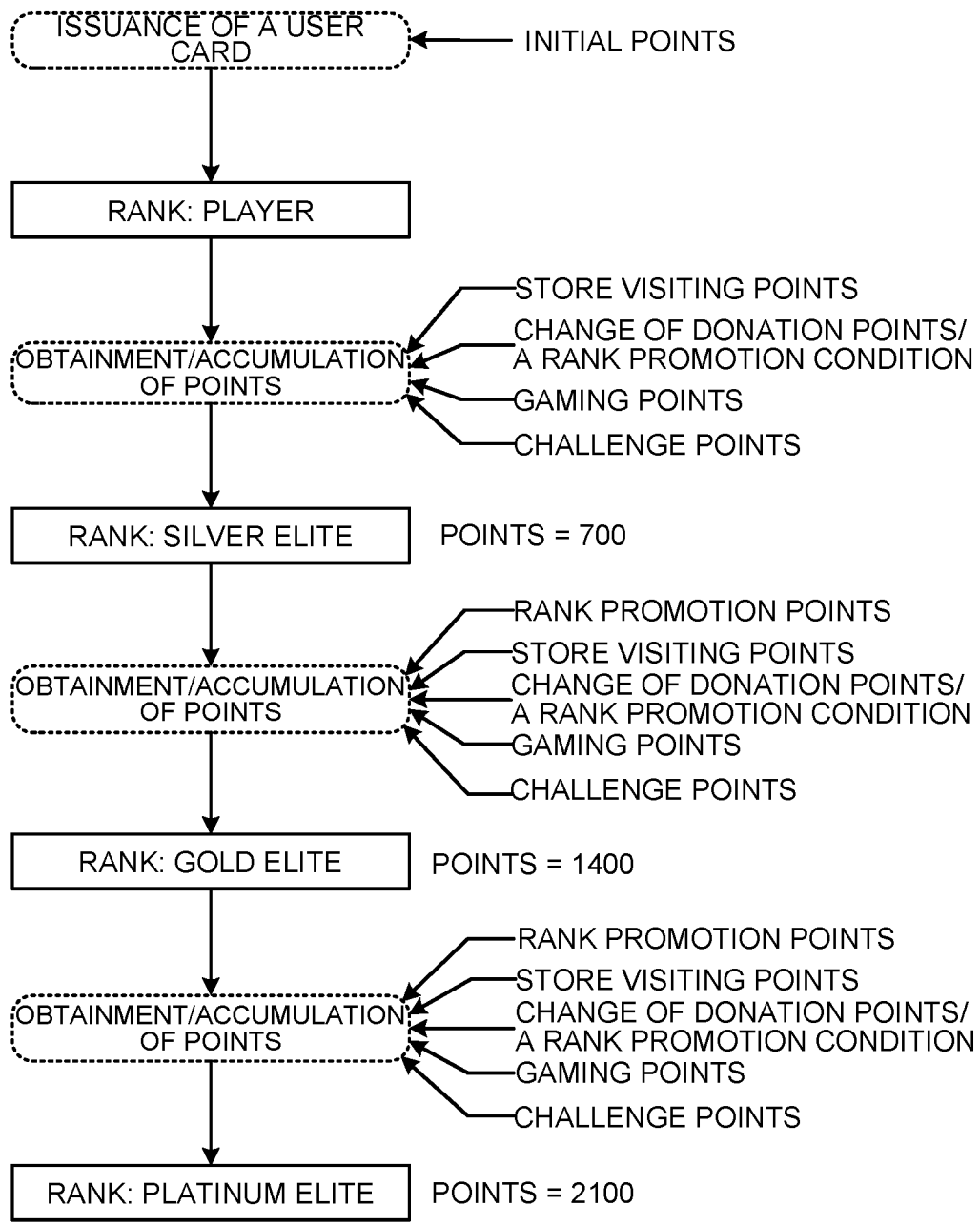
FIG. 50 is a diagram showing a concept of user rank shifting in the game system according to the one embodiment of the present invention.

FIG. 50 is a diagram showing the concept of the user ranking. As shown in FIG. 50, four ranks of "PLAYER", "SILVER ELITE", "GOLD ELITE", and "PLATINUM ELITE" are provided, and the "PLATINUM ELITE" is the highest rank. Upon obtaining predetermined points, a user is provided with a higher rank (promotion (to a higher rank)), and users with high ranks can enjoy various advantages.

For example, when a number of accumulated total points has become 700, the rank is promoted from the "PLAYER" to the "SILVER ELITE"; when a number of accumulated total points has become 1400, the rank is promoted from the "SILVER ELITE" to the "GOLD ELITE"; and when a number of accumulated total points has become 2100, the rank is promoted from the "GOLD ELITE" to the "PLATINUM ELITE".

It is to be noted that although in the present embodiment, in accordance with the number of points, the rank is promoted, instead of the number of points or in combination with the number of points, other criteria can also be adopted.

As the points, for example, various kinds of points such as initial points which are provided upon issuing a user card; store visiting points which are provided each time a user visits a store (for example, by carrying out a store visiting procedure on a kiosk terminal 2000); donation points which are provided upon making a donation; gaming points which are provided upon gaming on a slot machine 1010 or the like; rank promotion points which are provided upon rank promotion; and challenge points which are provided as a result of a challenge provided on a condition which is the elapse of predetermined gaming time can be set. In addition, the above-described conditions of the rank promotion may be changed depending on a number of specific points such as the donation points.

In addition, points consumed when a donation is made by automatic collection based on settings made by a user or points when a donation is manually made by a user can be managed so as to be disassociated from the points related to the rank promotion.

Figure 51:
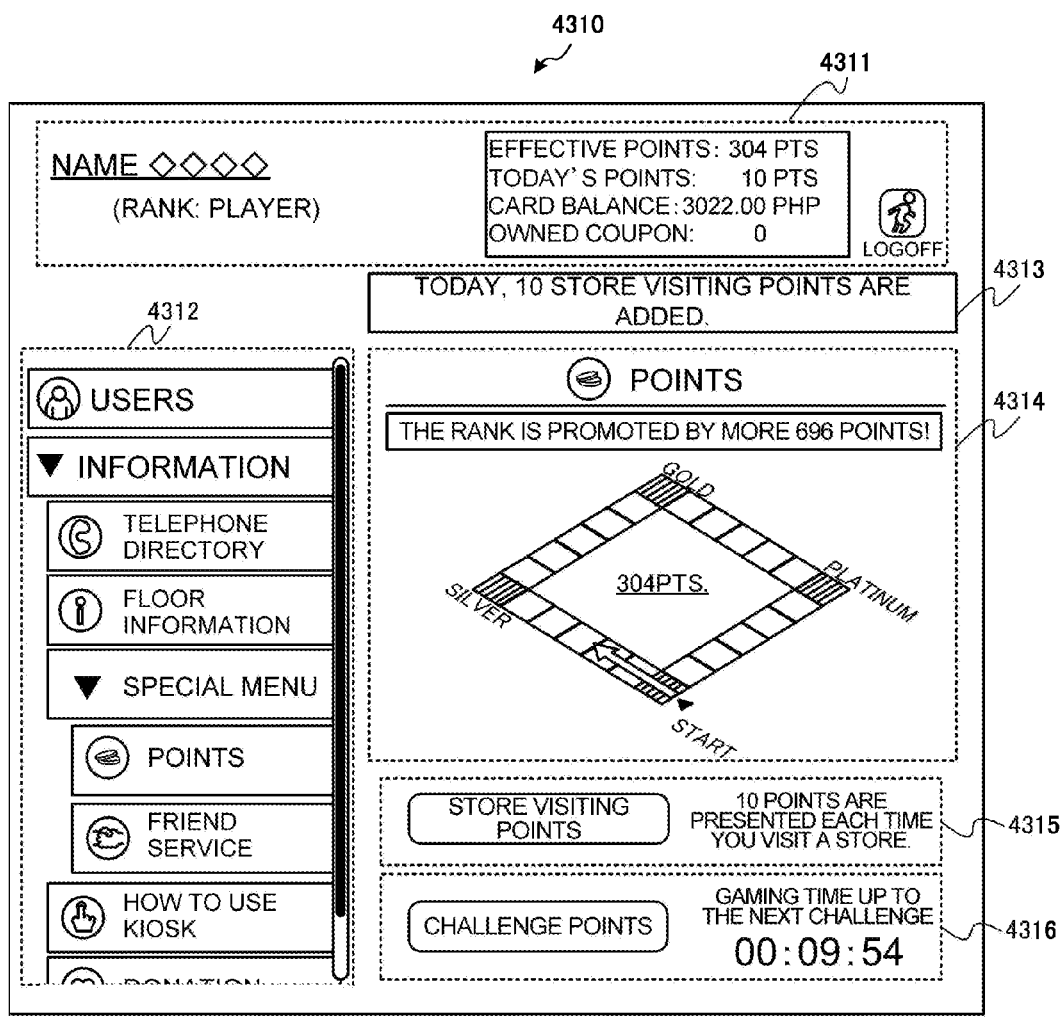
FIG. 51 is a diagram showing an example of a screen for displaying user points in the game system according to the one embodiment of the present invention.

In FIG. 51, a point management screen 4310 used by a user for referencing and managing points is shown. The point management screen 4310 is a screen displayed after a user has logged in by inputting a Pincode on a user menu screen 4020 shown in FIG. 36.

In an uppermost part of the point management screen 4310 shown in FIG. 51, a header display part 4311 on which a name (or a nickname) of a user registered on a user card, card information, and a LOGOFF button are displayed is arranged. In addition, in a left part below the header display part 4311, a selection menu display part 4312 which includes displays of "USERS" and "INFORMATION" is arranged. With respect to the "INFORMATION", as on a user menu screen 4010 shown in FIG. 35, as choices which a user can select, respective items of "Telephone directory", "Floor information", "Special menu", "How to use KIOSK", and "Donation" are displayed. Further, in FIG. 51, respective items of "Points" and "Friend service" as sub-menus which are developed by touching the "Special menu" are displayed.

On the point management screen 4310 shown in FIG. 51, a state in which the "Points" as one of the choices of this "Special menu" is selected by touching or the like is shown. By touching the "Points", a number of points added this day is displayed on a point guide display part 4313, and a number of said user points is displayed in a graphical manner on a point display part 4314. On the point display part 4314, a number of points which a user who has logged in currently has and a rank to which the user belongs are shown, and a number of points which allows promotion to a higher rank can be seen.

Below the point guide display part 4313, a store visiting points provision part 4315 which allows the store visiting points to be provided is displayed, and a user touches a store visiting points button, thereby adding the store visiting points (one time per day as an upper limit).

Below the store visiting points provision part 4315, a challenge points provision part 4316 which allows the challenge points to be provided is displayed, and a user touches a challenge points button, thereby starting a challenge game, for example, of a roulette game or the like and adding the challenge points in accordance with a result of the roulette game. In an example shown in FIG. 51, the challenge is enabled when a predetermined gaming time has lapsed.

[Processing Flow Related to Provision of Donation Points]

Figure 52:
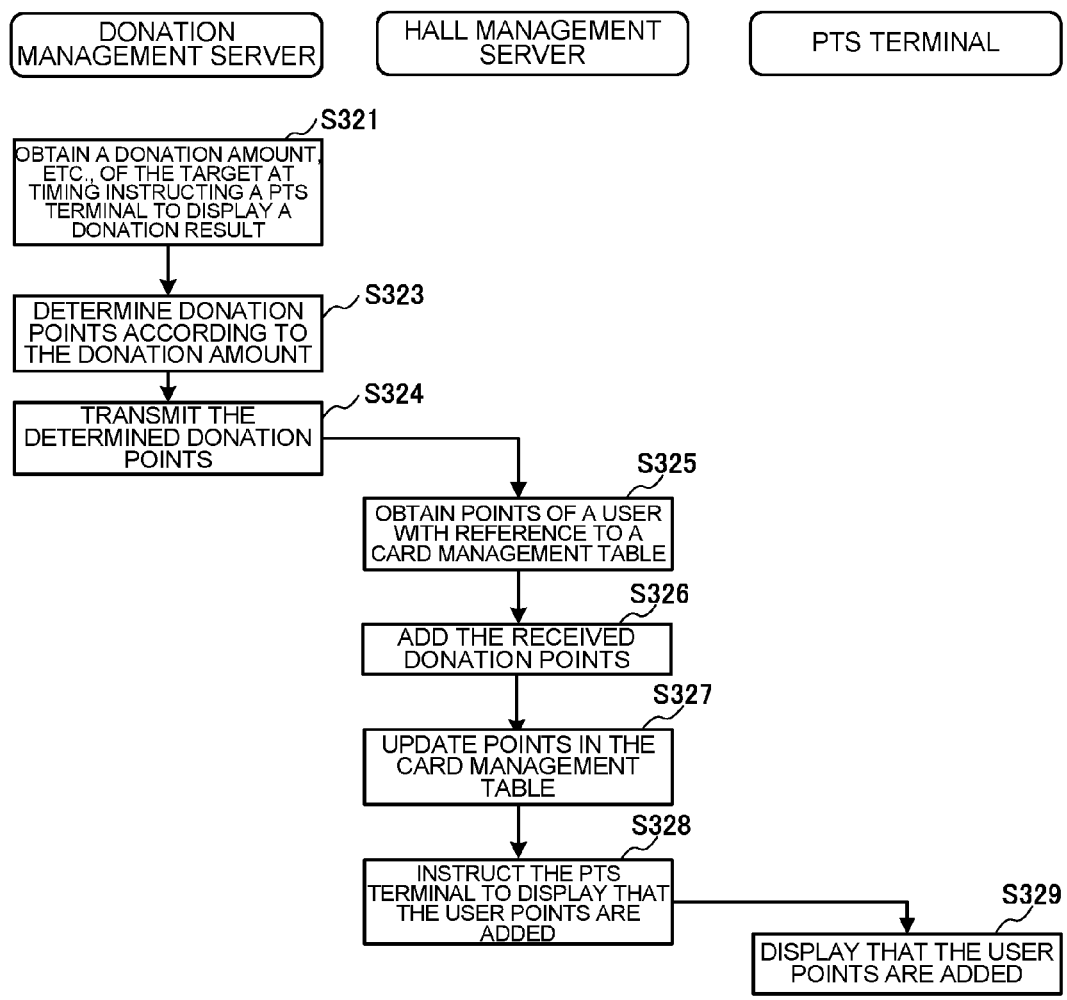
FIG. 52 is a flowchart showing an example of processing in which user points are provided in accordance with a donation amount in the game system according to the one embodiment of the present invention.

Next, with reference to FIG. 52, processing in which in a case where in a game system 1 according to the present embodiment, donation automatic collection in accordance with specifying made by a user is conducted, donation points are provided will be described. FIG. 52 is a flowchart showing processes performed on a donation management server 40, a hall management server 10, and a PTS terminal 1700 respectively in time series.

First, at step S321, the donation management server 40 obtains a donation amount of a target at timing when the PTS terminal is instructed to display a donation result at step S315 in FIG. 47. It is to be noted that although in this example, when a donation has been automatically made through donation settings made by a user, a user is provided with the donation points, also when on a donation instruction screen shown in each of FIG. 48 and FIG. 49, a donation has been made through a user operation (manually) from a card balance or points, similarly, the donation points are provided. In addition, at this time, although a number of the donation points is determined in accordance with a donation amount (for example, the larger the donation amount is, the larger the number of donation points to be provided is), in addition thereto, a donation amount may be determined depending on whether a donation is made automatically or manually.

Next, at step S323, the donation management server 40 determines a number of donation points provided for said user in accordance with the donation amount and at step S324, transmits the determined donation points to the hall management server 10 so as to be associated with an identification ID and a machine ID.

Upon receiving the determined number of donation points and the identification ID at step S325, the hall management server 10 references a card management table 121 based on the identification ID and obtains points of said user and at step S326, performs addition of the points obtained from the card management table 121 and the donation points received from the donation management server 40. It is to be noted that here, in a case where the donation points cannot be added as they are, a value of the donation points is converted as needed.

Next, at step S327, the hall management server 10 updates points shown in a row of a column of points in the card management table 121 by the points obtained as a result of the addition and at step S328, instructs the PTS terminal to display that the addition to the user points has been performed. In this case, a corresponding PTS terminal 1700 is identified by the machine ID.

When the PTS terminal 1700 has received, from the hall management server 10, the instruction to display the addition of the user points, in accordance with the instruction, on an LCD 1719 of the PTS terminal 1700, it is displayed that the user points have been added (step S329). This is a display like, for example, a pop-up text 4134 displayed on a donation collection display screen 4130 shown in FIG. 44B. In addition, at this time, the actually added user points and the user points obtained after the addition can also be displayed in the pop-up text 4134.

[Determination of Rank Promotion Conditions in Accordance with Donation Points]

Figure 53:
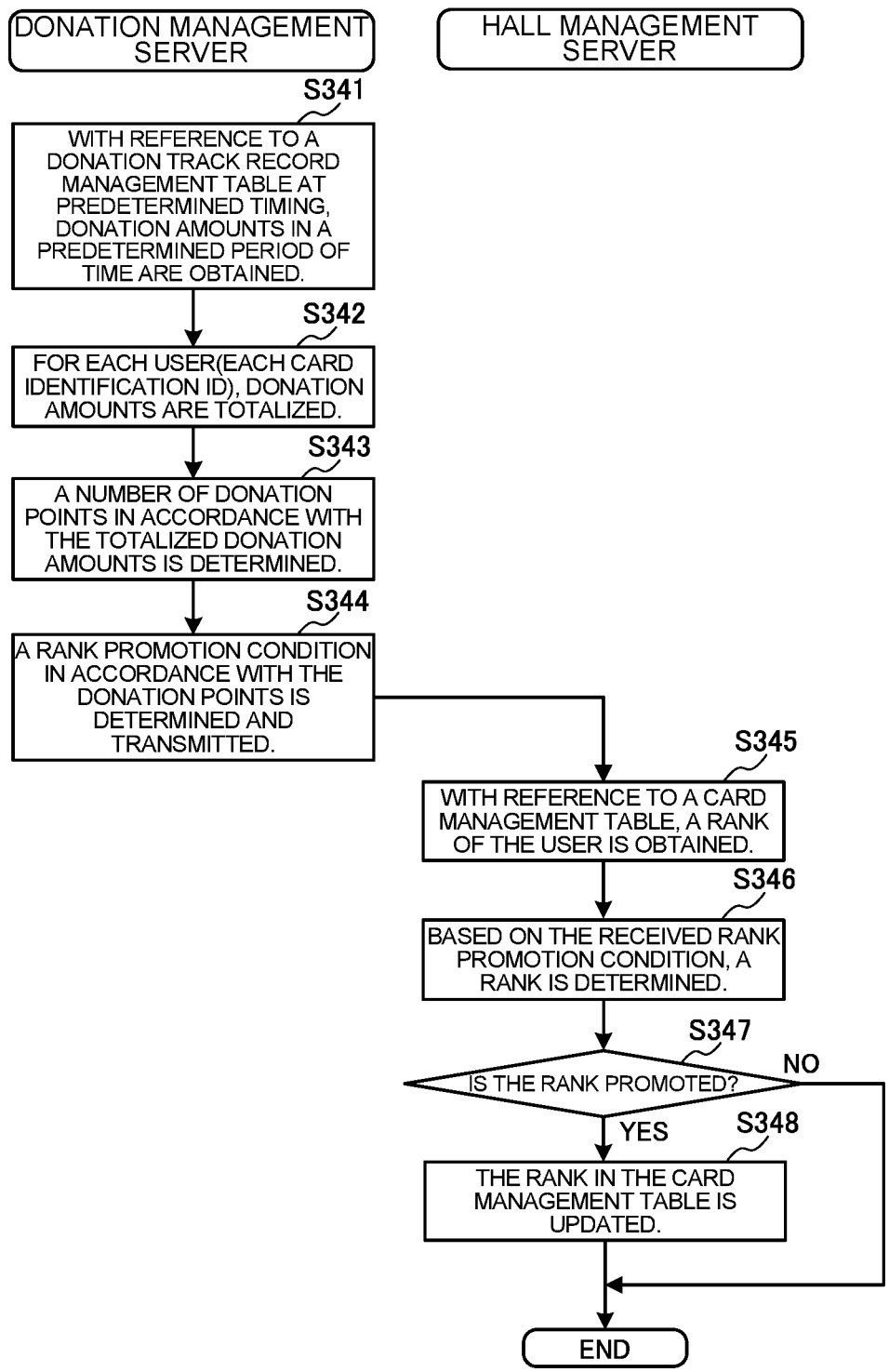
FIG. 53 is a flowchart showing an example of processing in which a user rank is promoted in accordance with a donation amount in the game system according to the one embodiment of the present invention.

Next, with reference to FIG. 53, processing in which in a game system 1 according to the present embodiment, rank promotion conditions in accordance with donation points provided by making a donation are determined will be described. FIG. 53 is a flowchart showing processes performed by a donation management server 40 and a hall management server 10 respectively in time series.

First, at step S341, the donation management server 40 references a donation track record management table 425 at predetermined timing and obtains donation amounts in a predetermined period of time. Next, at step S342, based on an identification ID, the donation management server 40 totalizes the donation amounts for each user and at step S343, determines a number of donation points in accordance with said totalized donation amounts.

Next, the donation management server 40 determines a rank promotion condition in accordance with the donation points and transmits the determined rank promotion condition to the hall management server 10 together with the identification ID (step S344).

The hall management server 10 which has received the rank promotion condition from the donation management server 40, at step S345, references a card management table 121 based on the identification ID and obtains a rank of a corresponding user and next, at step S346, determines a new rank of the user based on the received rank promotion condition and the rank of the user obtained from the card management table 121.

Here, the hall management server 10 determines whether or not the rank of the user has been promoted (step S347), and when the rank of the user has been promoted (YES at step S347), the hall management server 10 updates a rank shown in a row of a column of a "rank" in the card management table 121 (step S348) and finishes the processing. On the other hand, when the rank of the user has not been promoted (NO at step S347), the hall management server 10 finishes the processing without conducting anything.

Through the above-described change in the rank promotion conditions, for example, as shown in FIG. 50, a condition on which the rank is promoted to "SILVER ELITE" is that a number of user points is greater than or equal to 700 and a condition on which the rank is promoted to "GOLD ELITE" is that a number of user points is greater than or equal to 1400 are changed to a condition on which the rank is promoted to "SILVER ELITE" is that a number of user points is greater than or equal to 500 and a condition on which the rank is promoted to "GOLD ELITE" is that a number of user points is greater than or equal to 1000. Thus, a rank of a user can be promoted to a higher rank at an earlier stage and a user can enjoy more advantageous service in a game facility or the like.

In addition, as in the basic configuration shown in FIG. 50, the donation points can also be treated in the same manner in which the store visiting points or the gaming points are treated, thereby allowing the rank to be simply determined based on the accumulation of the obtained points.

[Displaying of Donation Ranking]

Figure 54:
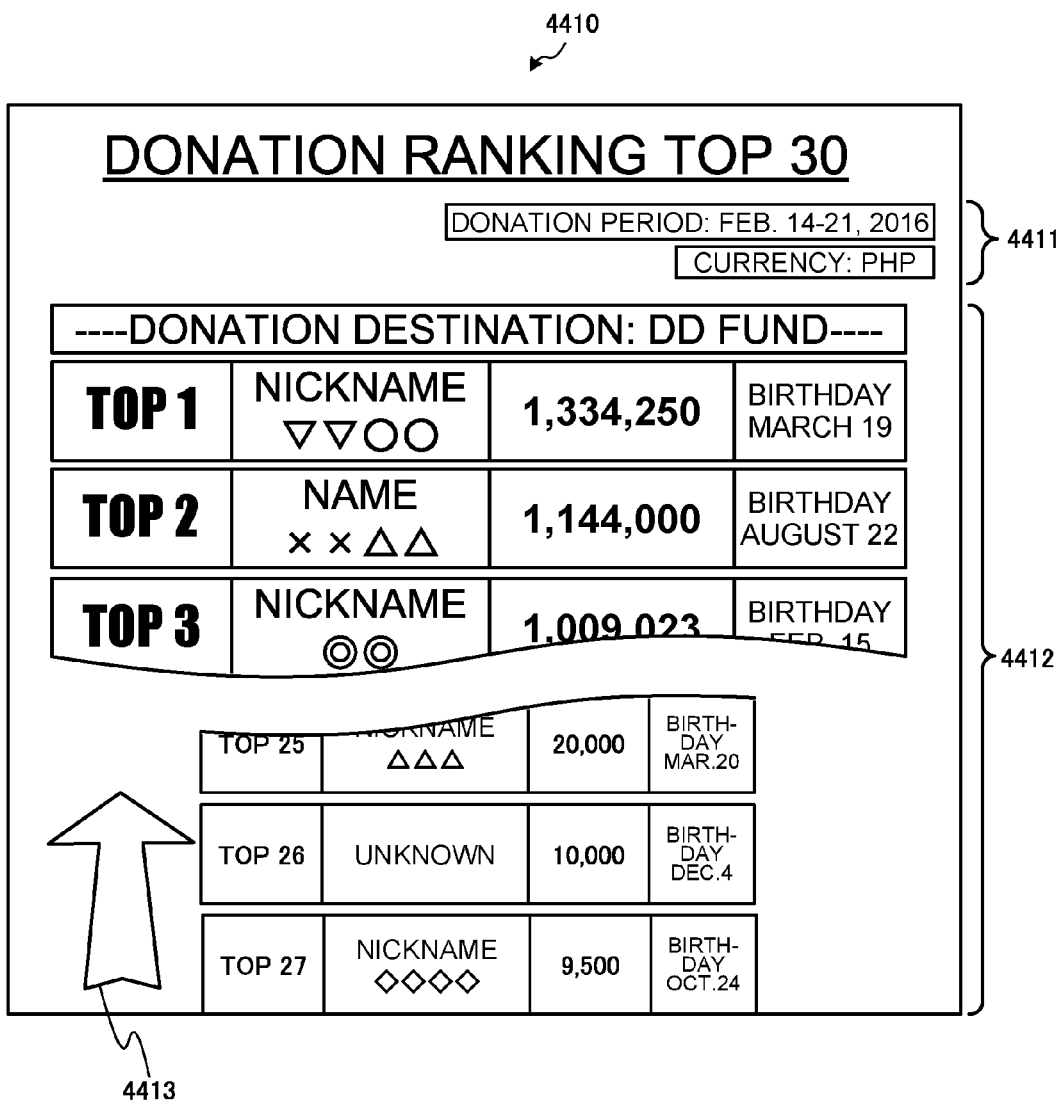
FIG. 54 is a diagram showing an example of a screen for displaying donation ranking on the kiosk terminal according to the one embodiment of the present invention.
Figure 55:
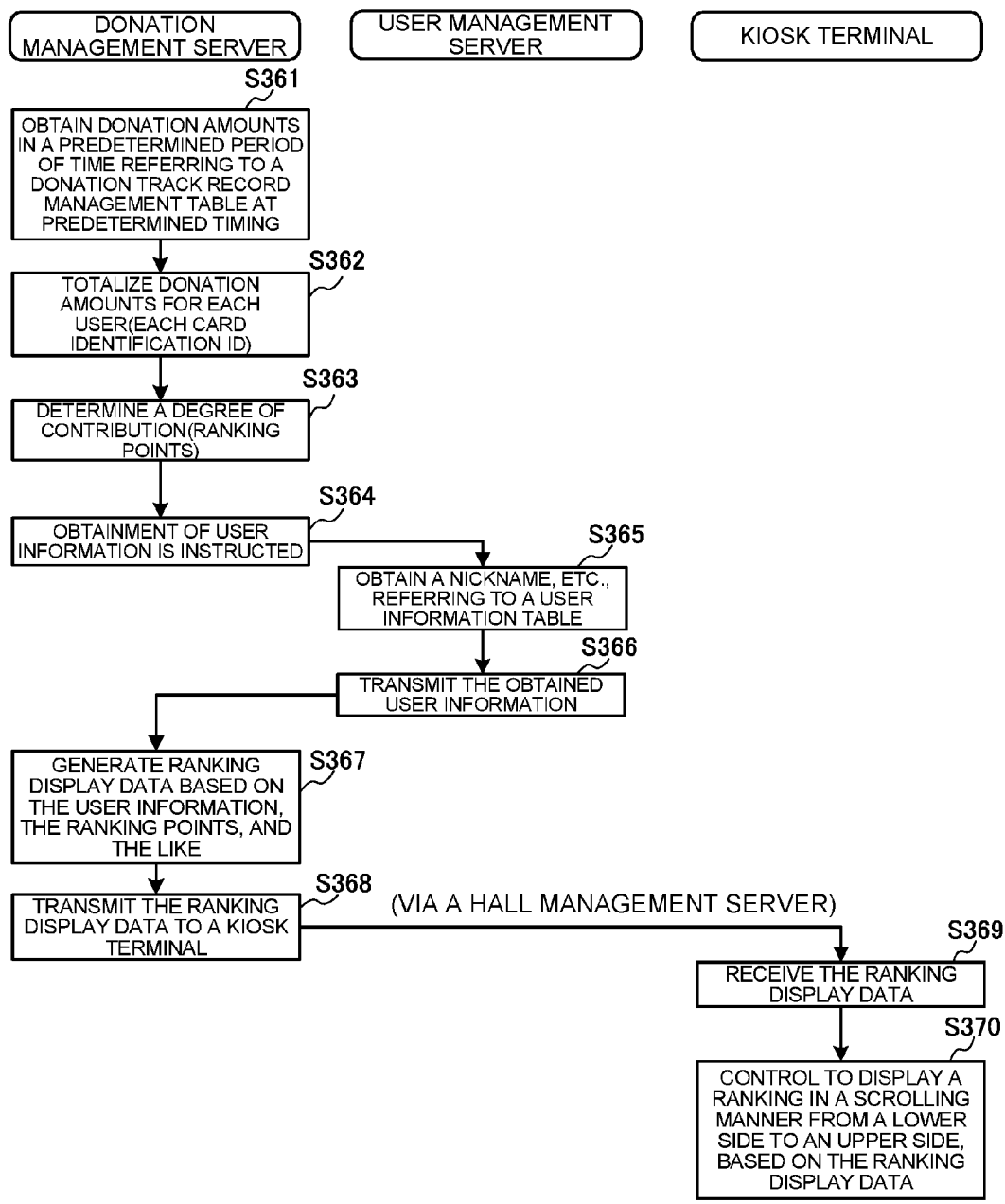
FIG. 55 is a flowchart showing an example of processing in which the donation ranking is edited and displayed in the game system according to the one embodiment of the present invention.

Next, with reference to FIG. 54 and FIG. 55, displaying of a donation ranking screen in a game system 1 according to the present embodiment will be described. FIG. 54 shows a donation ranking screen 4410 displayed on an LCD 2001 of a kiosk terminal 2000. However, the donation ranking screen 4410 can be displayed on an LCD 2050 or an LCD 2051, which is other display device of the kiosk terminal 2000, an LCD 1719 of a PTS terminal 1700, an LCD 3001 or an LCD 3003 of a signage 3000, or the like.

On the donation ranking screen 4410 shown in FIG. 54, below a title of "Donation ranking TOP 30", a period and etc. display part 4411 which includes displays of a donation period and a currency is arranged. Further, below the period and etc. display part 4411, a ranking row display part 4412 for displaying ranking rows is arranged.

In an upper part of the ranking row display part 4412, ranking rows of users who rank higher, starting from TOP 1, are displayed, and in a lower part of the ranking row display part 4412, ranking rows of users who rank lower, such as TOP 25 to TOP 27, are displayed so as to have smaller sizes than those of the ranking rows of the users who rank higher.

In addition, the respective ranking rows are automatically displayed in a scrolling manner from a lower side toward an upper side of the donation ranking screen 4410 (in a direction indicated by an arrow 4413). When all of the ranking rows of TOP 30 have been displayed, the ranking rows of the users who rank higher are displayed again from beneath.

In addition, when the ranking rows of the users who rank higher are displayed, a scrolling speed can also be controlled to be lowered. Further, in a case where a user card has been touched onto a touch unit or a card unit (for example, a touch unit 2004 or a card unit 2030 of the kiosk terminal 2000, a touch unit 1745 or a card unit 1741 of the PTS terminal 1700, a touch unit 3007 of the signage 3000, or the like) and an identification ID has been read, while a ranking row of a user corresponding to the read identification ID is being displayed, the scrolling speed can also be lowered; LEDs (for example, a bezel LED 2042 and an incoming LED 2008 of the kiosk terminal 2000, full-color LEDs 1731 and 1733 of the PTS terminal 1700, presentation LEDs 3002 and 3004 of the signage 3000, or the like) can also be caused to emit light; and a speaker or speakers (for example, a speaker 2035 of the kiosk terminal 2000, speakers 1707 and 1709 of the PTS terminal 1700, speakers 3034 and 3035 of the signage 3000, or the like) can also be caused to output sounds. In addition, the ranking row of that user can also be displayed in a manner different from a manner in which the other ranking rows are displayed.

In an example shown in FIG. 54, in each of the ranking rows, a ranking order, a user display (a name, a nickname, or "UNKNOWN"), a donation amount in a period displayed on the period and etc. display part 4411 (a monetary unit is a monetary unit displayed on the period and etc. display part 4411), and a date of birth (month-and-day parts of date of birth of a user) are displayed. The user display in the ranking row which a user has specified in a donation ranking display on a donation setting information input part 4044 of a user information input screen 4040 shown in FIG. 38 is displayed.

As shown in FIG. 54, in a case of the name, below a text "Name", a name of a user is displayed, and in the case of the nickname, below a text "Nickname", a nickname of a user is displayed.

It is to be noted that although in the present embodiment, when a user has specified the "hidden" in said donation ranking display, "UNKNOWN" is displayed as the user display in the ranking row, the ranking row itself can also be arranged not to be generated.

In addition, in the example shown in FIG. 54, totals of donation amounts provided for a predetermined donation destination in the predetermined period of time are displayed in a ranking format. However, totals of donation amounts in a predetermined period of time may be displayed in the ranking format; totals of donation amounts so far provided for a predetermined donation destination (or for all of the donation destinations as targets) may be displayed in the ranking format; or donation amounts, each of which has been provided one time, may be displayed in descending order in the ranking format. In addition, ranking based on a correlation between donation amounts and gaming states or gaming results, such as ranking in descending order of ratios of donation amounts to Winloss amounts and ranking in descending order of ratios of donation amounts to gaming periods of time, can also be displayed. In addition thereto, ranking display can be conducted by a variety of ways.

Next, with reference to FIG. 55, processing in which in the game system 1 according to the present embodiment, the donation ranking is displayed on the kiosk terminal 2000 will be described. FIG. 55 is a flowchart showing processes performed on a donation management server 40, a user management server 30, and the kiosk terminal 2000 respectively in time series.

First, at step S361, the donation management server 40 references a donation track record management table 425 at predetermined timing and obtains donation amounts in a predetermined period of time. Next, at step S362, based on an identification ID, the donation management server 40 totalizes the donation amounts for each user and at step S363, determines a degree of contribution (ranking points) in accordance with said totalized donation amounts. In the example shown in FIG. 54, the ranking of the donation amounts in the predetermined period of time in descending order is simply made. However, in consideration of other degree of contribution in accordance with donation contents, for example, a frequency of donations, a donation destination, a donation method (such as automatic collection, a manual donation, and settings of automatic collection), a maximum donation amount (whether or not a donation amount is a maximum amount among donation amounts, each of which is provided one time), or the like, the ranking points may be determined and the ranking may be thereby made.

Next, at step S364, based on the identification ID, the donation management server 40 references a donation setting information table 421, grasps which one among the name, the nickname, and the hidden has been specified by each of the users, and transmits the identification ID to a user management server 30 to instruct the user management server 30 to obtain user information (in other words, a name or a nickname). Upon receiving from the donation management server 40 the instruction to obtain the user information, at step S365, the user management server 30, based on the identification ID, references a user information table 321, obtains a name or a nickname of a user corresponding thereto, and at step S366, transmits the user information obtained as mentioned above to the donation management server 40.

Next, at step S367, based on the user information obtained from the user management server 30, ranking points, and the like, the donation management server 40 generates ranking display data and at step S368, transmits said ranking display data to the kiosk terminal 2000. It is to be noted that although in this example, it is shown that the donation ranking display is conducted in one kiosk terminal 2000, in a case where the donation ranking display is conducted on a plurality of kiosk terminals 2000 or a plurality of signages 3000 within a game facility, the ranking display data is transmitted to all of these terminals.

In addition, this ranking display data is transmitted via a hall management server 10 to the kiosk terminal 2000. However, when the ranking display data is transmitted to the plurality of terminals, a configuration can be arranged such that this ranking display data is distributed to each of the terminals by the hall management server 10.

Upon receiving the ranking display data from the donation management server 40 at step S369, at step S370, based on the received ranking display data, the kiosk terminal 2000 displays the donation ranking screen and controls the said screen to display the ranking rows in the scrolling manner from the lower side toward the upper side (for example, the donation ranking screen 4410 shown in FIG. 54).

[Friend Settings and Donation Information Notification to Friends]

Next, with reference to FIG. 56 to FIG. 59, friend setting processing in a game system 1 according to the present embodiment and processing in which friends registered through the friend setting processing are notified of donation information will be described. It is to be noted that this friend setting operation can be performed on a kiosk terminal 2000 and in addition thereto, can be similarly performed also on a PTS terminal 1700 or a signage 3000. Here, an example in which the friend setting operation is performed on the kiosk terminal 2000 will be described.

Figure 56:
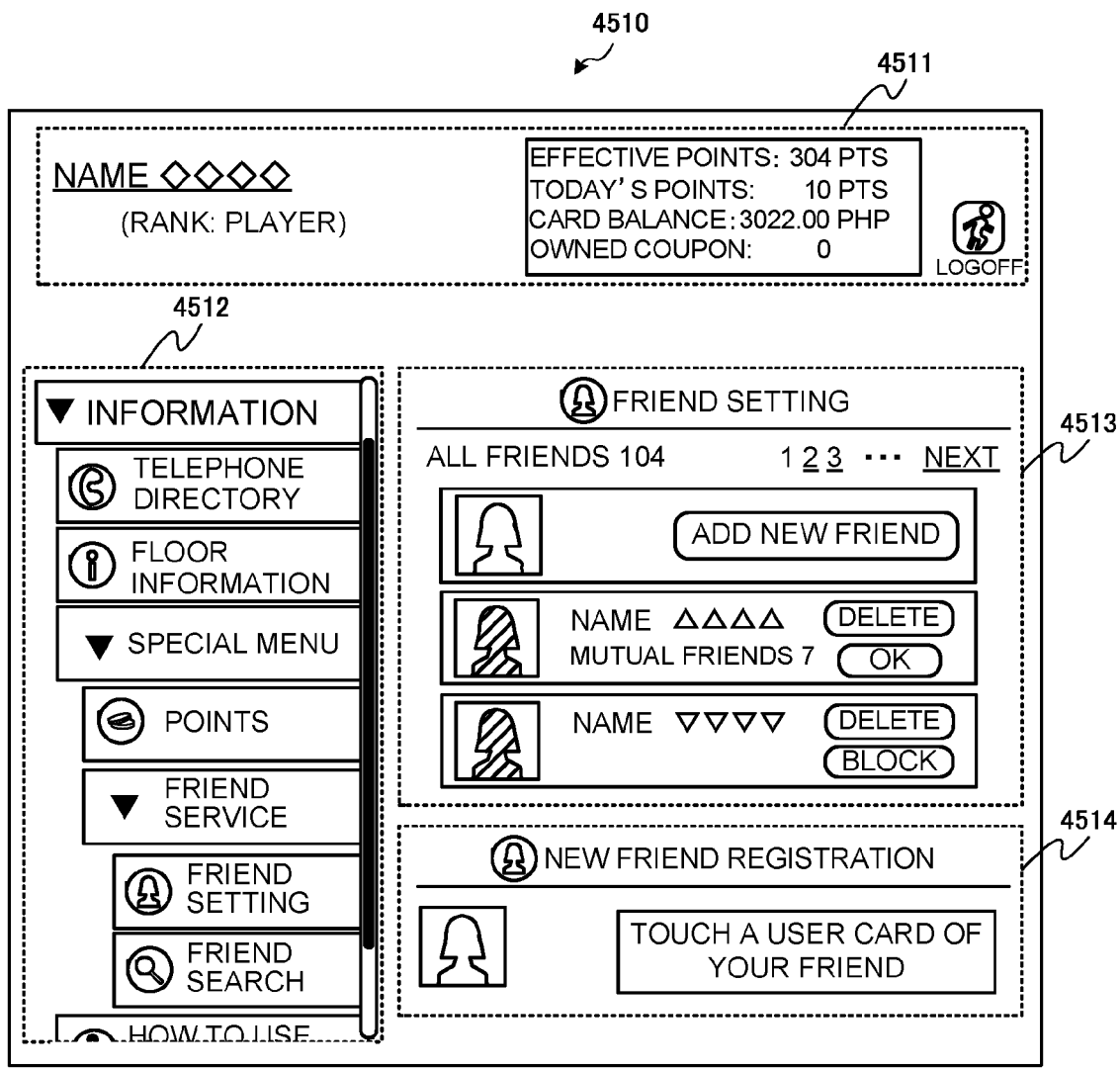
FIG. 56 is a diagram showing an example of a screen for registering a friend on the kiosk terminal according to the one embodiment of the present invention.

In FIG. 56, a friend setting screen 4510 which allows a user to conduct friend settings is shown. The friend setting screen 4510 is a screen displayed after a user has logged in by inputting a Pincode on a user menu screen 4020 shown in FIG. 36.

In an uppermost part of the friend setting screen 4510 shown in FIG. 56, a header display part 4511 on which a name (or a nickname) of a user registered on a user card, card information, and a LOGOFF button are displayed is arranged. In addition, in a left part below the header display part 4511, a selection menu display part 4512 which includes displays of "USERS" and "INFORMATION" is arranged. With respect to the "INFORMATION", as on a user menu screen 4010 shown in FIG. 35, as choices which a user can select, respective items of "Telephone directory", "Floor information", "Special menu", "How to use KIOSK", and "Donation" are displayed. Further, in FIG. 56, respective items of "Points" and "Friend service" as sub-menus which are developed by touching the "Special menu" are displayed, and further, respective items of "Friend setting" and "Friend search" as sub-menus which are developed by touching the "Friend service" are displayed.

On the friend setting screen 4510 shown in FIG. 56, a state in which the "Friend setting" as one of the choices of this "Friend service" is selected by touching or the like is shown. By touching the "Friend setting", a friend display part on which friends of said user who have been registered are shown is displayed in a listed manner on a friend setting display part 4513. A topmost part of the friend display part on the friend setting display part 4513 is a display part for newly registering a friend.

When a user is going to newly register a friend, by touching an "ADD NEW FRIEND" button displayed in the display part for newly registering a friend, which is displayed in the topmost part of the friend setting display part 4513, below the friend setting display part 4513, a friend new registration part 4514 is displayed.

Here, when in accordance with a guide display "Please touch a user card of a friend." displayed on the friend new registration part 4514, a friend of a user has touched his or her user card (a user card on which user information has already been inputted) onto a touch unit 2004 of the kiosk terminal 2000, an identification ID of the user card is read from the touch unit 2004, said user and the friend of the user, who has touched the user card thereonto, are associated with each other as friends. The new registration of a friend is conducted by the above-described operation, and it is not required for the user and the friend of the user to perform a particular input operation.

Figure 57:
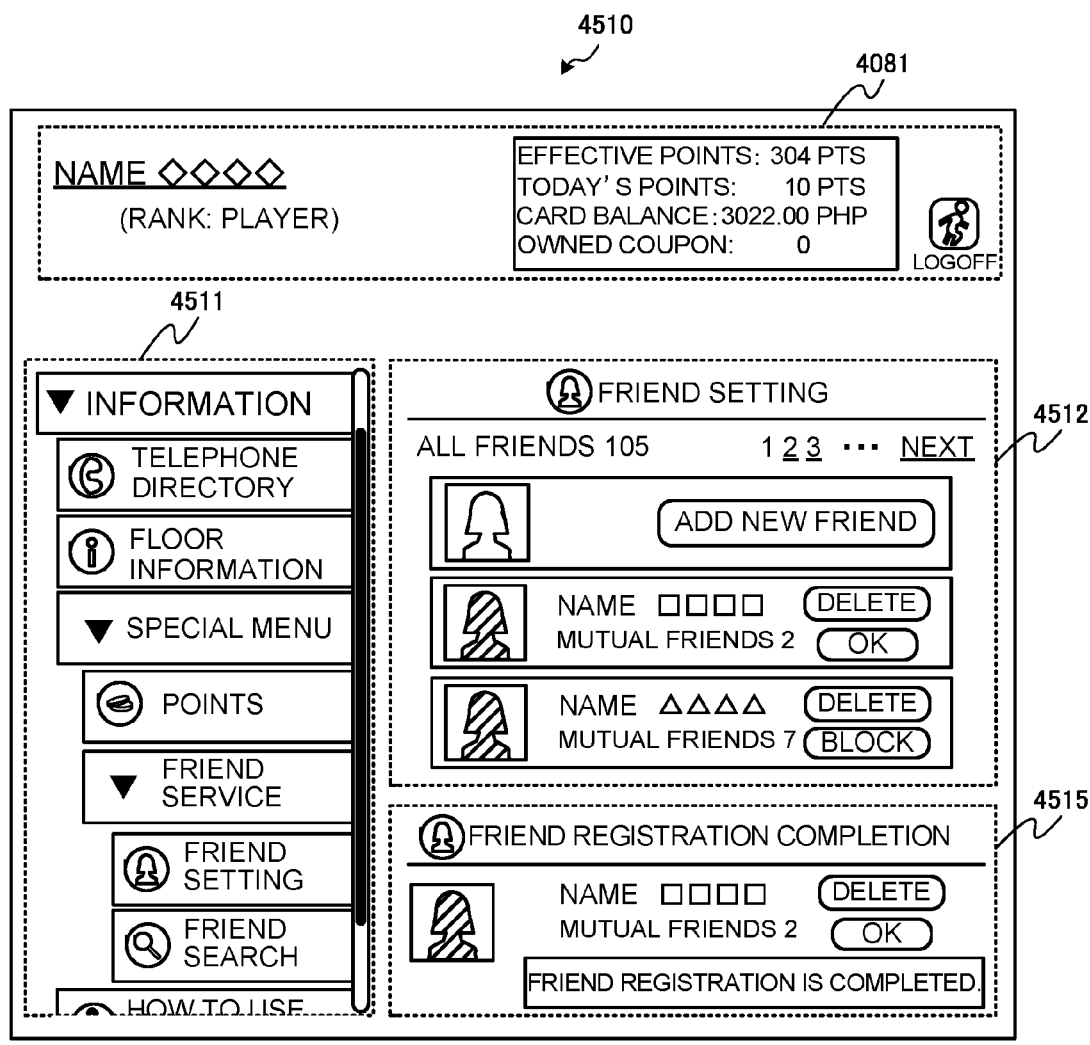
FIG. 57 is a diagram showing an example of a screen for registering the friend on the kiosk terminal according to the one embodiment of the present invention.

When the friend of the user has touched his or her user card onto the touch unit 2004 of the kiosk terminal 2000, the friend setting screen 4510 shown in FIG. 56 shifts to a friend setting screen 4510 shown in FIG. 57.

Display contents on the friend setting screen 4510, the header display part 4511, the selection menu display part 4512, and the friend setting display part 4513 of the friend setting screen 4510 shown in FIG. 57 are the same as those on the friend setting screen 4510, the header display part 4511, the selection menu display part 4512, and the friend setting display part 4513 of the friend setting screen 4510 shown in FIG. 56. However, in accordance with the new registration of the friend of the user, the friend new registration part 4514 shifts to a friend registration completion display part 4515, and a name of the friend and a number of common friends are displayed and further, a guide display "Friend registration has been completed." is shown.

Figure 58:
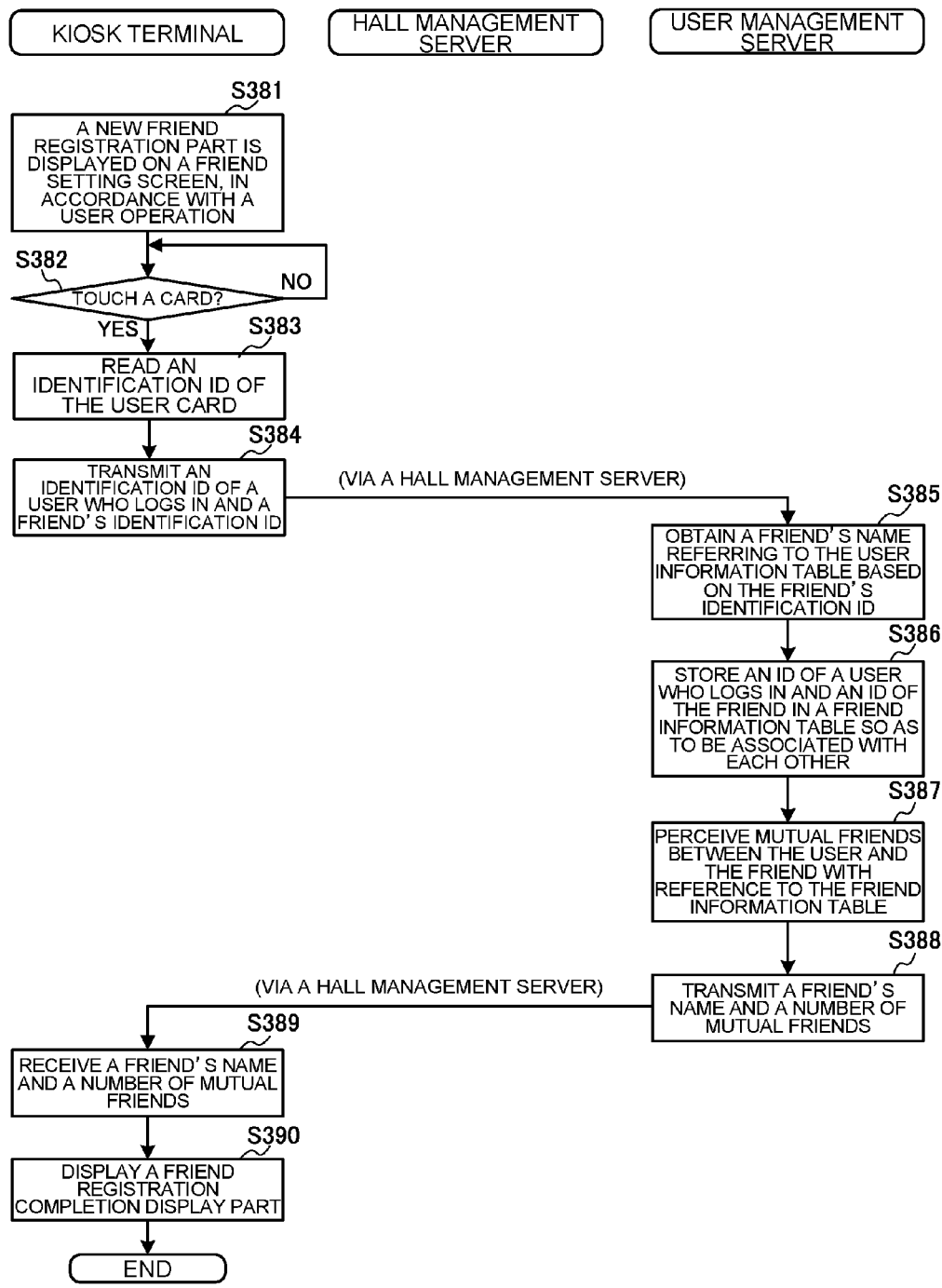
FIG. 58 is a flowchart showing an example of processing in which the friend is registered on the kiosk terminal according to the one embodiment of the present invention.

Next, with reference to FIG. 58, the processing of the above-described friend new registration in the game system 1 according to the present embodiment will be described. FIG. 58 is a flowchart showing processes performed on the kiosk terminal 2000, a hall management server 10, and a user management server 30 respectively in time series.

First, a user has logged in by touching a user card and inputting a Pincode, and thereafter, upon touching the "Friend setting" (the sub-menu of the "Friend service") of the selection menu display part 4512 in order to display the friend setting screen 4510 shown in FIG. 56, at step S381, the kiosk terminal 2000 controls the friend setting screen 4510 to display the friend new registration part 4514 shown in FIG. 56.

Here, the kiosk terminal 2000 determines whether or not a friend of the user has touched his or her user card onto the touch unit 2004 of the kiosk terminal 2000 (step S382), and until this touching is conducted, said determination is repeated (NO at step S382).

When the friend of the user has touched his or her user card thereonto (YES at step S382), here, an identification ID of the user card of the friend is read (step S383), and an identification ID of a user card of the user, which has been read upon logging in, and the identification ID of the user card of the friend read at step S383 are transmitted via the hall management server 10 to the user management server 30 (step S384).

Upon receiving the two identification IDs, based on the identification ID of the user card of the friend, the user management server 30 references a user information table 321 and obtains a name of the friend (step S385). The information obtain as described above is finally displayed on the kiosk terminal 2000, and when a nickname, sex, date of birth, and the like are to be displayed, these items can also be obtained.

Next, the user management server 30 associates the identification ID of the user card of the user with the identification ID of the user card of the friend and stores the two identification IDs in a friend information table 323 (step S386). Thus, the game system 1 recognizes that the user and this friend are in the relationship of friends.

Further, the user management server 30 references the friend information table 323, extracts identification IDs associated with the identification ID of the user card of the user and identification IDs associated with the identification ID of the user card of the friend, and obtains a number of identification IDs among the extracted identification IDs, which are common therebetween (step S387). Through this processing, a number of friends who are common between the user and the friend is grasped.

Next, the user management server 30 transmits the name of the friend obtained at step S385 and the number of common friends grasped at step S387 via the hall management server 10 to the kiosk terminal 2000 (step S388).

Upon receiving the name of the friend and the number of common friends from the user management server 30 (step S389), the kiosk terminal 2000 displays the friend registration completion display part 4515 including these items on the friend setting screen 4510. This display is, for example, a display shown in FIG. 57, and in addition to the name of the friend and the number of common friends, a guide display "Friend registration has been completed." is displayed. Through the above-mentioned display, the user recognizes that the friend has been correctly registered.

Next, with reference to FIG. 59 and FIG. 60, processing in which in the game system 1 according to the present embodiment, a friend is notified of donation information will be described. It is to be noted that here, a user who has made a donation is simply referred to as a "user", and a user who is a friend of the user and receives donation information notification is referred to as "other user".

Figure 59:
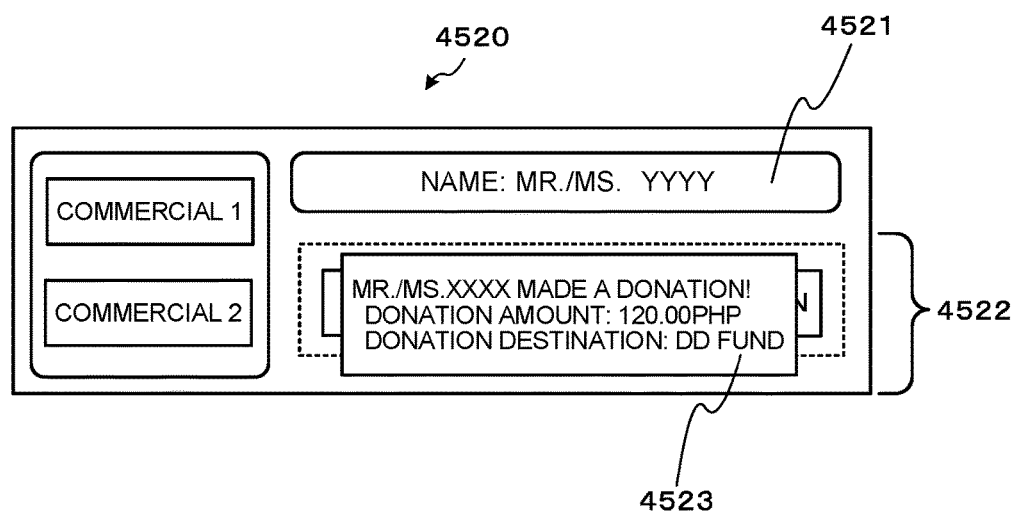
FIG. 59 is a diagram showing an example of a screen on which a donation result is displayed on a PTS terminal of a gaming machine on which the friend is playing games in the game system according to the one embodiment of the present invention.
Figure 60:
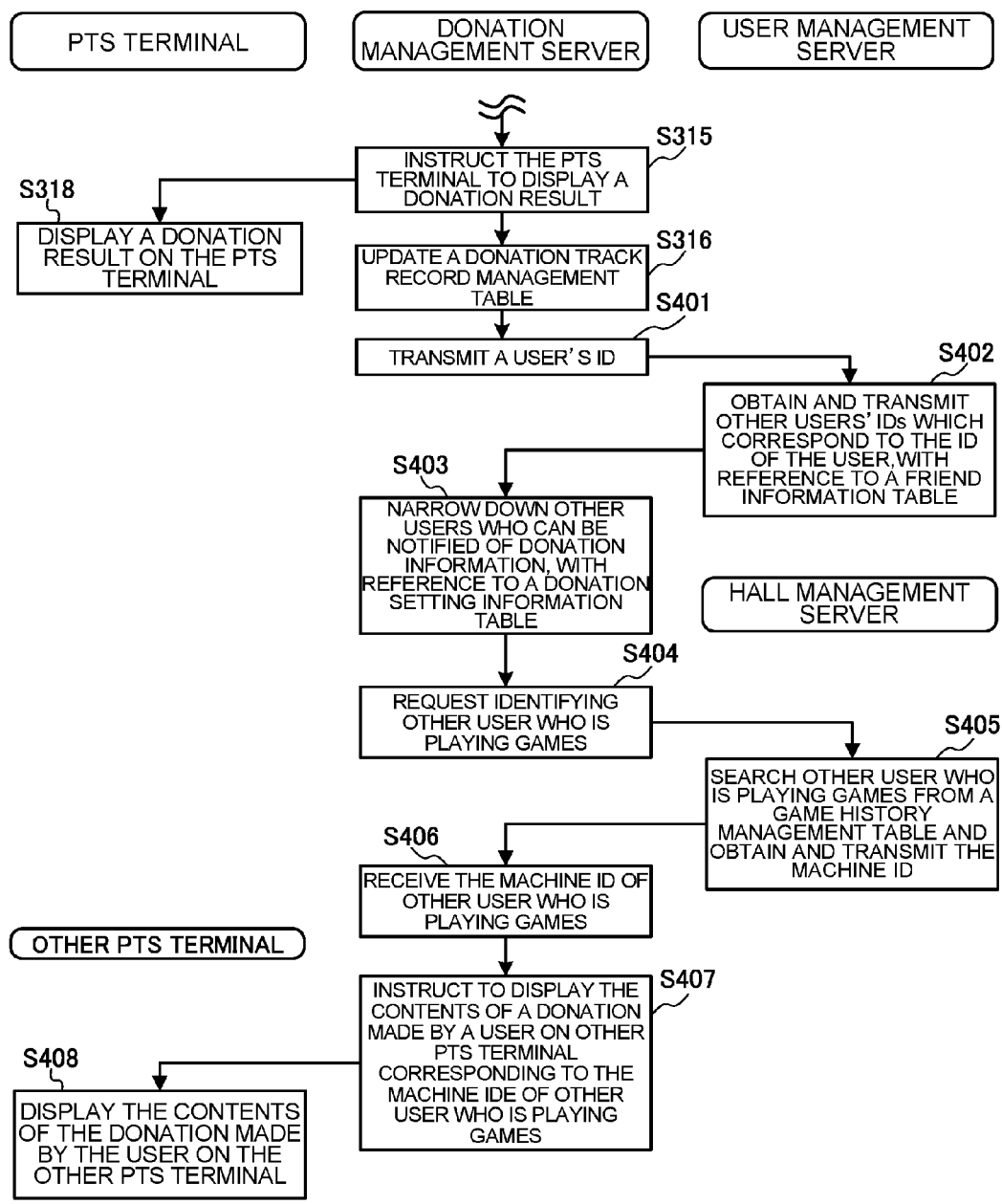
FIG. 60 is a flowchart showing an example of processing in which the donation result is displayed on the PTS terminal of the gaming machine on which the friend is playing games in the game system according to the one embodiment of the present invention.

FIG. 59 shows an example of a menu screen displayed on a PTS terminal 1700 of a slot machine 1010 on which other user is playing games. FIG. 60 is a flowchart showing processes performed on the PTS terminal 1700, the PTS terminal 1700 of the slot machine 1010 on which said other user is playing games, a donation management server 40, the user management server 30, and the hall management server 10 respectively in time series.

A user menu screen 4520 shown in FIG. 59 is the menu screen displayed on the PTS terminal (LCD 1719) of the slot machine 1010 on which said other user is playing games. Through the operation on the friend setting screen 4510 shown in FIG. 56 and FIG. 57, said other user has been newly registered as a friend of the user.

On the user menu screen 4520 shown in FIG. 59, a user card of said other user is inserted into a card unit 1741 (in order to play games on the slot machine 1010), and as a result, a name is obtained from the user information table 321 and the name of said other user is displayed on a header display part 4521. In addition, below the header display part 4521 a selection menu display part 4522 is displayed. Here, an important part is hidden and cannot be seen. Contents originally displayed are the same contents displayed on a selection menu display part 4092 shown in FIG. 41A, which includes displays of "USERS" and "INFORMATION".

On the user menu screen 4520 shown in FIG. 59, further, a donation contents display part 4523 is displayed in a pop-up manner. On the donation contents display part 4523, donation contents of the user are displayed, and said pop-up displaying is conducted at timing close to timing at which a donation of the user has been made (or at other predetermined timing).

As the donation contents displayed on the donation contents display part 4523, for example, a display "Mr. (or Ms.) XXXX has made a donation!" indicating that the user has made a donation, a donation amount, a donation destination, and the like are included. When the donation contents display part 4523 is displayed, effect displaying such as displaying of the donation contents display part 4523 in a blinking manner and displaying thereof in a gradually enlarged manner is conducted, thereby also allowing attention of said other user to be attracted. Further, when the donation contents display part 4523 is displayed, LEDs such as full-color LEDs 1731 and 1733 of the PTS terminal 1700 can also be caused to emit light and sounds can also be outputted by using speakers 1707 and 1709. In addition, the donation contents display part 4523 can be configured to be hidden through a predetermined operation of said other user or after a lapse of a fixed period of time.

Next, with reference to FIG. 60, processing in which a friend (said other user) is notified of the above-described donation information will be described.

The processing shown in the flowchart in FIG. 60 can be conducted subsequently to the processing on the donation management server 40 shown in FIG. 47 (in other words, the processing in which the donation automatic collection for the user is conducted and the PTS terminal 1700 is instructed to display the donation result). In FIG. 60, the description includes the processes at step S315 and step S316 on the donation management server 40 shown in FIG. 47 and the process at step S318 on the PTS terminal 1700 of the user.

After the process at step S316 on the donation management server 40, at step S401, the identification ID of the user is transmitted to the user management server 30.

Upon receiving the identification ID of the user from the donation management server 40, the user management server 30 references the friend information table 323, obtains the identification ID of said other user corresponding to the identification ID (in other words, the identification ID of said other user registered as a friend of the user), and transmits these identification IDs to the donation management server 40 (step S402).

Upon receiving the identification ID of said other user from the user management server 30, the donation management server 40 references an item of donation notification in a donation setting information table 421, determines whether or not respective other users have permitted the donation information notification to slot machines 1010 on which the respective other users are playing games, narrows down a target to said other user who has permitted said donation information notification (step S403), and requests the hall management server 10 to identify said other user who is currently playing games (step S404). At this time, the identification ID of said other user narrowed down by the donation management server 40 is transmitted to the user management server 30.

Upon receiving the above-mentioned request from the donation management server 40, the hall management server 10 references a game history management table 122; determines whether or not said other user identified by the received identification ID is playing games; when said other user playing games is present; obtains a machine ID associated with the identification ID; and transmits the machine ID to the donation management server 40 (step S405). Whether said other user is playing games can be determined, for example, by extracting, among records in which the received identification ID is set in the game history management table 122, a record in which the start date and time is set and the termination date and time is not set. In addition, although in this example, by referencing the game history management table 122, said other user playing games is determined, a table or the like for managing only slot machines 1010 which are under operation may be prepared.

Upon receiving the machine ID corresponding to said other user playing games from the hall management server 10 (step S406), the donation management server 40 edits donation contents of the user, generates display data for displaying on other PTS terminal 1700 corresponding to the received machine ID of said other user, and instructs said other PTS terminal 1700 to display the display data (step S407).

The display data transmitted in response to the instruction issued from the donation management server 40 is received via the hall management server 10 by said other PTS terminal 1700 of the slot machine 1010 on which said other user is playing games, and based on the instruction from the donation management server 40, said other PTS terminal 1700 displays the donation contents of the user on a LCD 1719 of said other PTS terminal 1700 by using the received display data (step S408).

The game system 1 according to the above-described embodiment is described using several specific configurations. However, these configurations are merely exemplifications, and other various configurations can realize a characteristic idea of the present invention. For example, the hall management server 10, the user management server 30, and the donation management server 40 according to the present embodiment are integrated or dispersed, and the present invention can also be realized by computers having different configurations. In addition, the respective tables are arranged so as to have other various configurations, and these tables can also be stored on other servers or other various computers.

The present invention discloses a plurality of problems which are solved by the above-described embodiment, a plurality of solutions thereto, and the like as below.

The present invention also discloses the invention according to the below-described aspect.

A game system is to control a donation made by a user using a gaming machine, the gaming machine enabling execution of a game played by the user in accordance with a value of game media, the gaming machine providing a value of game media for the user in accordance with an outcome of the game, the game system including:

a storage part for storing a value of game media associated with the user; and a server for executing processing in which a donation associated with the game media required to play the game on the gaming machine is made based on a setting made by the user, the server including:

a hall management server for receiving user information of the user, setting information of said user, and identification information of the gaming machine used by said user and for updating and managing the each information; and a donation management server for obtaining donation automatic collection information and donation setting information from a stored donation setting information table based on the setting information of the user on the hall management server and when contents of the setting information of said user match a donation condition shown in the donation setting information and a money amount obtained in past games whose number is previously set as said donation automatic collection condition exceeds a reference value, for determining a donation amount from a fraction being less than a minimum unit of the game media required to play the game on the gaming machine.

The present invention also discloses the invention according to the below-described aspect.

A game system is to control a donation made by a user using a gaming machine, the gaming machine enabling execution of a game played by the user in accordance with a value of game media, the gaming machine providing a value of game media for the user in accordance with an outcome of the game, the game system including:

a storage part for storing a value of game media associated with the user; and a server for executing processing in which a donation associated with the game media required to play the game on the gaming machine is made based on a setting made by the user, the server including:

a hall management server for receiving user information of the user, setting information of said user, and identification information of the gaming machine used by said user and for updating and managing the each information; and a donation management server for obtaining donation automatic collection information and donation setting information from a stored donation setting information table based on the setting information of the user on the hall management server and when contents of the setting information of said user match a donation condition shown in the donation setting information and a money amount obtained in past games whose number is previously set as said donation automatic collection condition exceeds a reference value, for determining, based on said donation setting information and a point exchange rate management table, a donation amount from points provided for the user based on game states.

The present invention also discloses the invention according to the below-described aspect.

A game system is to control a donation made by a user using a gaming machine, the gaming machine enabling execution of a game played by the user in accordance with a value of game media, the gaming machine providing a value of game media for the user in accordance with an outcome of the game, the game system including:

a storage part for storing a value of game media associated with the user; and a server for executing processing in which a donation associated with the game media required to play the game on the gaming machine is made based on a setting made by the user, the server including:

a hall management server for receiving user information of the user, setting information of said user, and identification information of the gaming machine used by said user and for updating and managing the each information; and a donation management server for obtaining donation automatic collection information and donation setting information from a stored donation setting information table based on the setting information of the user on the hall management server and when contents of the setting information of said user match a donation condition shown in the donation setting information and a money amount obtained in past games whose number is previously set as said donation automatic collection condition exceeds a reference value, further based on the donation setting information, for executing either of (A) processing in which a donation amount is determined from a fraction being less than a minimum unit of the game media required to play the game on the gaming machine or (B) processing in which a donation amount is determined, based on said donation setting information and a point exchange rate management table, from points provided for the user based on game states.

The present invention also discloses the invention according to the below-described aspect.

A game system is to control a donation made by a user using a gaming machine, the gaming machine enabling execution of a game played by the user in accordance with a value of game media, the gaming machine providing a value of game media for the user in accordance with an outcome of the game, the game system including:

a storage part for storing a value of game media associated with the user; and a server for determining a rank promotion condition in accordance with a donation amount when the donation is made from the value of the game media associated with the user, the server including:

a donation management server for referencing a stored donation track record management table, determining donation points in accordance with said donation amount obtained by totalizing donation amounts of the user in a predetermined period of time, and determining said user rank promotion condition in accordance with said donation points; and a hall management server for comparing a rank of the user and a rank of said user in a management table based on the rank promotion condition and updating the rank of said user.

The present invention also discloses the invention according to the below-described aspect.

A game system is to control a donation made by a user using a gaming machine, the gaming machine enabling execution of a game played by the user in accordance with a value of game media, the gaming machine providing a value of game media for the user in accordance with an outcome of the game, the game system including:

a storage part for storing a value of game media provided as a payout in accordance with the outcome of the game for each game;

a hall management server for receiving user information of the user, setting information of said user, and identification information of the gaming machine used by said user and for updating and managing said user information; and a donation management server for obtaining donation automatic collection information and donation setting information from a stored donation setting information table based on the setting information of the user on the hall management server and when contents of the setting information of said user match a donation condition shown in the donation setting information and a money amount obtained in past games whose number is previously set as said donation automatic collection condition exceeds a reference value, for determining a donation amount which is a previously set percentage of a payout amount.

The present invention also discloses the invention according to the below-described aspect.

A game system is to control a donation made by a user using a gaming machine, the gaming machine being installed in a game facility, the gaming machine enabling execution of a game played by the user in accordance with a value of game media, the gaming machine providing a value of game media for the user in accordance with an outcome of the game, the game system including:

a storage part for storing a value of game media associated with the user;

a display device being operable to display information related to the gaming machine; and a server for determining a rank promotion condition in accordance with a donation amount when the donation is made from the value of the game media associated with the user, the server including:

a user management server having a user management table for managing user information of the user; and a donation management server for referencing a stored donation track record management table, determining ranking points in accordance with an amount of said donation obtained by totalizing donation amounts of the user in a predetermined period of time, generating ranking display data so as to associate said ranking points and information in the user management table on the user management server, and transmitting the ranking display data to the display device, and the display device displays ranking of the user based on the ranking display data.

What is claimed is:

1. A game system, comprising:
a plurality of gaming machines, each having a display and being configured 1) to accept game media to enable a user to play a game on the gaming machine in accordance with a value of game media that has been wagered, and 2) to provide a value of game media for the user in accordance with an outcome of the game;
each of the displays being configured to present to the user a donation interface, the donation interface presenting to the user
a relative-ranking section that displays the relative rankings of amounts of points donated by a plurality of users, the points being based on conversion of value of game media; and
a donation-control section, the donation-control section being configured to permit the user to set settings that control whether a predetermined percentage of a payout is donated, using conversion-based points, and a predetermined timing thereof;

the game system further comprising a storage part for storing said value of the game media provided for the user as a payout in accordance with the outcome of the game for each game; and
a server configured to receive said predetermined percentage of the payout based on the payout stored in the storage part and based on said settings that have been entered via the donation-control section of the donation interface.

2. The game system according to claim 1, wherein the donation-control section of the donation interface is configured to present a choice to the user that lets the user set the predetermined timing as a timing at which the user performs an operation on the gaming machine or a timing at which the value of the game media is provided for the user.

3. The game system according to claim 1, wherein the donation-control section of the donation interface is configured to present an option to the user that lets the user set a donation destination.

4. The game system according to claim 1, wherein the donation-control section is further configured to permit the player to set a setting to control whether the predetermined percentage of the payout is donated based on a condition related to a game history of the user.

* * * * *